(12) United States Patent
Wang

(10) Patent No.: US 12,425,719 B2
(45) Date of Patent: Sep. 23, 2025

(54) PHOTOGRAPHING METHOD AND RELATED DEVICE

(71) Applicant: HONOR DEVICE CO., LTD., Shenzhen (CN)

(72) Inventor: Jianxian Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/698,740

(22) PCT Filed: May 5, 2023

(86) PCT No.: PCT/CN2023/092384
§ 371 (c)(1),
(2) Date: Apr. 4, 2024

(87) PCT Pub. No.: WO2023/231698
PCT Pub. Date: Jul. 12, 2023

(65) Prior Publication Data
US 2025/0240519 A1    Jul. 24, 2025

(30) Foreign Application Priority Data

May 30, 2022   (CN) .......................... 202210603468.4
Aug. 10, 2022   (CN) .......................... 202210956581.0

(51) Int. Cl.
*H04N 23/69*    (2023.01)
*H04N 23/63*    (2023.01)
(Continued)

(52) U.S. Cl.
CPC ......... *H04N 23/632* (2023.01); *H04N 23/675* (2023.01); *H04N 23/69* (2023.01); *H04N 23/667* (2023.01)

(58) Field of Classification Search
CPC .... H04N 23/632; H04N 23/69; H04N 23/675; H04N 23/667
(Continued)

(56) References Cited

U.S. PATENT DOCUMENTS 5,724,475 A * 3/1998 Kirsten ................ H04N 19/137
348/E7.086
10,204,433 B2   2/2019 Shintani et al.
(Continued)

FOREIGN PATENT DOCUMENTS

CN   105491437 A   4/2016
CN   105763926 A   7/2016
(Continued)

*Primary Examiner* — Jeffery A Williams
(74) *Attorney, Agent, or Firm* — WOMBLE BOND DICKINSON (US) LLP

(57) ABSTRACT

This application provides a photographing method and a related device. The photographing method may be applied to an electronic device provided with a camera and a display. According to the photographing method, in a photographing scene in which a plurality of photographed objects are photographed together, the electronic device may perform focus tracking on one of the photographed objects, and creates two encoders to respectively encode an original image displayed in a large preview window and a close-up image displayed in a small preview window, to obtain an original video and a close-up video. In some embodiments of this application, the electronic device may obtain one original video and a plurality of close-up videos through photographing.

20 Claims, 40 Drawing Sheets

(51) Int. Cl.
*H04N 23/667* (2023.01)
*H04N 23/67* (2023.01)

(58) Field of Classification Search
USPC .......................................................... 348/169
See application file for complete search history.

(56) References Cited

U.S. PATENT DOCUMENTS

| | | |
|---|---|---|
| 10,643,665 B2 | 5/2020 | De Jong et al. |
| 11,765,463 B2 | 9/2023 | Li et al. |
| 2013/0155308 A1 | 6/2013 | Wu et al. |
| 2018/0196472 A1 | 7/2018 | Lee |
| 2022/0159183 A1 | 5/2022 | Li |
| 2024/0187726 A1 | 6/2024 | Ou et al. |

FOREIGN PATENT DOCUMENTS

| | | | |
|---|---|---|---|
| CN | 111093026 | A | 5/2020 |
| CN | 112216309 | A | 1/2021 |
| CN | 112954218 | A | 6/2021 |
| CN | 112954219 | A | 6/2021 |
| CN | 113473007 | A | 10/2021 |
| CN | 113596319 | A | 11/2021 |
| CN | 113766129 | A | 12/2021 |
| CN | 113794832 | A | 12/2021 |
| CN | 113873166 | A | 12/2021 |
| CN | 113923391 | A | 1/2022 |
| CN | 114125284 | A | 3/2022 |
| CN | 113572948 | A | 11/2022 |
| EP | 1081956 | A1 | 3/2001 |
| WO | 2021227693 | A1 | 11/2021 |

\* cited by examiner

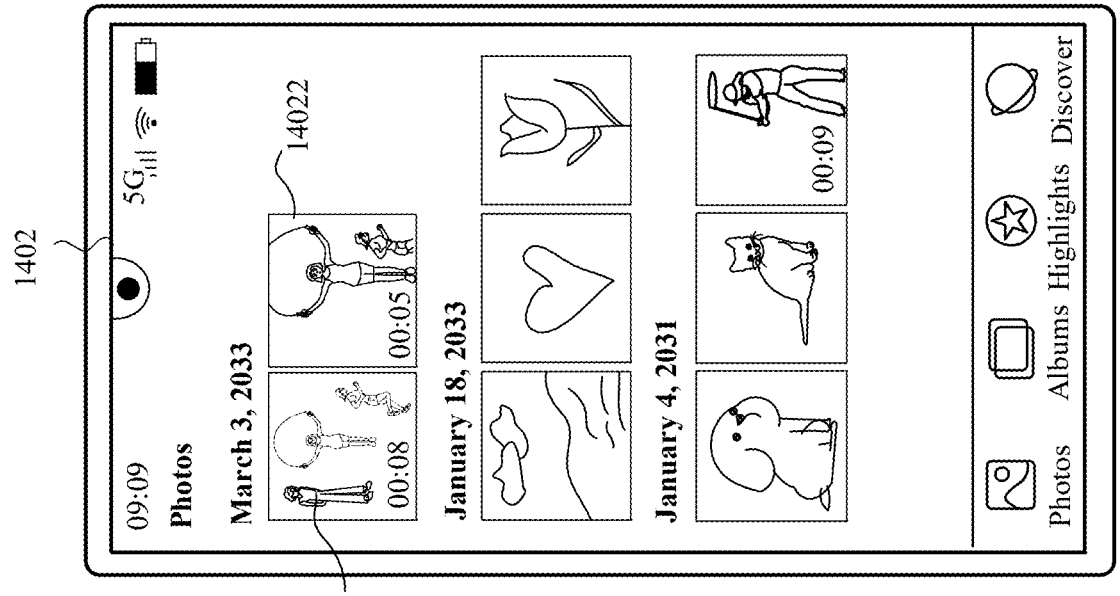
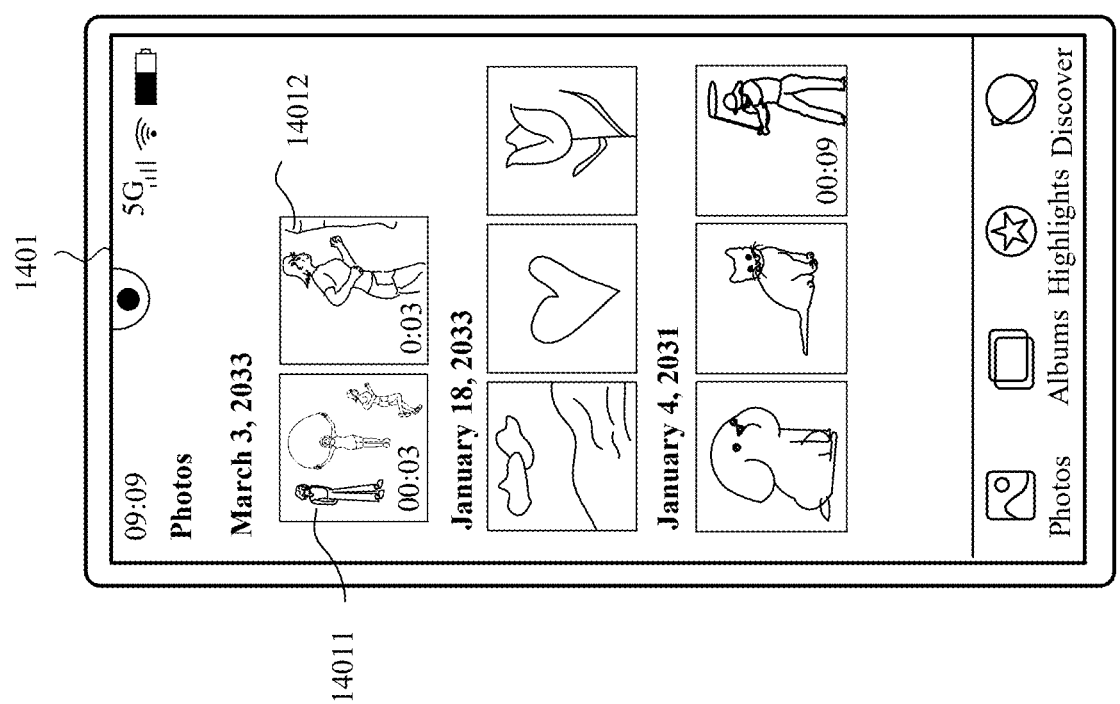
FIG. 2N

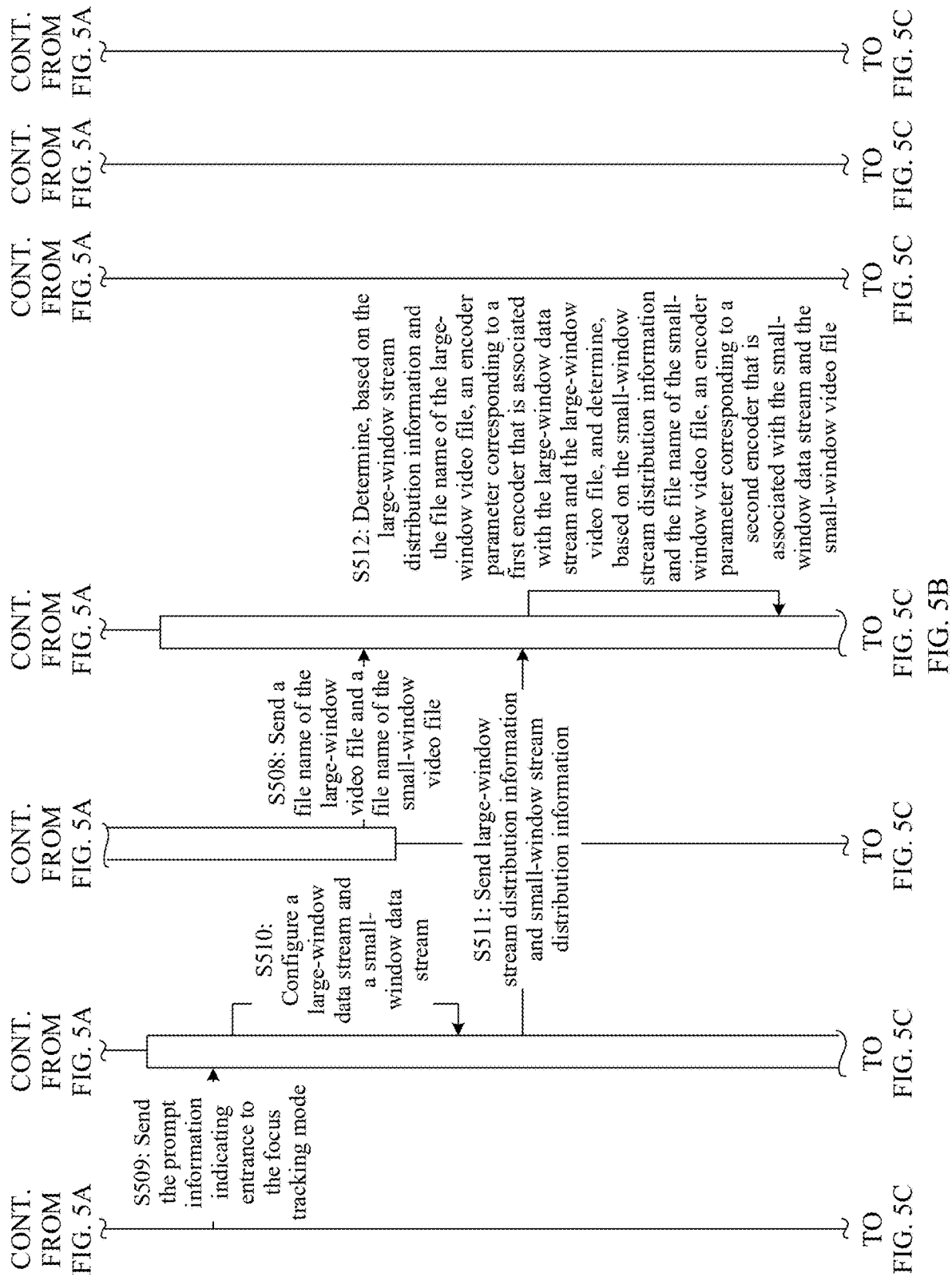

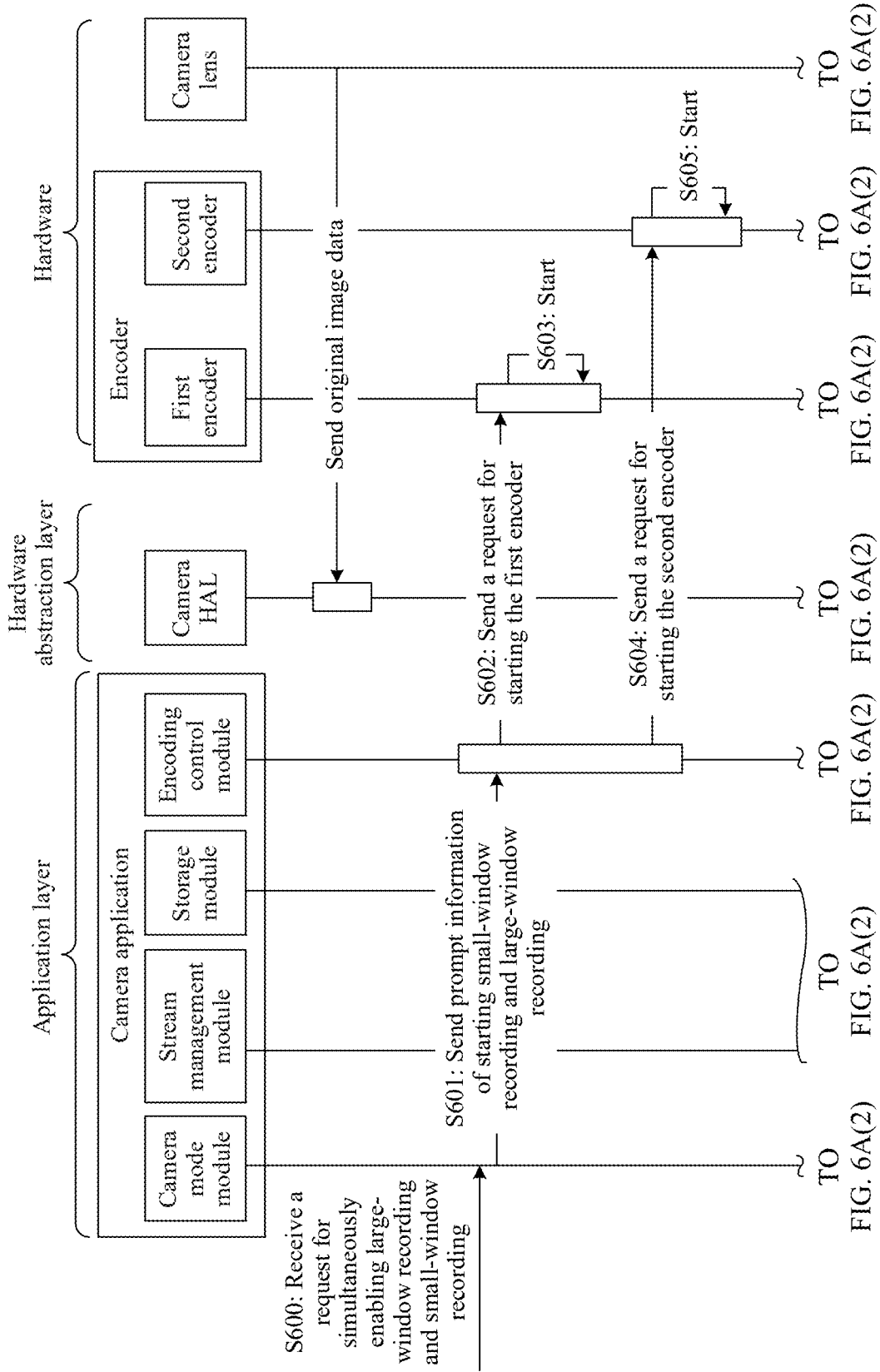
FIG. 6A(1)

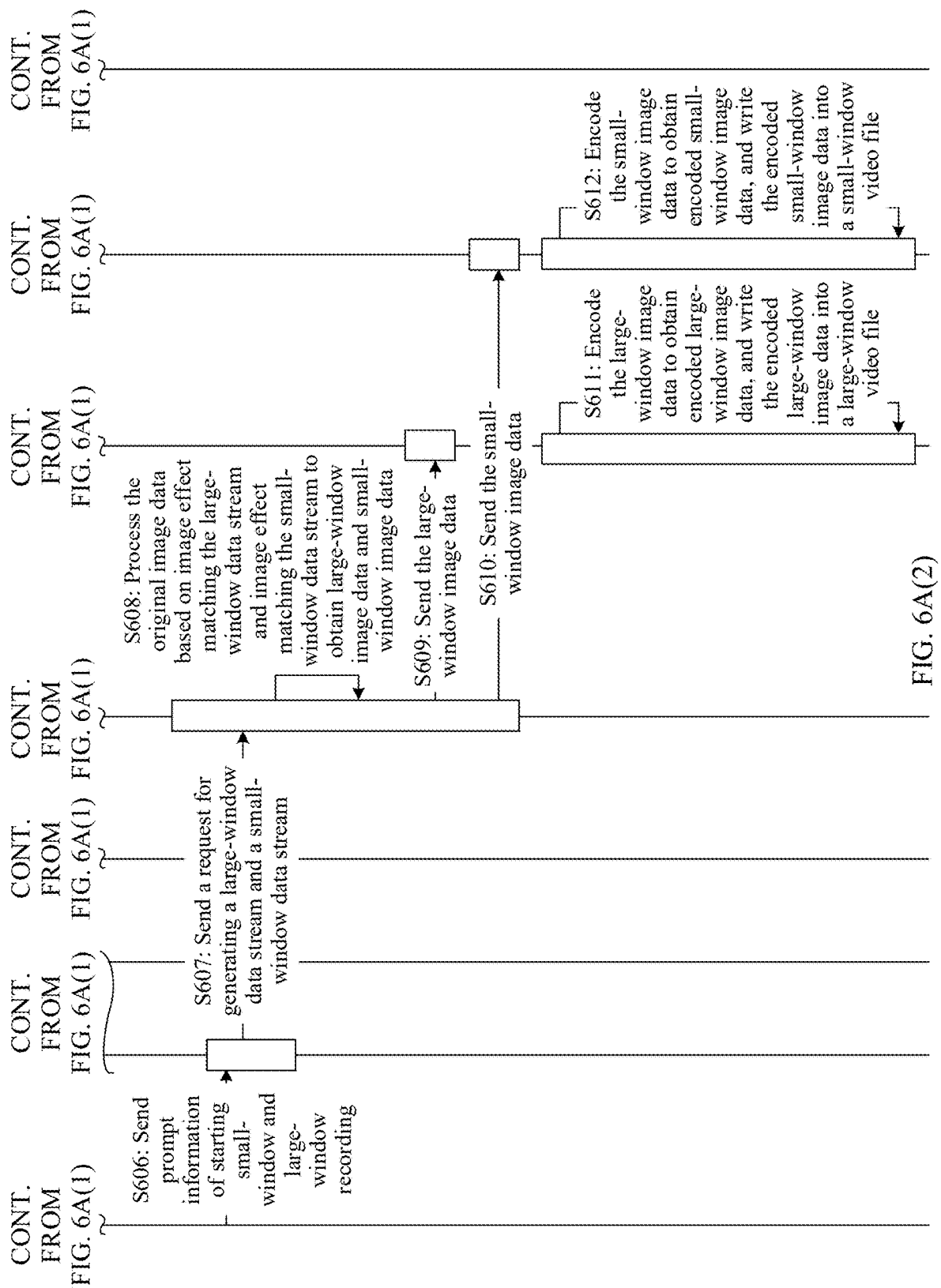
FIG. 6A(2)

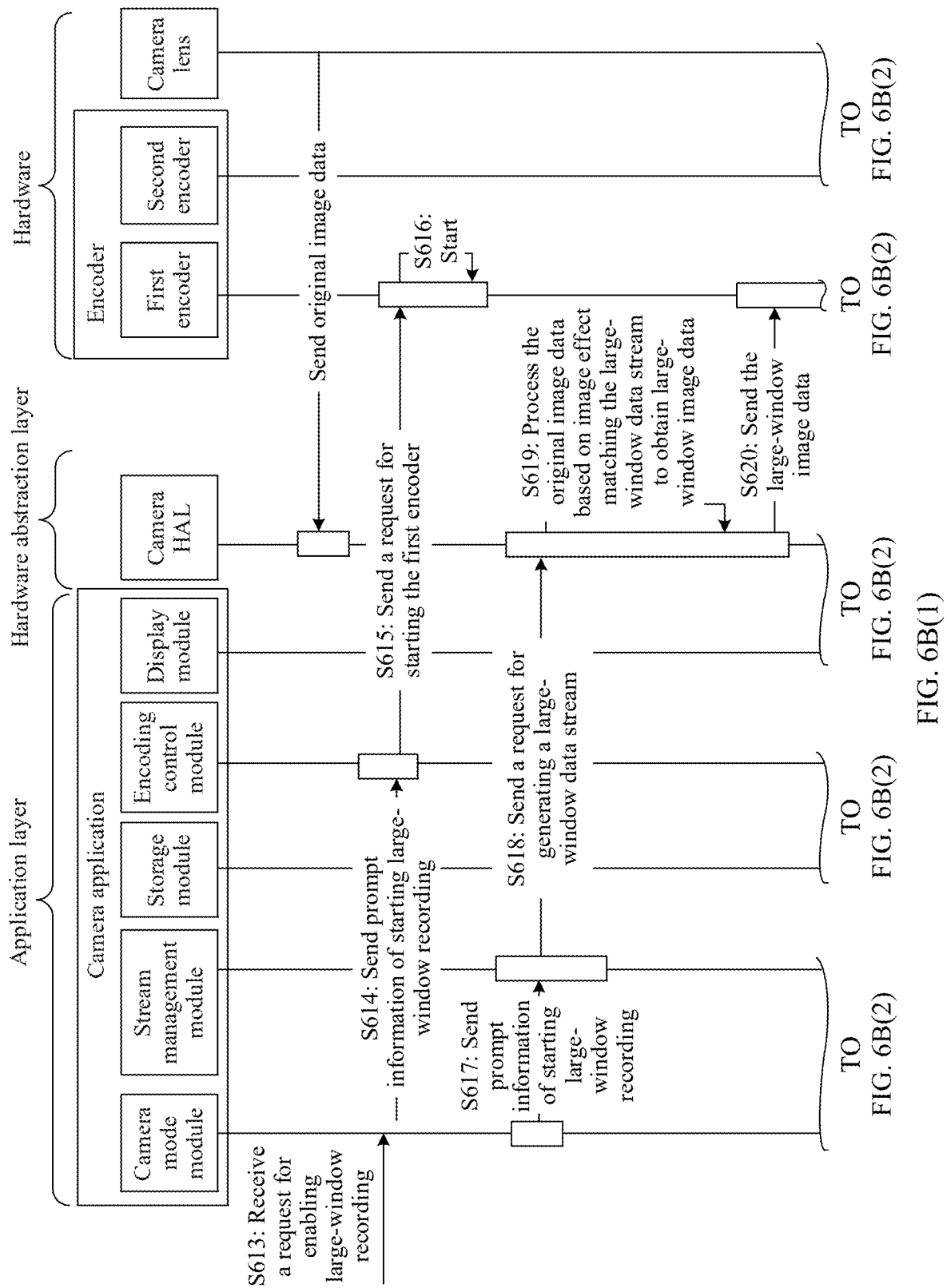

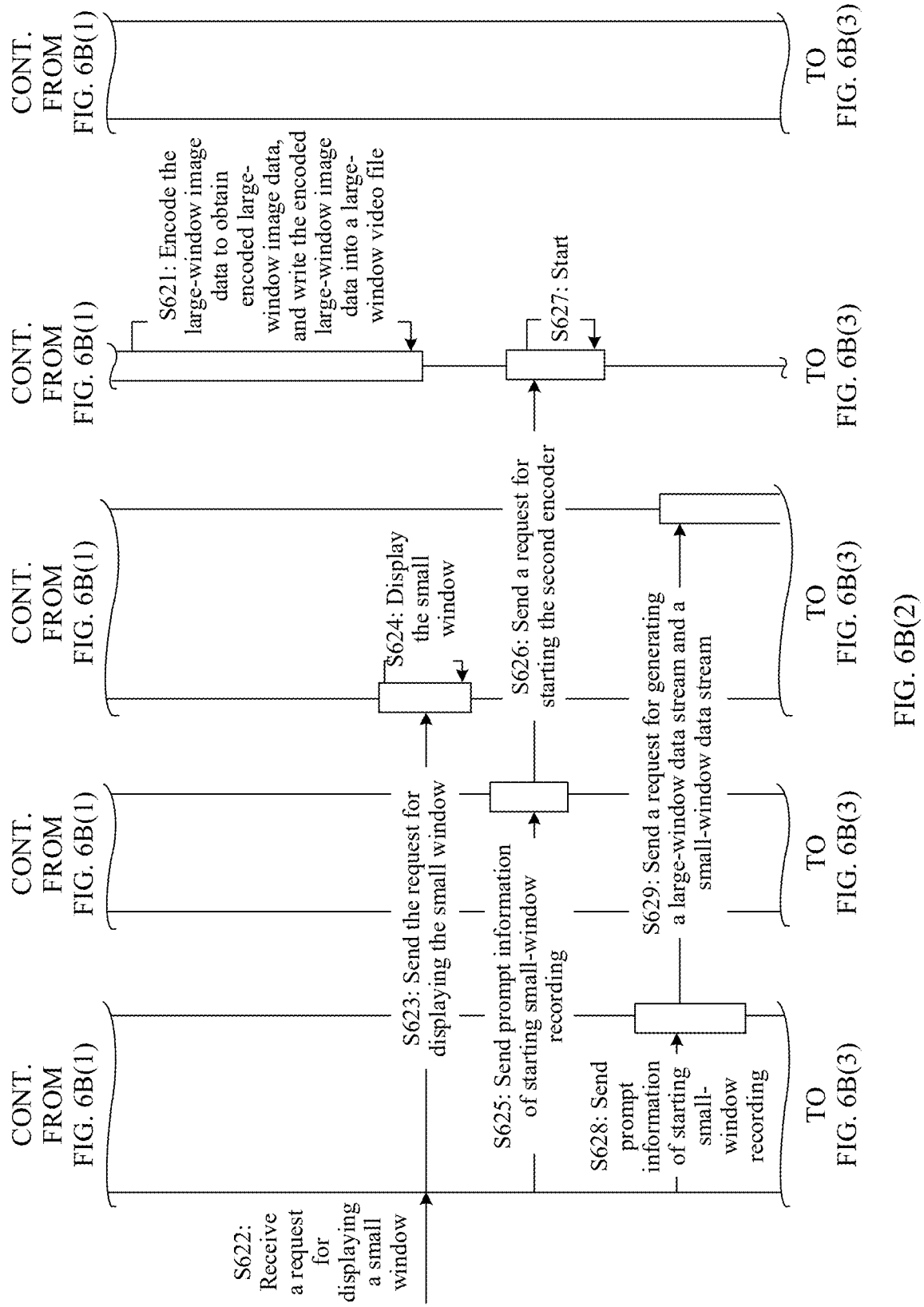
FIG. 6B(2)

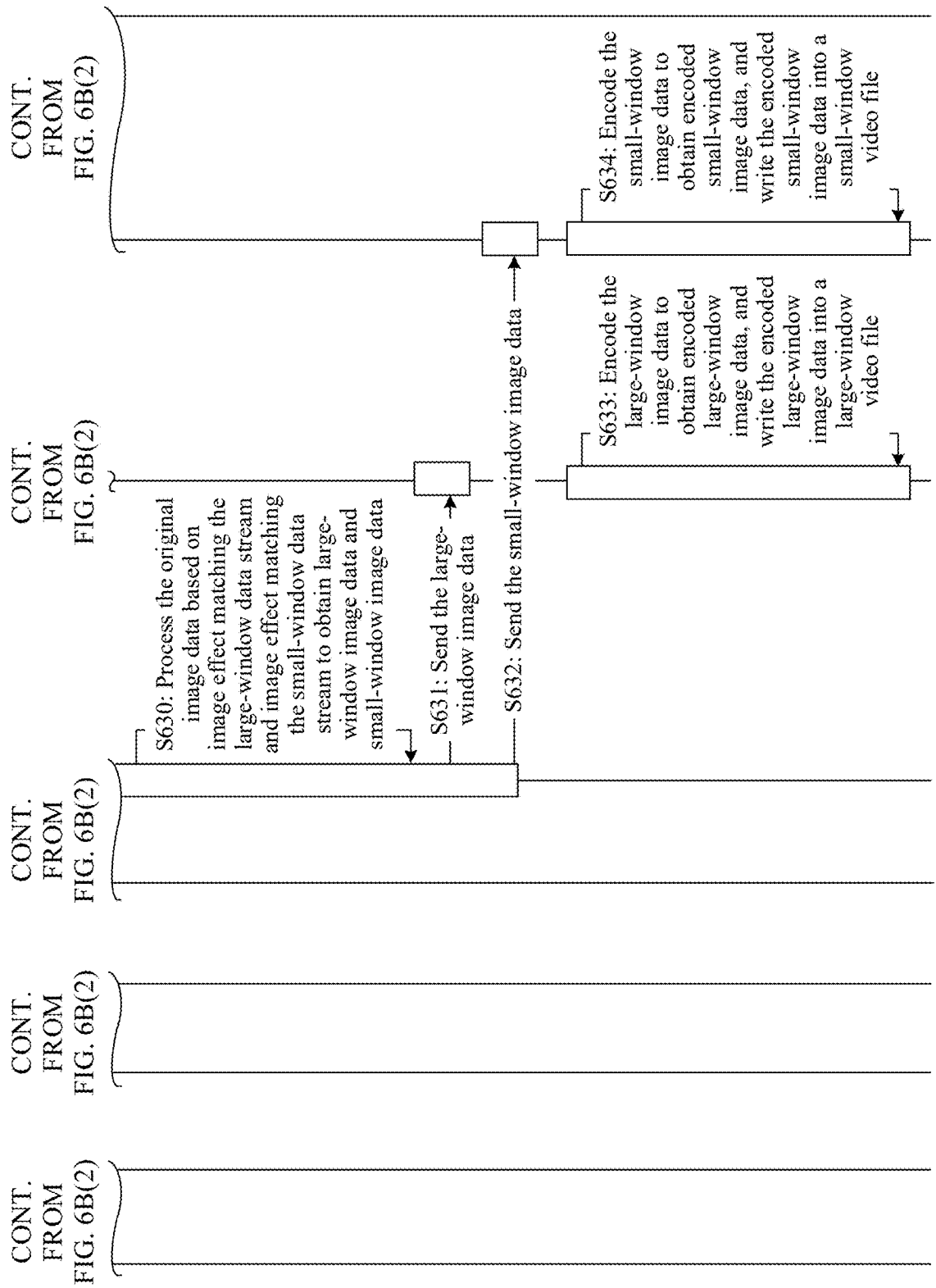

PHOTOGRAPHING METHOD AND RELATED DEVICE

CROSS-REFERENCE TO RELATED APPLICATIONS

This application is a national stage of International Application No. PCT/CN2023/092384, filed on May 5, 2023, which claims priority to Chinese Patent Application No. 202210603468.4, filed on May 30, 2022, and to Chinese Patent Application No. 202210956581.0, filed on Aug. 10, 2022, all of which are incorporated herein by reference in their entireties.

TECHNICAL FIELD

This application relates to the field of terminal technologies, and in particular to a photographing method and a related device.

BACKGROUND

With development of terminal technologies, there are more possibilities for video recording. For example, people may perform automatic focus tracking on photographed objects such as a face, a person, and a pet by using terminal devices such as a mobile phone, to resolve a problem that out of focus or focus shifting occurs because automatic focus tracking cannot be performed on the photographed objects when the photographed objects move.

SUMMARY

This application provides a photographing method and a related device. The photographing method may be applied to an electronic device provided with a camera and a display. According to the photographing method, in a photographing scenario in which a plurality of photographed objects are photographed together, the electronic device may perform focus tracking on one of the photographed objects, and creates two encoders to respectively encode an image displayed in a large preview window and an image displayed in a small preview window, to obtain two or more videos. It may be understood that the electronic device may obtain one original video and at least one close-up video through photographing. According to this photographing method, in a normal photographing case, a user can simultaneously obtain a close-up video, and a requirement of the user on videos of different framing ranges can be simultaneously met, thereby improving user experience.

According to a first aspect, this application provides a photographing method. The photographing method may be applied to an electronic device provided with a camera, a display, a first encoder, and a second encoder. The method may include: displaying a first interface, where the first interface includes a first window, an image captured by the camera is displayed in the first window, and the image displayed in the first window includes one or more first objects; selecting a second object from the one or more first objects; further displaying a second window when the display displays the first window, where an image displayed in the second window includes the second object; and recording the image in the first window to generate a first video, and recording the image in the second window to generate a second video, by using the first encoder and the second encoder.

In solutions provided in this application, a user may trigger the electronic device to enter a focus tracking mode. In the focus tracking mode, the electronic device may simultaneously display the first window and the second window; and record the image in the first window to generate the first video, and record the image in the second window to generate the first video, by using the first encoder and the second encoder. In other words, after recording is ended, the user may obtain at least two videos: an original video generated based on the image in the first window and a close-up video generated based on the image in the second window. In this way, the user can simultaneously obtain the close-up video in a normal photographing case. In other words, according to the foregoing method, the user can obtain videos of different framing ranges in a same photographing time, to meet personalized requirements of the user in different scenarios at different moments, thereby improving user experience.

It may be understood that the first window may indicate a "large preview window" mentioned below, and may also indicate a "large window" mentioned below. It may be understood that the second window may indicate a "small preview window" mentioned below, and may also indicate a "small window" mentioned below. For example, the first window may be a preview window 201, and the second window may be a small preview window 501.

It may be understood that the first video may be an original video, and the second video may be a close-up video of the second object. The original video is obtained based on the original image captured by the camera. Content of the image that composes the original video is consistent with a framing range of photographing performed by the camera. The close-up video is obtained through recognizing a main character in the image and then clipping an image of the main character based on the original image. The close-up video is centered on the main character. In a video recording process, the electronic device may simultaneously display the original video and the close-up video for preview by the user.

With reference to the first aspect, in a possible implementation, after displaying the second window, the electronic device may further receive a recording start operation, enable the first encoder, and enable the second encoder.

In the solutions provided in this application, when the electronic device displays the first window and the second window on the display, the user may trigger the electronic device to start recording. Correspondingly, the electronic device may receive the recording start operation. In response to the operation, the electronic device may enable the first encoder and the second encoder. In the foregoing manner, the user may enable the first encoder and the second encoder to record the image in the first window and the image in the second window, so that the user can simultaneously record images with different framing ranges, and a requirement of the user on videos of different framing ranges can be met.

In this application, "recording the image in the first window" and "recording the image of the first window" have a same meaning as "recording based on the image in the first window". Similarly, "recording the image in the second window" and "recording the image of the second window" have a same meaning as "recording based on the image in the second window".

In some embodiments of this application, "receiving the recording start operation" has a same meaning as "receiving a request for simultaneously enabling large-window recording and small-window recording" (for example, step S600).

With reference to the first aspect, in a possible implementation, before selecting the second object from the one or more first objects, the electronic device may further receive a recording start operation, and enable the first encoder. After selecting the second object from the one or more first objects, the electronic device may further enable the second encoder.

In the solutions provided in this application, when displaying the first window, the electronic device may enable the first encoder to record the image in the first window. After selecting the second object, the electronic device may display the second window on the display, and enable the second encoder to record the image in the second window. It may be understood that a start time at which the user uses the electronic device to record the image in the second window is optional. The user may choose to simultaneously record the image in the first window and the image in the second window, or may choose to record the image in the first window first and then record the picture in the second window. Recording requirements of the user in different scenarios at different moments can be met according to the foregoing method, thereby improving user experience.

With reference to the first aspect, in a possible implementation, the first interface may further include a first control, and the first control is used to enable a focus tracking mode. After displaying the first interface, the electronic device may further receive an operation performed on the first control, create the first encoder, and create the second encoder.

In the solutions provided in this application, the user can trigger, by using the first control on the first interface, the electronic device to enter the focus tracking mode. Correspondingly, the electronic device may enter the focus tracking mode, create the first encoder, and create the second encoder, to subsequently record the image in the first window and the image in the second window, that is, to simultaneously record two paths of videos.

In some embodiments of this application, the first control may be a focus tracking mode control, for example, a focus tracking mode control 301.

In some embodiments of this application, "receiving the operation performed on the first control" has a same meaning as "receiving a request for enabling the focus tracking mode" (for example, step S505).

It may be understood that for related content of creating the first encoder and creating the second encoder, reference may be made to descriptions related to FIG. 5A, FIG. 5B, and FIG. 5C. Details are not described herein.

For example, as shown in FIG. 2C, a user interface 300 may include the focus tracking mode control 301. The user may tap the focus tracking mode control 301. Correspondingly, the electronic device may receive an operation performed on the focus tracking mode control 301. In response to the operation, the electronic device may create the first encoder and the second encoder.

With reference to the first aspect, in a possible implementation, that the electronic device records the image in the first window to generate the first video, and records the image in the second window to generate the second video, by using the first encoder and the second encoder may specifically include that the electronic device may record the image in the first window by using the first encoder to generate the first video, after the first encoder is enabled; and record the image in the second window by using the second encoder to generate the second video, after the second encoder is enabled.

In the solutions provided in this application, after the electronic device enables the first encoder, the electronic device may record the image in the first window by using the first encoder; and after the electronic device enables the second encoder, the electronic device may record the image in the second window by using the second encoder. In other words, the electronic device may associate the first encoder with the first window so that the first encoder is configured to record the image in the first window, and associate the second encoder with the second window so that the second encoder is configured to record the image in the second window. According to the foregoing method, the first encoder and the second encoder respectively implement their own functions to respectively record images in different windows, and the electronic device does not need to wait for allocating the windows corresponding to the two encoders till recording, thereby improving recording efficiency to some extent.

With reference to the first aspect, in a possible implementation, after the electronic device records the image in the first window to generate the first video, and records the image in the second window to generate the second video, by using the first encoder and the second encoder, the method may further include: The electronic device may receive a recording end operation, stop encoding of the first encoder and encoding of the second encoder, and generate the first video and the second video. A recording end moment of the first video is the same as a recording end moment of the second video.

In the solutions provided in this application, when the image in the first window and the image in the second window are recorded by using the electronic device, the user can freely determine the recording end moment of the first window and the recording end moment of the second window. For example, recording of the first window and recording of the second window simultaneously end. Recording requirements of the user in different scenarios at different moments can be met according to the foregoing method, thereby improving user experience.

In some embodiments of this application, "receiving the recording end operation" has a same meaning as "receiving a request for simultaneously ending large-window recording and small-window recording" (for example, step S800).

In some embodiments of this application, when simultaneously displaying the first window and the second window, the electronic device simultaneously starts recording of the first window and recording of the second window, and the electronic device simultaneously ends recording of the first window and recording of the second window. In this case, duration of the first video generated by the electronic device is the same as duration of the second video. For example, the first video may be a video 14011 shown in a in FIG. 2N, and the second video may be a video 14012 shown in a in FIG. 2N. Duration of the video 14011 and that of the video 14012 are both 3 s.

In some embodiments of this application, when displaying the first window, the electronic device first simultaneously starts recording of the first window and then starts recording of the second window, and the electronic device simultaneously ends recording of the first window and recording of the second window. In this case, duration of the first video generated by the electronic device is longer than duration of the second video. For example, the first video may be a video 14021 shown in b in FIG. 2N, and the second video may be a video 14022 shown in b in FIG. 2N. Duration of the video 14021 is 8 s, and duration of the video 14022 is 3 s.

It may be understood that the recording end moment indicates a moment at which video recording is ended. The recording end moment of the first video indicates a moment at which recording of the image displayed in the first window is ended. The recording end moment of the second video indicates a moment at which the image displayed in the second window is ended.

With reference to the first aspect, in a possible implementation, after the electronic device records the image in the second window to generate the second video by using the second encoder, the method may further include: The electronic device may receive a recording end operation performed on the second window, close the second window, stop encoding of the second encoder, and generate the second video.

In the solutions provided in this application, when the image in the first window and the image in the second window are recorded by using the electronic device, the user can freely determine the recording end moment of the first window and the recording end moment of the second window. For example, recording of the second window is first ended. Recording requirements of the user in different scenarios at different moments can be met according to the foregoing method, thereby improving user experience.

In some embodiments of this application, "receiving the recording end operation performed on the second window" has a same meaning as "receiving a request for ending small-window recording" (for example, step S700).

It may be understood that the electronic device may first end recording of the second window. In this case, duration of the first video generated by the electronic device is longer than duration of the second video. For example, the first video may be a video 14021 shown in b in FIG. 2N, and the second video may be a video 14022 shown in b in FIG. 2N. Duration of the video 14021 is 8 s, and duration of the video 14022 is 3 s.

With reference to the first aspect, in a possible implementation, after the electronic device generates the second video, the method may further include: The electronic device may receive a recording end operation performed on the first window, stop encoding of the first encoder, and generate the first video. A recording end moment of the first video is later than a recording end moment of the second video.

In the solutions provided in this application, the electronic device may directly end recording of the first window when recording of the second window is ended. In this way, the electronic device can generate two videos: the second video and the first video. A recording end moment of the first video is later than a recording end moment of the second video, and duration of the first video is longer than duration of the second video.

In some embodiments of this application, "receiving the recording end operation performed on the first window" has a same meaning as "receiving a request for ending large-window recording" (for example, step S900).

With reference to the first aspect, in a possible implementation, after the electronic device generates the second video, the method may further include: The electronic device may select a third object from the one or more first objects. The electronic device may newly display the second window when the display displays the first window. The electronic device may enable the second encoder, and record the image in the second window by using the second encoder to generate a third video. The third object may be the same as or different from the second object.

In the solutions provided in this application, after the electronic device first ends recording of the second window, the electronic device may further reselect the second object in response to an operation of reselecting the second object by the user. In this case, the electronic device may newly display the second window on the display, and enable the encoder to record the image in the second window to generate the third video. In this way, the electronic device can generate at least three videos: the first video, the second video, and the third video. A recording end moment of the second video is earlier than a recording end moment of the first video, and the recording end moment of the second video and that of the first video are both earlier than a recording start moment of the third video. Recording requirements of the user in different scenarios at different moments can be met according to the foregoing method, thereby improving user experience.

For example, the electronic device may receive an operation performed on a recording end control 1003 included on a user interface 1000 shown in FIG. 2J. In response to the operation, the electronic device may display a user interface 1600 shown in FIG. 2P. The user interface 1600 may include a body box 402, a body box 403, and a body box 404. The body box 402, the body box 403, and the body box 404 are respectively used to frame and select a person R1, a person R2, and a person R3. In this case, the electronic device has ended recording of a close-up video whose focus tracking target is the person R2, but still records an original video. The electronic device may receive a user operation performed on the body box 404 included on the user interface 1600. In response to the operation, the electronic device may newly determine that a person (that is, the person R3) framed and selected by the body box 404 is a focus tracking target, and record a close-up video of the person R3. It may be understood that the person R3 in this example is a second object newly selected by the electronic device. The person R1, the person R2, and the person R3 are first objects.

It may be understood that the second video and the third video may be close-up videos with a same focus tracking target, or may be close-up videos with different focus tracking targets. In other words, the second object newly selected by the electronic device may be the same as or different from the second object previously selected.

With reference to the first aspect, in a possible implementation, after the electronic device records the image in the second window by using the second encoder to generate the third video, the method may further include: The electronic device may receive a recording end operation, stop encoding of the first encoder and encoding of the second encoder, and generate the first video and the third video. A recording start moment of the first video is earlier than a recording start moment of the third video, and a recording end moment of the first video is the same as a recording end moment of the third video.

In the solutions provided in this application, the electronic device may simultaneously end recording of the first window and recording of the second window after restarting recording of the second window. In other words, the recording end moment of the first video is the same as the recording end moment of the third video. Recording requirements of the user in different scenarios at different moments can be met according to the foregoing method, thereby improving user experience.

In some embodiments in this application, the electronic device may end recording of the second window again, and continue to record the image in the first window. In this case, the recording end moment of the third video is earlier than the recording end moment of the first video. It may be understood that the electronic device may choose to restart recording of the second window. In this case, the electronic device may eventually generate more than three videos, including one original video and at least three close-up videos.

In some embodiments of this application, "receiving the recording end operation" has a same meaning as "receiving a request for simultaneously ending large-window recording and small-window recording" (for example, step S800).

With reference to the first aspect, in a possible implementation, a select box is displayed on the one or more first objects. That the electronic device selects the second object from the one or more first objects may specifically include: The electronic device may receive an operation performed on the first select box, and determine, as the second object, a first object corresponding to the first select box.

In the solutions provided in this application, after recognizing the object included in the image in the first window, the electronic device may display, on the display, a select box corresponding to each object. In this way, the user may determine, by using the foregoing select box, each object recognized by the electronic device, select any one of the foregoing objects by using the foregoing select box, and consider the object as a focus tracking object.

In some embodiments of this application, the select box may be a body box mentioned below, for example, the body box 402, the body box 403, and the body box 404.

It may be understood that the first select box is a select box in the select box displayed on the one or more first objects.

In some embodiments of this application, after the select box is displayed on the one or more first objects, the method may further include that the select box disappears when no user operation performed on the display is detected in first duration.

It may be understood that the electronic device may detect an interaction event on the display after displaying the select box. If no interaction event acting on the display is detected in a preset time, for example, in the first duration, the electronic device may hide the select box. In this way, blocking of the select box on an image displayed on the display can be reduced, and calculation costs required for drawing the image can be reduced, thereby reducing power consumption.

It may be understood that the preset time (for example, the first duration) may be set according to an actual requirement. This is not limited in this application. For example, the preset time may be 3 s.

With reference to the first aspect, in a possible implementation, that the image displayed in the second window includes the second object may specifically include that a close-up object of the second object is displayed in the second window.

With reference to the first aspect, in a possible implementation, in the foregoing recording process, the method may further include: The electronic device may select a fourth object from the one or more first objects. The fourth object is different from the second object. A close-up image of the fourth object may be displayed in the second window.

In the solutions provided in this application, the user may switch a focus tracking target (that is, change the second object) at any time in the recording process. After the focus tracking target is switched, the electronic device may perform focus tracking on the newly selected focus tracking target, and display, in the second window, a close-up image of the newly selected focus tracking target. In the foregoing manner, in a recording process, the user may obtain close-up images of different focus tracking targets, or may obtain close-up images of a same focus tracking target in different time periods.

With reference to the first aspect, in a possible implementation, the electronic device may include a camera HAL. That the electronic device records the image in the first window to generate the first video, and records the image in the second window to generate the second video, by using the first encoder and the second encoder may specifically include: The camera HAL may process original image data based on image effect matching a first path of data stream to obtain first image data, and process, based on image effect matching a second path of data stream, the original image data to obtain second image data. The camera HAL may send the first image data to the first encoder, and further send the second image data to the second encoder. The first encoder may encode the first image data to obtain first encoded image data, and further write the first encoded image data into a first video file. The second encoder may encode the second image data to obtain second encoded image data, and further write the second encoded image data into a second video file. The first path of data stream is a data stream corresponding to the first window, and the second path of data stream is a data stream corresponding to the second window. The first video file is used to store the first video. The second video file is used to store the second video.

In the solutions provided in this application, in a process of recording the image displayed in the first window and the image displayed in the second window, the electronic device may perform different processing on the original image data by using the camera HAL, and separately send a processed image to the first encoder and the second encoder for encoding. Then, the first encoder and the second encoder write encoded images into different video files. In other words, the electronic device may simultaneously generate the two paths of data streams, and encode the image data in the two paths of data streams. An encoding process of the two paths of data streams are encoded and a process of finally writing into corresponding video files are mutually independent and do not affect each other. Therefore, the electronic device may simultaneously generate two paths of videos, to meet recording requirements of the user in different scenarios at different moments in a specific time period, thereby improving user experience.

It may be understood that the original image data indicates the original image captured by the camera.

In some embodiments of this application, the first path of data stream may be a large-window data stream mentioned below, and the second path of data stream may be a small-window data stream mentioned below.

In some embodiments of this application, the first image data may be large-window image data mentioned below, and the second image data may be small-window image data mentioned below. The first encoded image data may be encoded large-window image data mentioned below. The second encoded image data may be encoded small-window image data mentioned below.

In some embodiments of this application, the first video file may be a large-window video file mentioned below, and the second video file may be a small-window video file mentioned below.

With reference to the first aspect, in a possible implementation, the electronic device may include a camera mode module, an encoding control module, and a storage module. After the electronic device receives the recording end operation performed on the second window, the method may further include: The camera mode module may send first prompt information to the encoding control module. The first prompt information is used to prompt an end of recording of the second window. That the electronic device stops encoding of the second encoder, and generates the second video may specifically include that the encoding control module may send a stop request to the second encoder; the second encoder may stop encoding image data in a second path of data stream; the encoding control module may send first end information to the storage module; and the storage module may store the second video in the second video file, and generate a third video file based on a current system time. The first end information is used to prompt an end of recording of the second window. The third video file is used to store a video obtained after the image data in the second path of data stream is encoded.

In the solutions provided in this application, when the image in the first window and the image in the second window are recorded by using the electronic device, the user can freely determine the recording end moment of the first window and the recording end moment of the second window. For example, recording of the second window is first ended. Recording requirements of the user in different scenarios at different moments can be met according to the foregoing method, thereby improving user experience.

In some embodiments of this application, the first prompt information may be prompt information of ending small-window recording mentioned below.

In some embodiments of this application, the stop request sent by the encoding control module to the second encoder may be a request for stopping the second encoder mentioned below.

In some embodiments of this application, the first end information may be small-window recording end information mentioned below.

In some embodiments of this application, the third video file may be a newly created small-window video file (for example, step S705).

With reference to the first aspect, in a possible implementation, the electronic device may include a camera mode module, an encoding control module, and a camera HAL. After the electronic device newly selects the second object from the one or more first objects, the method may further include: The camera mode module may send second prompt information to the encoding control module. The second prompt information is used to prompt a restart of recoding of the second window. That the electronic device starts the second encoder may specifically include that the encoding control module may send an enabling request to the second encoder, and enable the second encoder. That the electronic device records the image in the second window by using the second encoder to generate the third video may specifically include that the camera HAL may process original image data based on image effect matching a second path of data stream to obtain second image data, and send the second image data to the second encoder; and the second encoder may encode the second image data to obtain second encoded image data, and write the second encoded image data into a third video file. The third video file is used to store the third video. A generating time of the third video file is later than a generating time of a file used to store the second video.

In the solutions provided in this application, after the electronic device first ends recording of the second window, the electronic device may further reselect the second object in response to an operation of reselecting the second object by the user. In this case, the electronic device may newly display the second window on the display, and enable the encoder to record the image in the second window to generate the third video. In this way, the electronic device can generate at least three videos: the first video, the second video, and the third video. A recording end moment of the second video is earlier than a recording end moment of the first video, and the recording end moment of the second video and that of the first video are both earlier than a recording start moment of the third video. Recording requirements of the user in different scenarios at different moments can be met according to the foregoing method, thereby improving user experience.

With reference to the first aspect, in a possible implementation, the electronic device may include a camera mode module, an encoding control module, and a storage module. After the electronic device receives the recording end operation, the method may further include: The camera mode module may send third prompt information to the encoding control module. The third prompt information is used to prompt an end of recording of the first window and an end of recording of the second window. That the electronic device stops encoding of the first encoder and encoding of the second encoder, and generates the first video and the second video may specifically include that the encoding control module may send a stop request to the first encoder, and send a stop request to the second encoder; the first encoder may stop encoding image data in a first path of data stream; the second encoder stops encoding image data in a second path of data stream; the encoding control module sends second end information to the storage module; and the storage module may store the first video in the first video file and the second video in the second video file, and generate a fourth video file and a third video file based on a current system time. The second end information is used to prompt an end of recording of the first window and an end of recording of the second window. The fourth video file is used to store a video obtained after the image data in the first path of data stream is encoded. The third video file is used to store a video obtained after the image data in the second path of data stream is encoded.

In the solutions provided in this application, when the image in the first window and the image in the second window are recorded by using the electronic device, the user can freely determine the recording end moment of the first window and the recording end moment of the second window. For example, recording of the first window and recording of the second window simultaneously end. Recording requirements of the user in different scenarios at different moments can be met according to the foregoing method, thereby improving user experience.

In some embodiments of this application, the third prompt information may be prompt information of ending large-window recording and small-window recording mentioned below.

In some embodiments of this application, the stop request sent by the encoding control module to the first encoder may be a request for stopping the first encoder mentioned below. The stop request sent by the encoding control module to the second encoder may be a request for stopping the second encoder mentioned below.

In some embodiments of this application, the second end information may be small-window and large-window recording end information mentioned below.

In some embodiments of this application, the third video file may be a newly created small-window video file. The fourth video file may be a newly created large-window video file (for example, step S807).

With reference to the first aspect, in a possible implementation, before the storage module in the electronic device stores the second video in the second video file, the method may further include: The storage module may update a timestamp of the second video file to a current system time.

In the solutions provided in this application, the electronic device may update the timestamp of the second video file to the current system time, so that a timestamp corresponding to the second video is later than a timestamp corresponding to the first video. This means that when the electronic device displays a thumbnail of the first video and a thumbnail of the second video in a gallery, a position of the thumbnail of the first video is before a position of the thumbnail of the second video. It indicates that a generating time of the first video is later than a generating time of the second video. The electronic device may directly display the thumbnail of the first video and the thumbnail of the second video in the foregoing manner, and does not need to determine how to implement display because the generating times of the two videos are the same.

With reference to the first aspect, in a possible implementation, the electronic device may include a stream management module, a storage module, an encoding control module, and a camera HAL. After the electronic device receives the operation performed on the first control, the method may further include: The stream management module may configure the first path of data stream and the second path of data stream, and send stream configuration information to the encoding control module. The storage module may separately generate the first video file and the second video file based on a current system time, and send the file information to the encoding control module. The stream management module may send the stream configuration information to the camera HAL. The camera HAL may determine, based on the stream configuration information, image effect matching the first path of data stream and image effect matching the second path of data stream. The file information includes a file identifier of the first video file and a file identifier of the second video file.

With reference to the first aspect, in a possible implementation, the electronic device may include an encoding control module and an encoder. That the electronic device creates the first encoder and creates the second encoder may specifically include that the encoding control module may determine a first encoding parameter and a second encoding parameter based on stream configuration information and file information; the encoding control module may send the first encoding parameter and the second encoding parameter to the encoder; and the encoder may create the first encoder based on the first encoding parameter, and create the second encoder based on the second encoding parameter. The first encoding parameter is an encoder parameter corresponding to the first encoder. The first encoder is associated with a first path of data stream and the first video file. The second encoding parameter is an encoder parameter corresponding to the second encoder. The second encoder is associated with a second path of data stream and the second video file.

In the solutions provided in this application, the electronic device may configure the first path of data stream and the second path of data stream that respectively correspond to the first window and the second window, associate the two paths of data streams with different video files and encoders, and match different image effect, thereby implementing recording of the image displayed in the first window and recording of the image displayed in the second window. According to the foregoing method, the user can obtain videos of different framing ranges in a same photographing time, to meet personalized requirements of the user in different scenarios at different moments, thereby improving user experience.

In some embodiments of this application, the stream configuration information may include large-window stream configuration information and small-window stream configuration information (for example, step S511).

In some embodiments of this application, the file identifier of the first video file may be a file name of the first video file. The file identifier of the second video file may be a file name of the second video file. Certainly, the file identifier may be alternatively other content related to the video file (for example, a timestamp of the video file). This is not limited in this application.

According to a second aspect, this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method described in any one of the first aspect and the possible implementations of the first aspect.

According to a third aspect, an embodiment of this application provides a chip system. The chip system is used in an electronic device. The chip system includes one or more processors. The processor is configured to invoke computer instructions so that the electronic device performs the method described in any one of the first aspect and the possible implementations of the first aspect.

According to a fourth aspect, this application provides a computer-readable storage medium, including instructions. When the instructions are run on an electronic device, the electronic device is enabled to perform the method described in any one of the first aspect and the possible implementations of the first aspect.

According to a fifth aspect, this application provides a computer program product including instructions. When the computer program product is run on an electronic device, the electronic device is enabled to perform the method described in any one of the first aspect and the possible implementations of the first aspect.

It can be understood that the electronic device provided in the second aspect, the chip system provided in the third aspect, the computer storage medium provided in the fourth aspect, and the computer program product provided in the fifth aspect are all used to perform the method provided in this application. Therefore, for beneficial effects that can be achieved by the electronic device, the chip system, the computer storage medium, and the computer program product, refer to the beneficial effects in the corresponding method. Details are not described herein again.

BRIEF DESCRIPTION OF DRAWINGS

FIG. 5A, FIG. 5B, and FIG. 5C are a sequence diagram of a photographing method according to an embodiment of this application;

FIG. 6A(1) and FIG. 6A(2) are a sequence diagram of another photographing method according to an embodiment of this application;

FIG. 6B(1), FIG. 6B(2), and FIG. 6B(3) are a sequence diagram of another photographing method according to an embodiment of this application;

DESCRIPTION OF EMBODIMENTS

The following clearly describes the technical solutions in embodiments of this application with reference to the accompanying drawings in embodiments of this application. In the descriptions of embodiments of this application, unless otherwise stated, "/" represents "or". For example, A/B may represent A or B. In this application, "and/or" merely describes an association relationship between associated objects and represents that three relationships may exist. For example, A and/or B may represent the following three cases: Only A exists, both A and B exist, and only B exists. In addition, in the descriptions of embodiments of this application, "a plurality of" means two or more.

It should be understood that, in this specification, claims, and accompanying drawings of this application, terms "first", "second", and the like are intended to distinguish between different objects but do not indicate a particular order. In addition, terms "include", "have", and any variant thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" mentioned in this application means that a particular characteristic, structure, or feature described with reference to embodiments may be included in at least one embodiment of this application. The term appearing at various positions in this specification does not necessarily indicate a same embodiment, or an independent or alternative embodiment mutually exclusive with another embodiment. It is explicitly and implicitly understood by a person skilled in the art that embodiments described in this application may be combined with another embodiment.

This application provides a photographing method. The photographing method may be applied to an electronic device provided with a camera. According to the photographing method, in a photographing scenario in which a plurality of photographed objects are photographed together, the electronic device may perform focus tracking on one of the photographed objects, and perform targeted close-up recording on the photographed object, to generate an original video and a focus tracking video. In some embodiments of this application, the electronic device may obtain one original video and a plurality of focus tracking videos through photographing.

Figure 1:
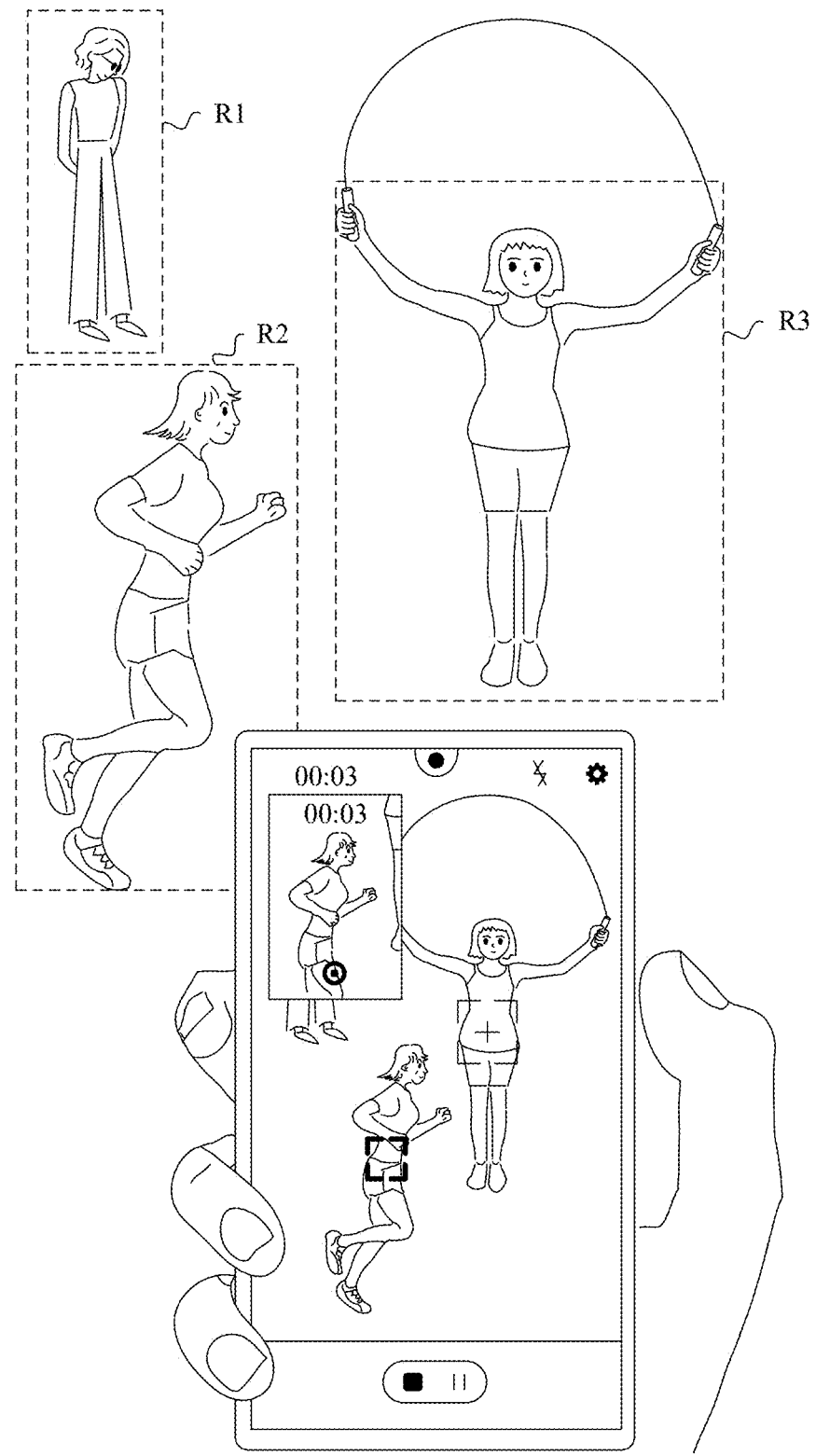
FIG. 1 is a schematic diagram of a photographing scenario according to an embodiment of this application.

FIG. 1 is a schematic diagram of a photographing scenario according to an embodiment of this application.

As shown in FIG. 1, there are a plurality of persons in a photographing environment: a person R1, a person R2, and a person R3. A user may determine that a photographing subject is the person R2, and perform photographing by using the electronic device. Because the photographing subject is in a moving state, an out-of-focus problem may occur. In addition, interference from another person (for example, the person R1 and the person R3) further exists in the photographing environment. Consequently, a focus shifting problem may also occur. To be specific, a focus is transferred from the person R2 to another person. In this case, the user may enable a focus tracking mode, and select the person R2 as a focus tracking target. After selecting the person R2 as the focus tracking target, the user may tap a recording start control on the electronic device to perform recording. As shown in FIG. 1, in a recording process, an original image (including images of the person R1, the person R2, and the person R3) captured by a camera based on an entire framing range is displayed in a large preview window on the electronic device. A small preview window may be further displayed in the large preview window. A close-up image of the focus tracking target (that is, the person R2) is displayed in the small preview window. It may be understood that, after recording is ended, the electronic device may generate two videos: an original video and a close-up video. The original video is a video formed based on the original image displayed in the large preview window. The close-up video is a video formed based on the close-up image of the focus tracking target displayed in the small preview window.

It may be understood that the photographing subject mentioned in this application indicates a mainly photographed object photographed by the user by using the electronic device. The framing range is related to a camera parameter (such as, a field of view or a focal length) of the electronic device.

It may be understood that the electronic device may be specifically a mobile phone, a tablet computer, a wearable device, an in-vehicle device, an augmented reality (Augmented Reality, AR) device/a virtual reality (Virtual Reality, VR) device, a notebook computer, an ultra-mobile personal computer (Ultra-Mobile Personal Computer, UMPC), a netbook, a personal digital assistant (Personal Digital Assistant, PDA), a dedicated camera (for example, a digital single lens reflex or a cube camera), or another device. A specific type of the electronic device is not limited in embodiments of this application.

A photographing scenario provided in this application is described below in detail with reference to schematic diagrams of a group of user interfaces.

It may be understood that terms "interface" and "user interface" in this specification, claims, and accompanying drawings of this application are medium interfaces that are used for interaction and information exchange between an application or an operating system and a user, and implement conversion between an internal form of information and a form that can be accepted by the user. The user interface is usually represented in a form of a graphical user interface (graphic user interface, GUI), which is a user interface displayed in a graphical mode and related to computer operations. The user interface may be an interface element such as an icon, a window, or a control displayed on a display of an electronic device. The control may include a visual interface element such as an icon, a button, a menu, a tab, a text box, a dialog box, a status bar, a navigation bar, or a widget.

1. Enter a Focus Tracking Mode (FIG. 2A to FIG. 2D).

Figure 2A:
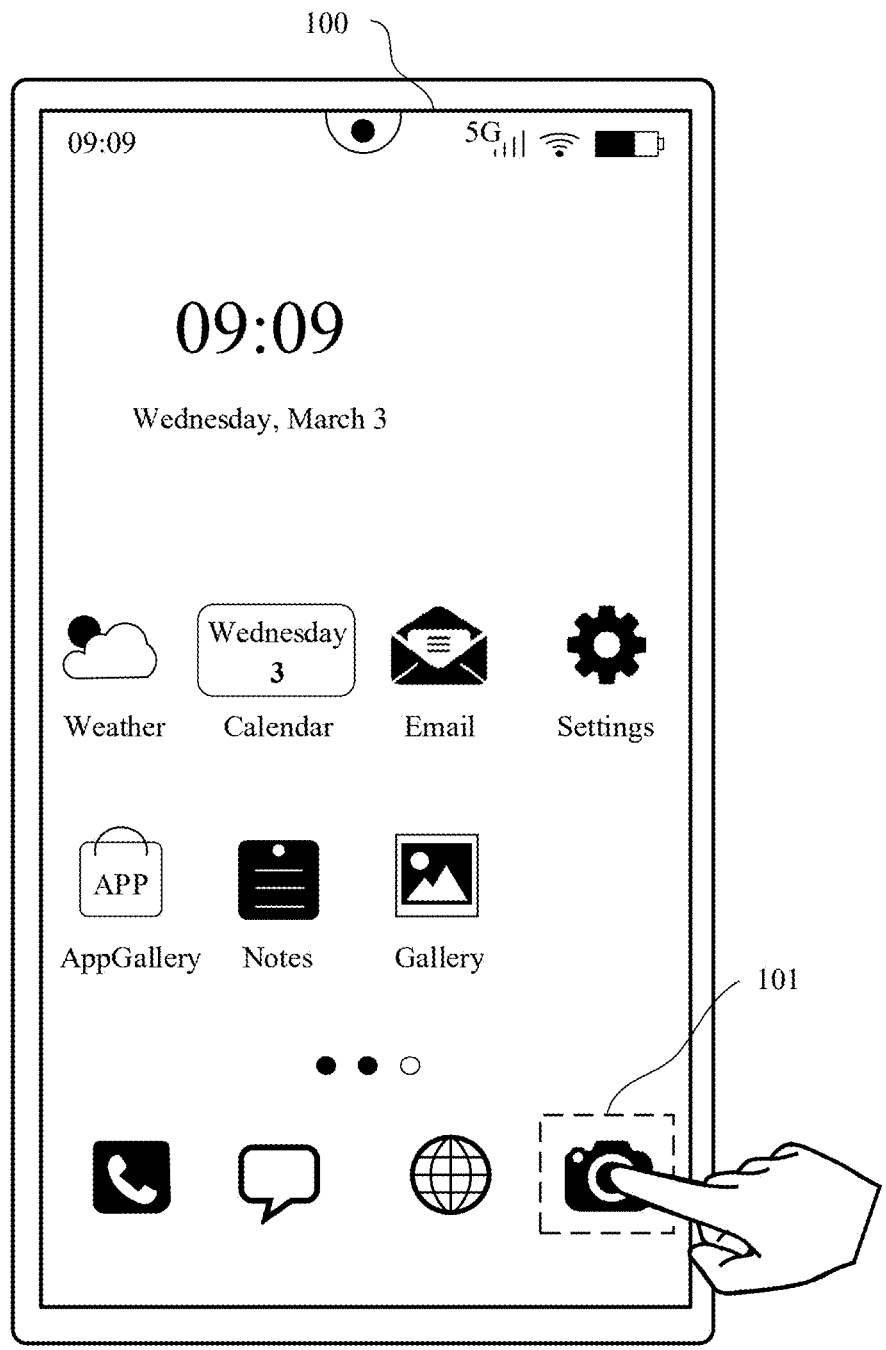
FIG. 2A to FIG. 2X are schematic diagrams of a group of user interfaces according to an embodiment of this application.

As shown in FIG. 2A, a user interface 100 displays a page with application icons. The page may include a plurality of application icons (for example, a weather application icon, a calendar application icon, a gallery application icon, a notes application icon, an email application icon, an App-Gallery icon, a settings application icon, and the like). Page indicators may also be displayed below the plurality of application icons, to indicate a positional relationship between a currently displayed page and other pages. There are a plurality of application icons (for example, a camera application icon 101, a browser application icon, a messages application icon, a phone application icon) below the page indicators. These application icons remain displayed during page switching.

It may be understood that the camera application icon 101 is an icon of a camera application (that is, a camera app). The camera application icon 101 may be used to trigger to start the camera application.

The electronic device may detect a user operation performed on the camera application icon 101. In response to the operation, the electronic device may display a user interface 200 shown in FIG. 2B. The user interface 200 is a photographing interface in a default photographing mode of the camera application. A user may preview an image on the interface and complete photographing.

It may be understood that the user operation mentioned in this application may include, but is not limited to, a touch (for example, a tap), voice control, a gesture, or the like. This is not limited in this application.

Figure 2B:
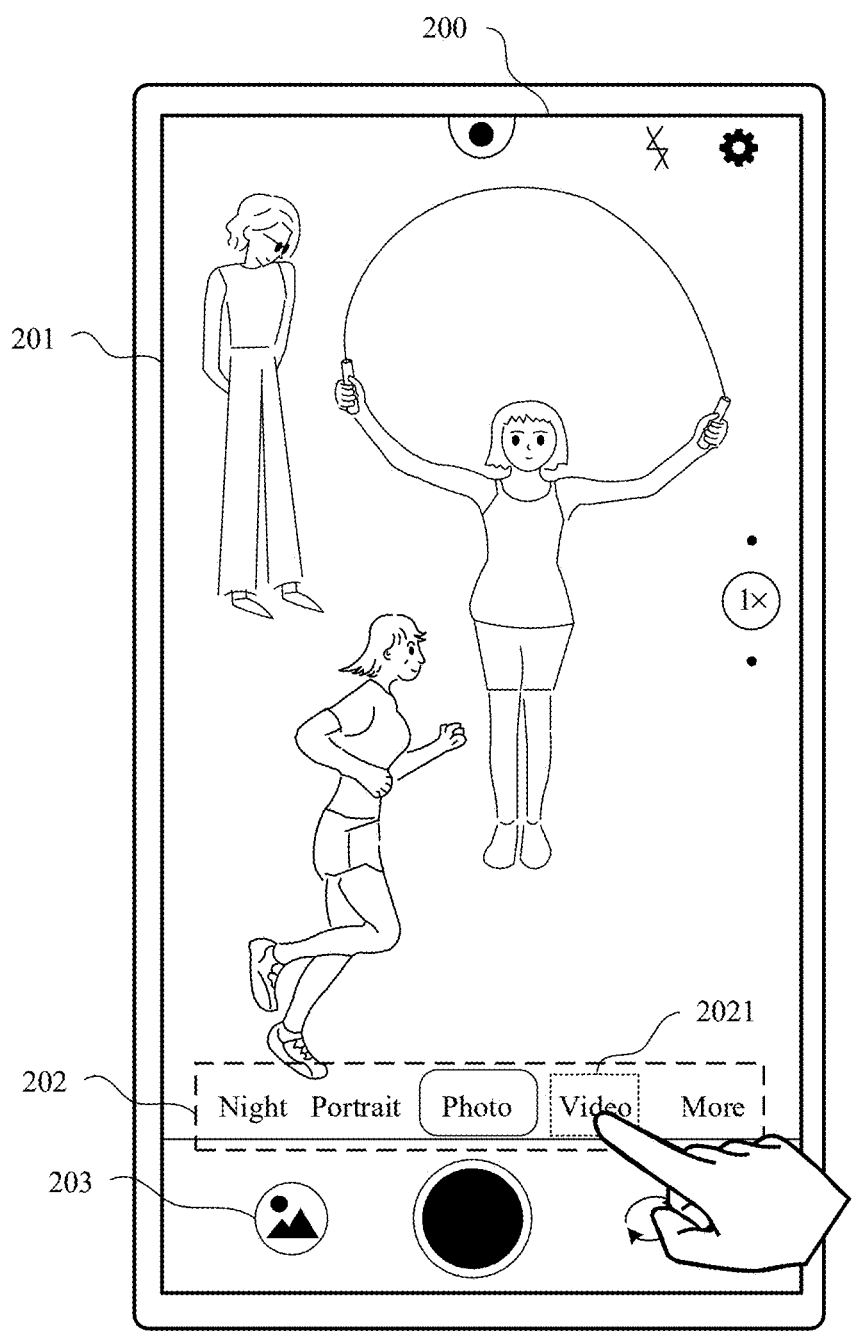

As shown in FIG. 2B, the user interface 200 may include a preview window 201, a camera mode option 202, a gallery shortcut control 203, a shutter control, and a camera flipping control.

The preview window 201 may be used to display a preview image. The preview image displayed in the preview window 201 is an original image captured by a camera of the electronic device based on a framing range.

One or more photographing mode options may be displayed in the camera mode option 202. The one or more photographing mode options may include a night mode option, an intelligent portrait mode option, a photo mode option, a video mode option 2021, and more options. It may be understood that the camera mode option 202 may include more or fewer photographing mode options.

The gallery shortcut control 203 may be used to open a gallery application. After the user triggers, by using the gallery shortcut control 203, the electronic device to open the gallery application, the user may view a photographed image and a photographed video. In addition, a thumbnail of the photographed image or video may be further displayed on the gallery shortcut control 203.

The electronic device may detect a user operation performed on the video mode option 2021. In response to the user operation, the electronic device may display a user interface 300 shown in FIG. 2C. The user interface 300 is a video preview interface of the camera application.

Controls included on the user interface 300 are approximately the same as the controls included on the user interface 200. A difference is that the user interface 300 may further include a focus tracking mode control 301 and a recording start control 302. The focus tracking mode control 301 may be used to trigger the electronic device to enter a focus tracking mode. The recording start control 302 is used to trigger the electronic device to start recording.

The electronic device may detect a user operation performed on the focus tracking mode control 301. In response to the user operation, the electronic device may display a user interface 400 shown in FIG. 2D. The user interface 400 is a video preview interface after the electronic device enters the focus tracking mode and before focus tracking is started.

The user interface 400 may include a display region 401, a preview window 201, a body box 402, a body box 403, and a body box 404. The display region 401 may include prompt information of enabling the focus tracking mode and operation prompt information of recording a close-up video. As shown in FIG. 2D, "Tap a body box to additionally generate a close-up video" and "Focus tracking mode enabled" are displayed in the display region 401. As shown in FIG. 2D, an image that includes a person R1, a person R2, and a person R3 may be displayed in the preview window 201. The body box 402 may be used to frame and select the person R1. The body box 403 may be used to frame and select the person R2. The body box 404 may be used to frame and select the person R3.

In some embodiments of this application, the electronic device may detect a user operation performed on the more options in the camera mode option 202. In response to the user operation, the electronic device may display more photographing mode options. These photographing mode options may include a focus tracking mode option. The electronic device may detect a user operation performed on the focus tracking mode option. In response to the user operation, the electronic device may display the user interface 400 shown in FIG. 2D.

It may be understood that the electronic device may enter the focus tracking mode in another manner. This is not limited in this application.

2. Select a Focus Tracking Target During Preview (FIG. 2E and FIG. 2F).

The electronic device may detect a user operation performed on the body box 403. In response to the user operation, the electronic device may display a user interface 500 shown in FIG. 2E. The user interface 500 is a video preview interface displayed when the electronic device is in the focus tracking mode and focus tracking is successful.

It may be understood that after detecting the user operation performed on the body box 403, the electronic device may determine that a focus tracking target is the person R2. After focus tracking is successful, the electronic device may lock a focus on the person R2.

The user interface 500 may include the preview window 201, a small preview window 501, a focus tracking body box 502, and the recording start control 302. It may be understood that the preview window 201 may be the large preview window mentioned above. The small preview window 501 may be the small preview window mentioned above.

The small preview window 501 is used to display a close-up image of a focus tracking target. In other words, compared with the image displayed in the preview window 201, main content of the image displayed in the small preview window 501 is about the focus tracking target. The small preview window 501 may include a control 5011 and a control 5012. The control 5011 is used to exit this time of focus tracking. The control 5012 is used to adjust a size of the small preview window 501. Specifically, the control 5012 may be used to adjust an aspect ratio of the small preview window 501.

The focus tracking body box 502 may be used to frame and select the focus tracking target. As shown in FIG. 2E, the focus tracking body box is used to frame and select the person R2.

It may be understood that the small preview window 501 may be displayed in a floating manner in the preview window 201. In some embodiments of this application, the user may drag the small preview window 501, so that the small preview window 501 can float in any region of the preview window 201.

The electronic device may detect a user operation performed on the control 5012. In response to the user operation, the electronic device may display a user interface 600 shown in FIG. 2F. Controls included on the user interface 600 are approximately the same as the controls included on the user interface 500. A difference is that a size of the small preview window 501 on the user interface 600 is different from that of the small preview window on the user interface 500.

In some embodiments of this application, an aspect ratio of the small preview window 501 on the user interface 600 is a reciprocal of the aspect ratio of the small preview window on the user interface 500.

It should be noted that a default size of the small preview window 501 may be set according to an actual requirement. This is not limited in this application.

It may be understood that, after focus tracking is started and focus tracking is successful, the electronic device may display the small preview window 501 shown in FIG. 2E by default, or may display the small preview window 501 shown in FIG. 2F by default.

Certainly, the user interface 500 may further include a body box that is used to frame and select a person who is not selected as a focus tracking target.

In some embodiments of this application, after the user selects the focus tracking target and taps a corresponding body box, if the user does not switch the focus tracking target within a period of time, the electronic device may hide another body box that is not selected.

Figure 2C:
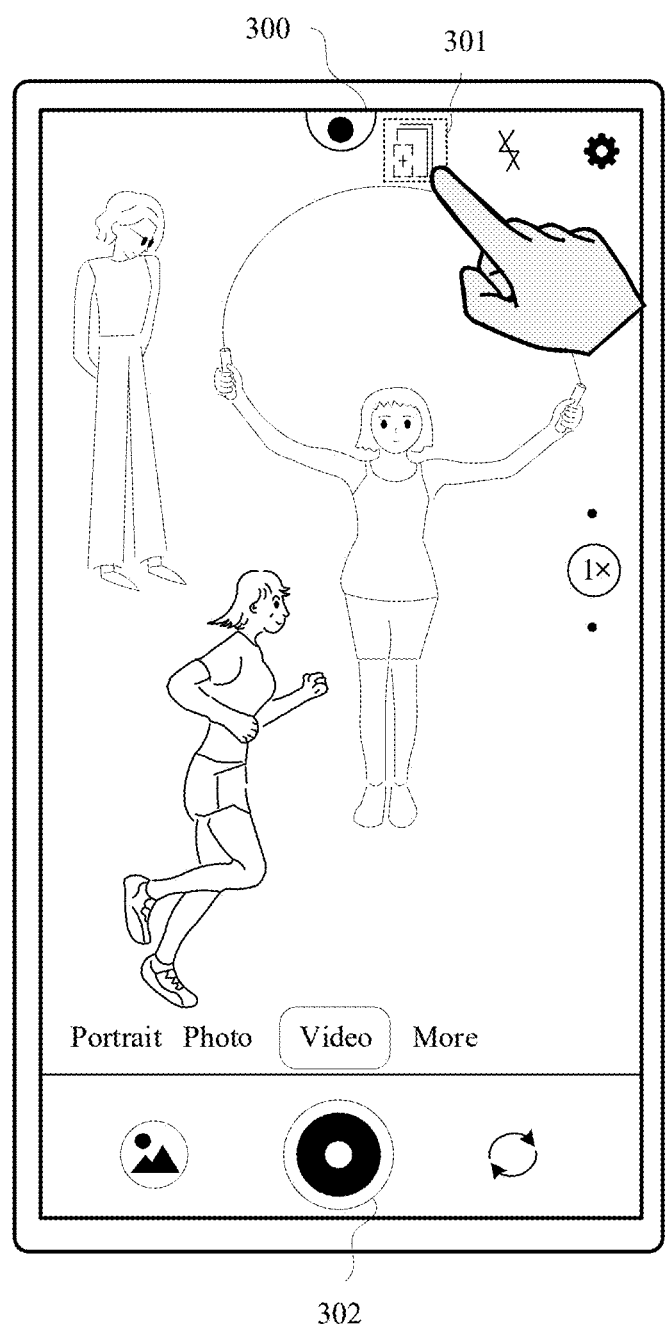
Figure 2D:
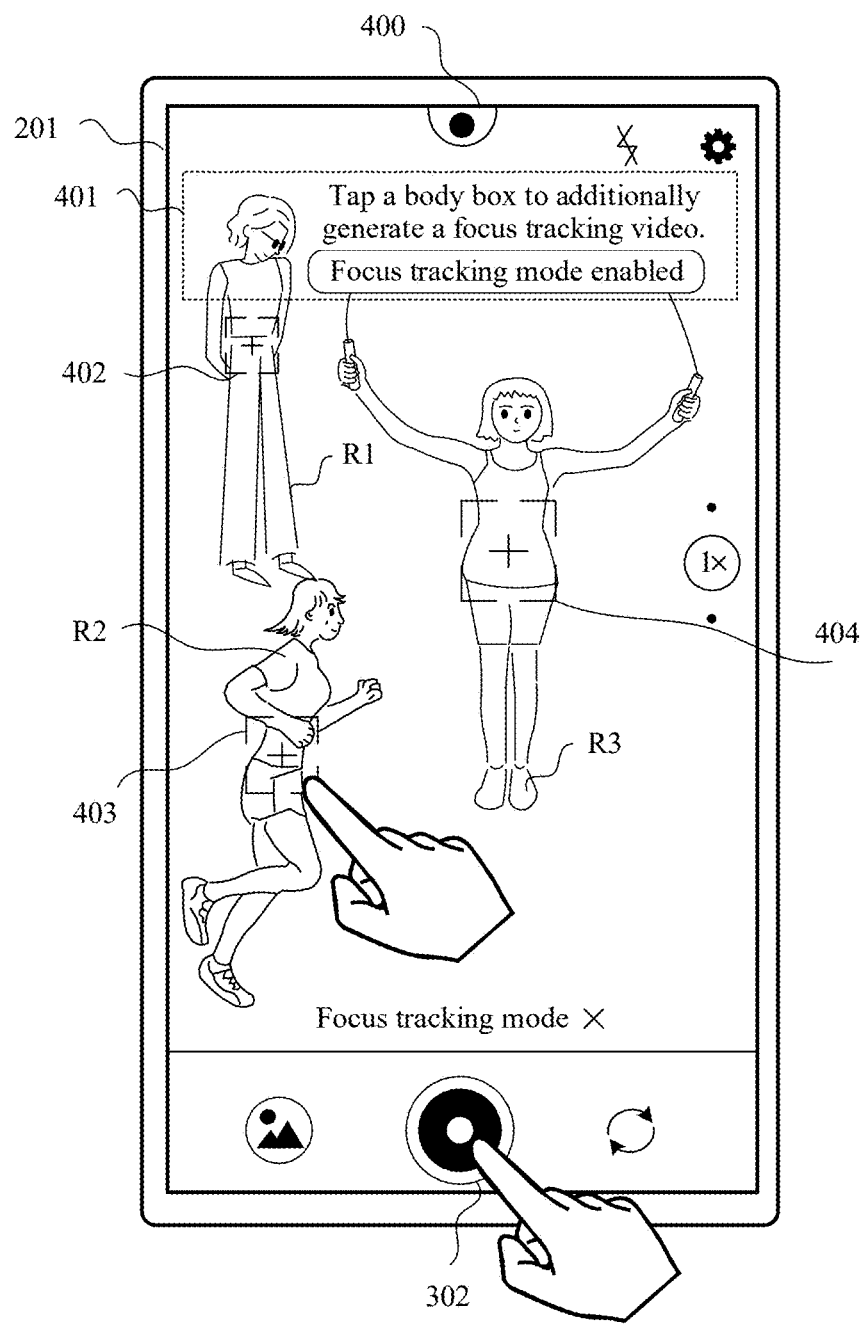
Figure 2E:
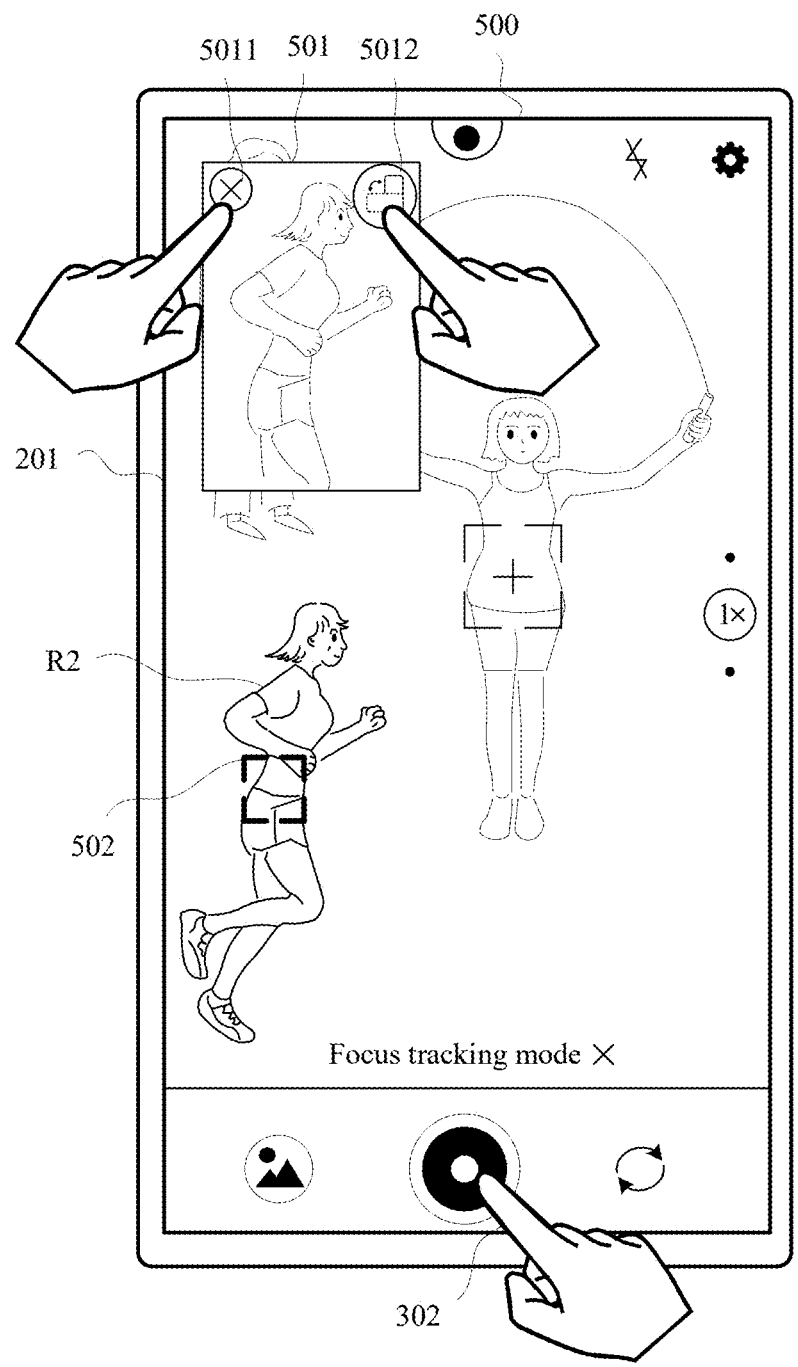
Figure 2F:
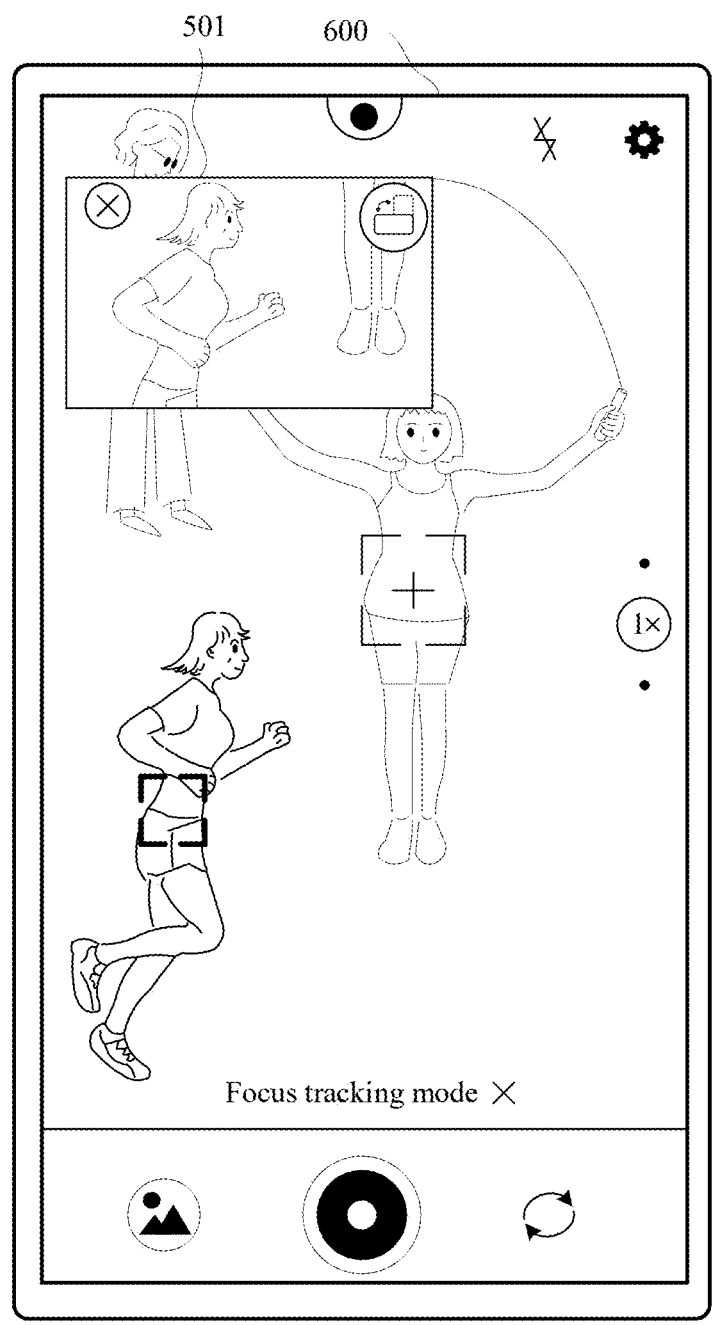

3. When the Focus Tracking Target is Lost During Preview, Exit Focus Tracking and Find the Focus Tracking Target (FIG. 2G to FIG. 2I).

In some embodiments of this application, when the electronic device is in a video preview state in the focus tracking mode, because the focus tracking target is away from the electronic device or exceeds the framing range of the electronic device, the electronic device may lose the focus tracking target, that is, cannot detect the focus tracking target. It may be understood that the framing range of the electronic device is related to a field of view and a focal length.

Figure 2G:
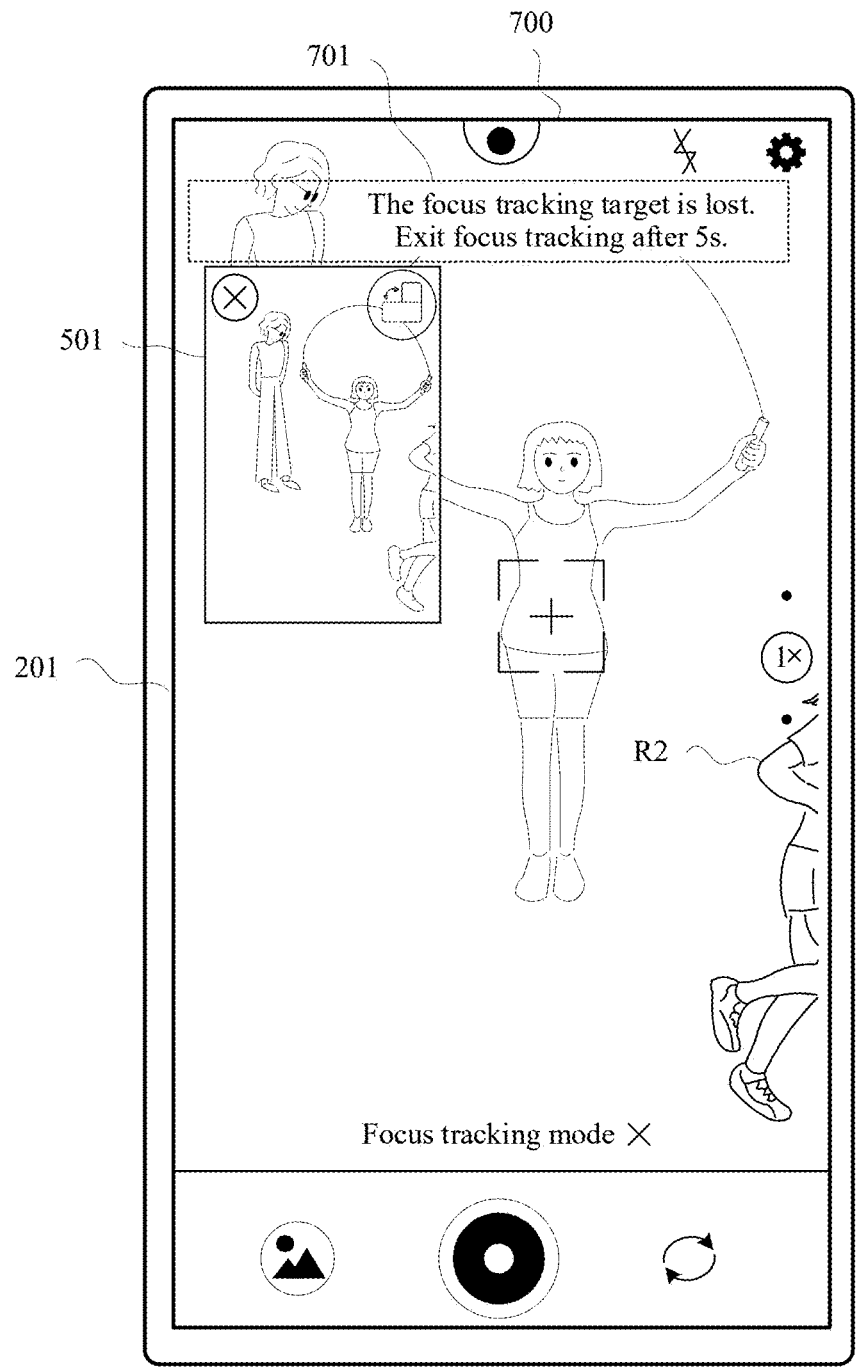
Figure 2H:
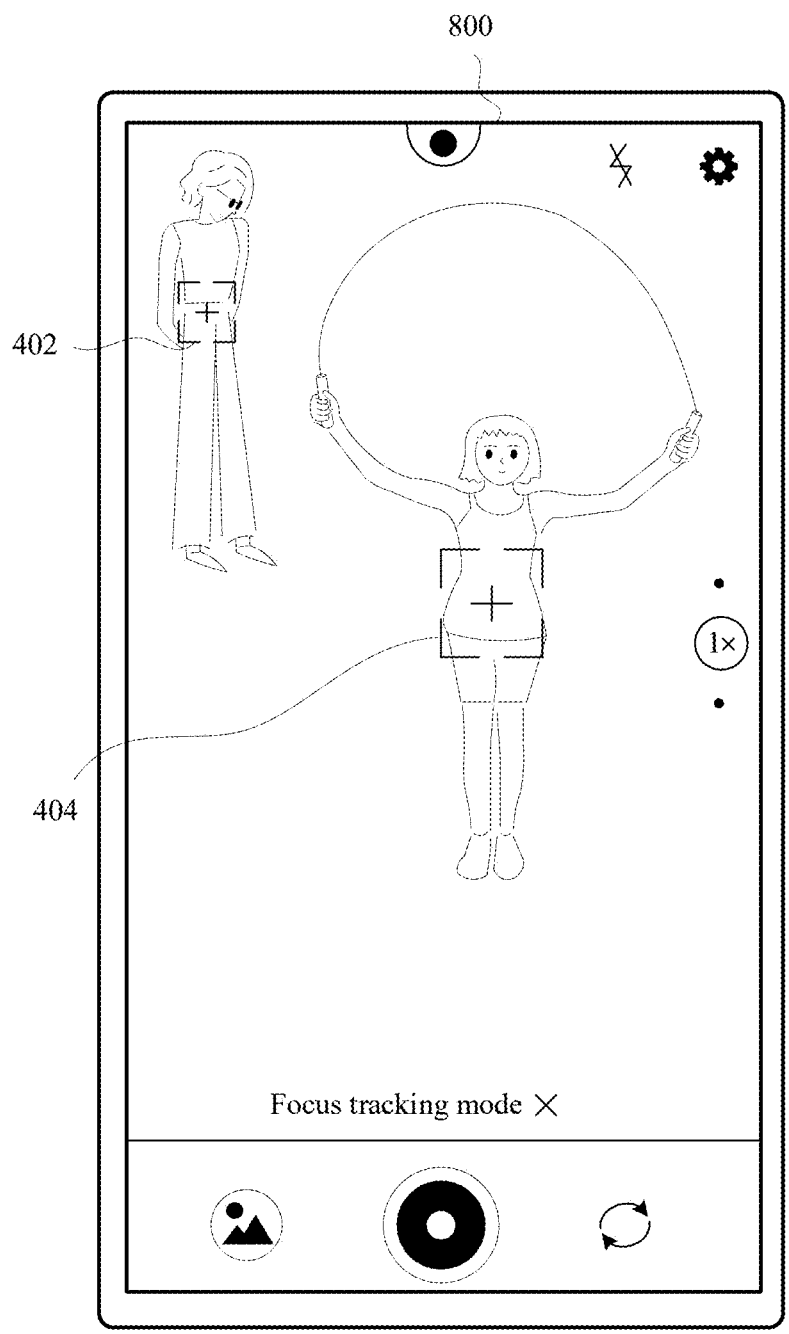
Figure 2I:
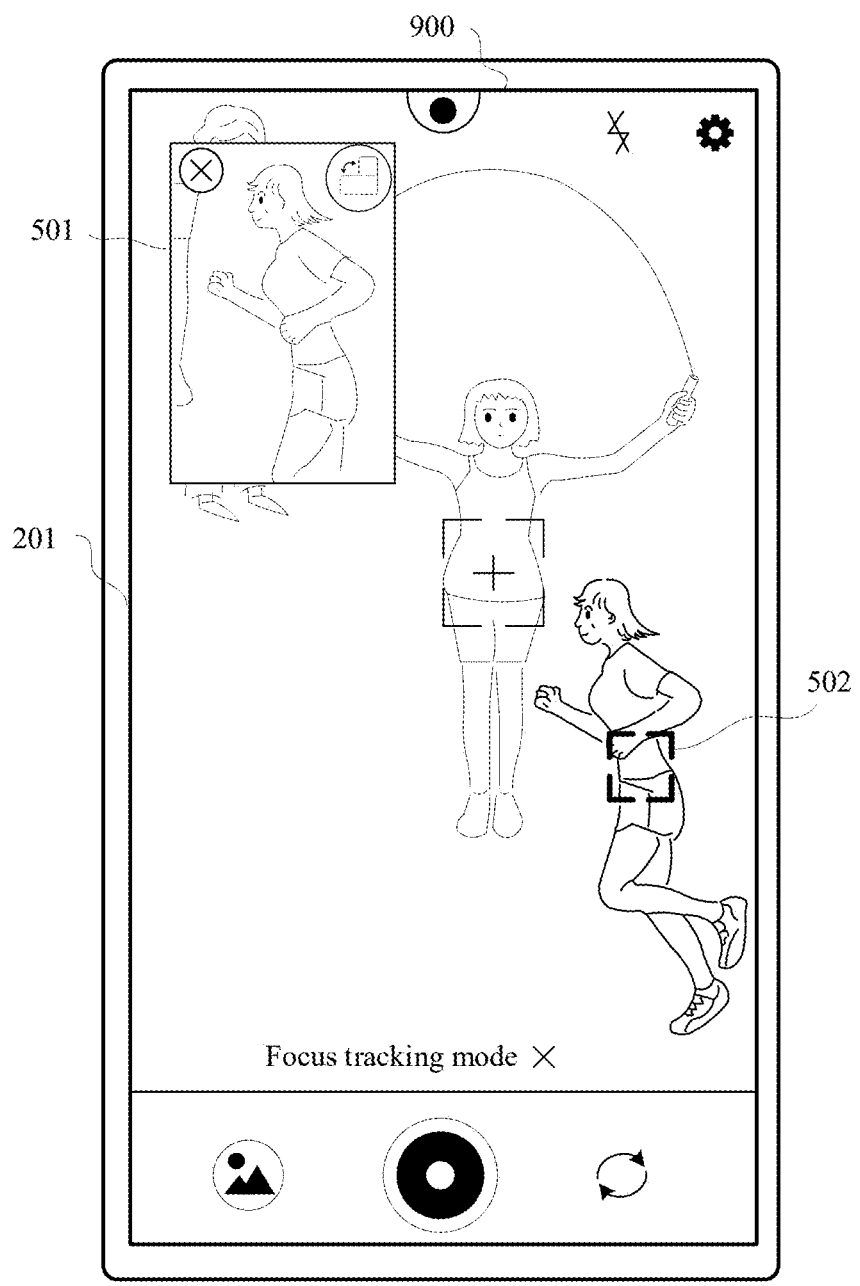

As shown in FIG. 2G, the electronic device may display a user interface 700. The user interface 700 may include a display region 701, the small preview window 501, and the preview window 201. Based on the image displayed in the preview window 201, the person R2 is about to fully exceed the framing range of the electronic device. In this case, the electronic device cannot detect the focus tracking target, and is in an unfocused state (that is, loses the focus tracking target). In this case, the small preview window 501 may continuously display the original image in a period of time (for example, 5 s). In other words, the image displayed in the small preview window 501 may be the same as that displayed in the preview window 201 in preset unfocused duration (for example, 5 s). Once continuous unfocusing exceeds the preset duration, the small preview window 501 is closed. In other words, the electronic device exits this time of focus tracking.

In some embodiments of this application, after the electronic device loses the focus tracking target, a final frame of image displayed in the small preview window 501 before unfocusing may be continuously displayed in the small preview window 501 in a period of time (for example, 5 s).

Prompt information about unfocusing and an exit from focus tracking may be displayed in the display region 701. As shown in FIG. 2G, "The focus tracking target is lost. Exit focus tracking after 5 s." may be displayed in the display region 701. It should be noted that the exit from focus tracking mentioned herein indicates closing of a display window (that is, the small preview window 501) of the close-up image of the focus tracking target, instead of an exit from the focus tracking mode.

It may be understood that the electronic device automatically exits focus tracking after the focus tracking target is lost for 5 s. As shown in FIG. 2H, the electronic device may display a user interface 800. The user interface 800 is an interface displayed after the electronic device exits focus tracking. The user interface 800 may include the body box 402 and the body box 404. In this case, the user may newly select a focus tracking target and tap a corresponding body box, or wait for the original focus tracking target to enter the framing range of the electronic device again.

It may be understood that a time interval between a start of unfocusing of the electronic device to the exit from focus tracking may be alternatively another value, for example, 2 s, 3 s, or 6s. The time interval may be set according to an actual requirement. This is not limited in this application.

In some embodiments of this application, after the electronic device loses the focus tracking target, the user does not switch the focus tracking target. In this case, in preset duration after unfocusing, the electronic device may find the focus tracking target again, and display the close-up image of the focus tracking target in the small preview window again.

As shown in FIG. 2G, the electronic device loses the focus tracking target, and the final frame of image displayed in the small preview window 501 before unfocusing is displayed in the small preview window 501. In addition, "The focus tracking target is lost. Exit focus tracking after 5 s." may be displayed in the display region 701. In this case, if the electronic device finds the focus tracking target again within 5 s, the electronic device may display the small preview window 501 again. As shown in FIG. 2I, the electronic device may display a user interface 900. Based on the image displayed in the preview window 201, the person R2 appears in the framing range of the electronic device again. In this case, the electronic device may detect the focus tracking target again, and display the small preview window 501 and the focus tracking body box 502.

4. Record, Pause, Store, and View a Video in a State in which Focus Tracking is Successful (FIG. 2J to FIG. 2N).
(1) Simultaneously Enable Large-Window Recording and Small-Window Recording.

The electronic device may detect the user operation performed on the recording start control 302 included on the user interface 500 shown in FIG. 2E. In response to the user operation, the electronic device may start video recording.

Figure 2J:
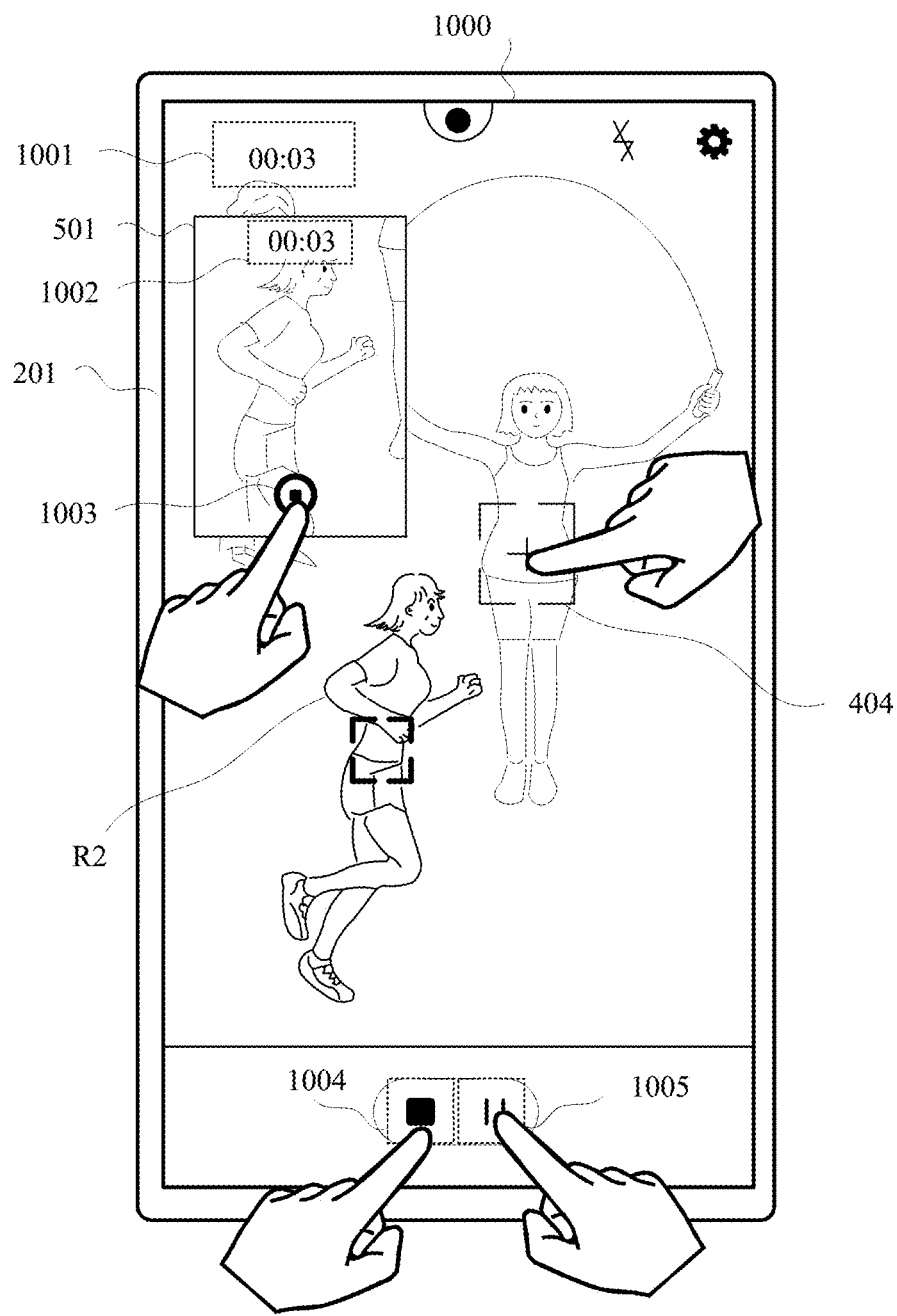

As shown in FIG. 2J, the electronic device may display a user interface 1000. The user interface 1000 may include a display region 1001, the small preview window 501, a recording end control 1004, and a recording pause control 1005.

The display region 1001 is used to display a video recording time corresponding to the preview window 201, that is, a recording time of an original video. As shown in FIG. 2I, a video recording time corresponding to the preview window 201 is "00:03". In other words, the recording time of the original video is 3 s.

It may be understood that after the electronic device starts video recording in the focus tracking mode, the control 5011 and the control 5012 may be hidden in the small preview window 501. As shown in FIG. 2J, the small preview window 501 may include a display region 1002 and a recording end control 1003.

The display region 1002 is used to display a video recording time corresponding to the small preview window 501, that is, a recording time of a close-up video. Consistent with the video recording time displayed in the display region 1001, the video recording time displayed in the display region 1002 is also "00:03". In other words, the recording time of the original video is 3 s, and the recording time of the close-up video is also 3s.

It should be noted that for related meanings of the original video and the close-up video, reference may be made to the foregoing description. Details are not described herein again.

The recording end control 1003 is used to end recording of the video (that is, the close-up video) corresponding to the small preview window 501. The recording end control 1004 is used to end recording of the video (that is, the original video) corresponding to the preview window 201. The recording pause control 1005 is used to pause recording of the original video.

In some embodiments of this application, once the electronic device pauses recording of the original video, recording of the close-up video is also stopped. Accordingly, once the electronic device continues to record the original video, recording of the close-up video continues.

Figure 2K:
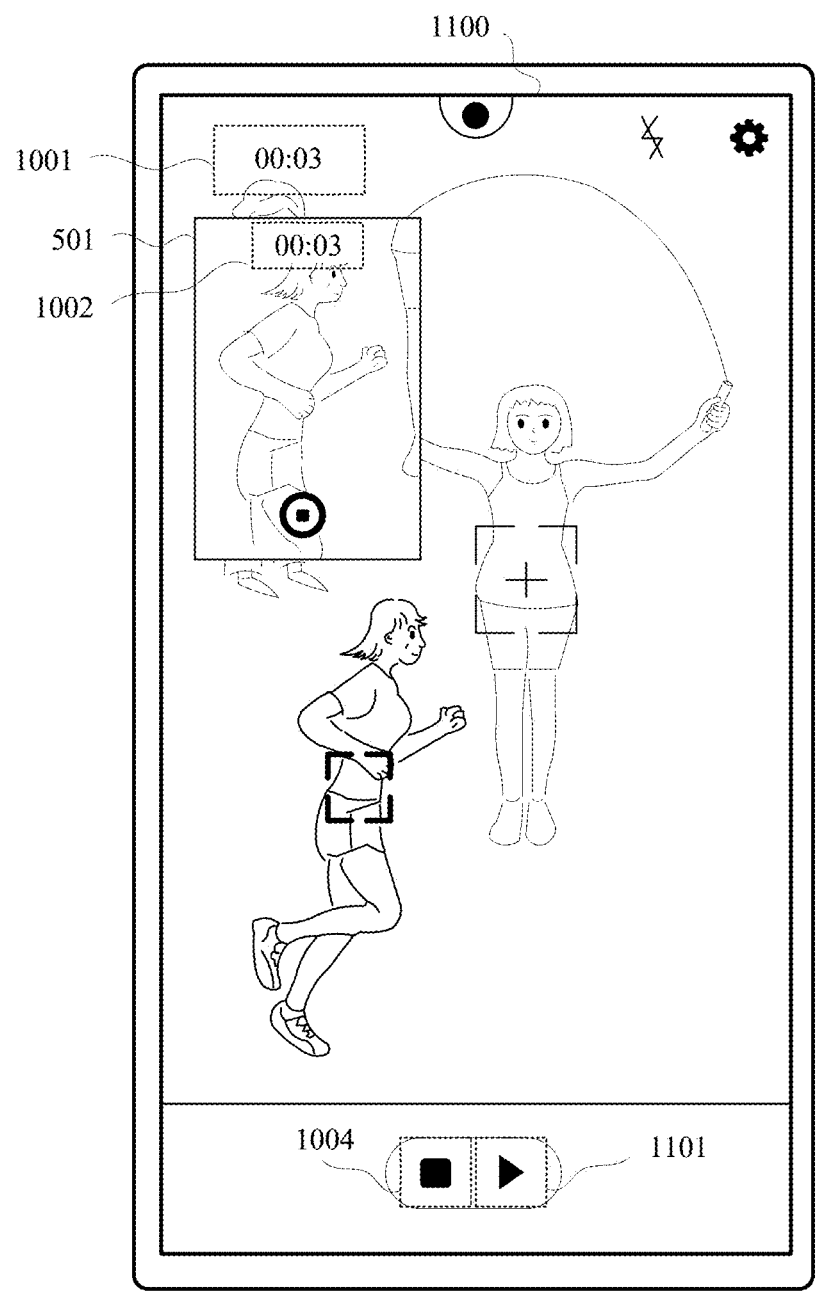
Figure 2L:
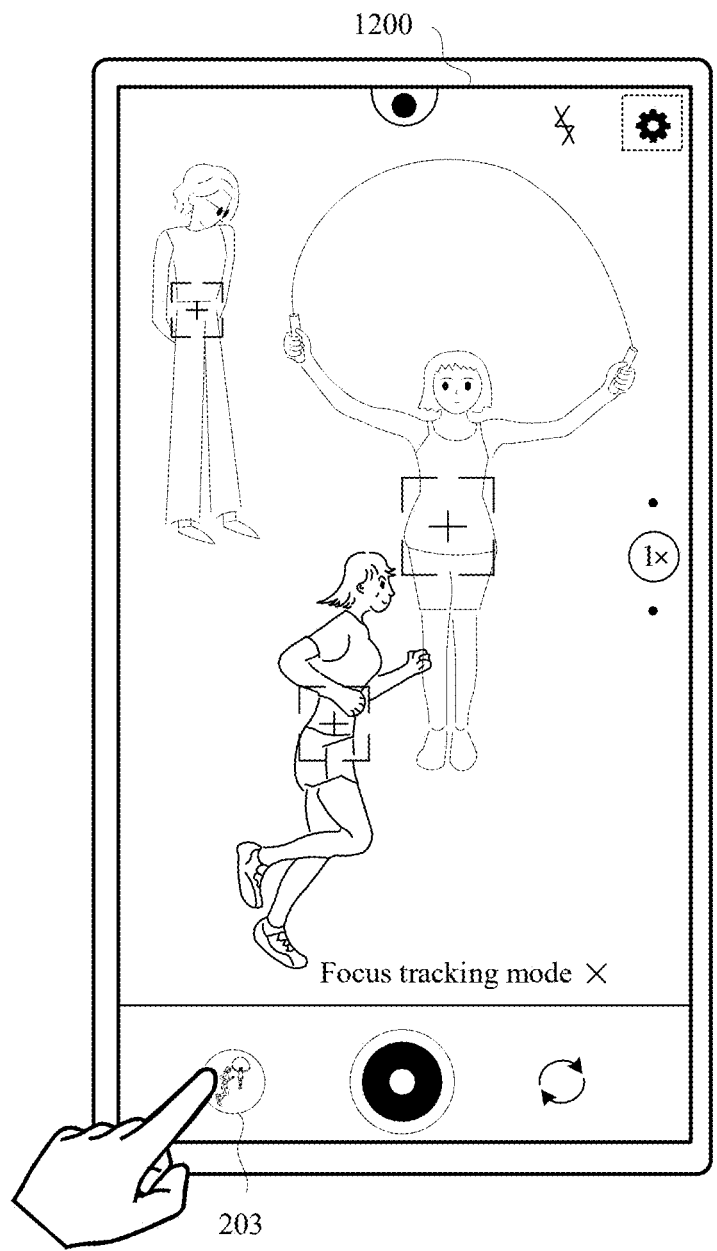
Figure 2M:
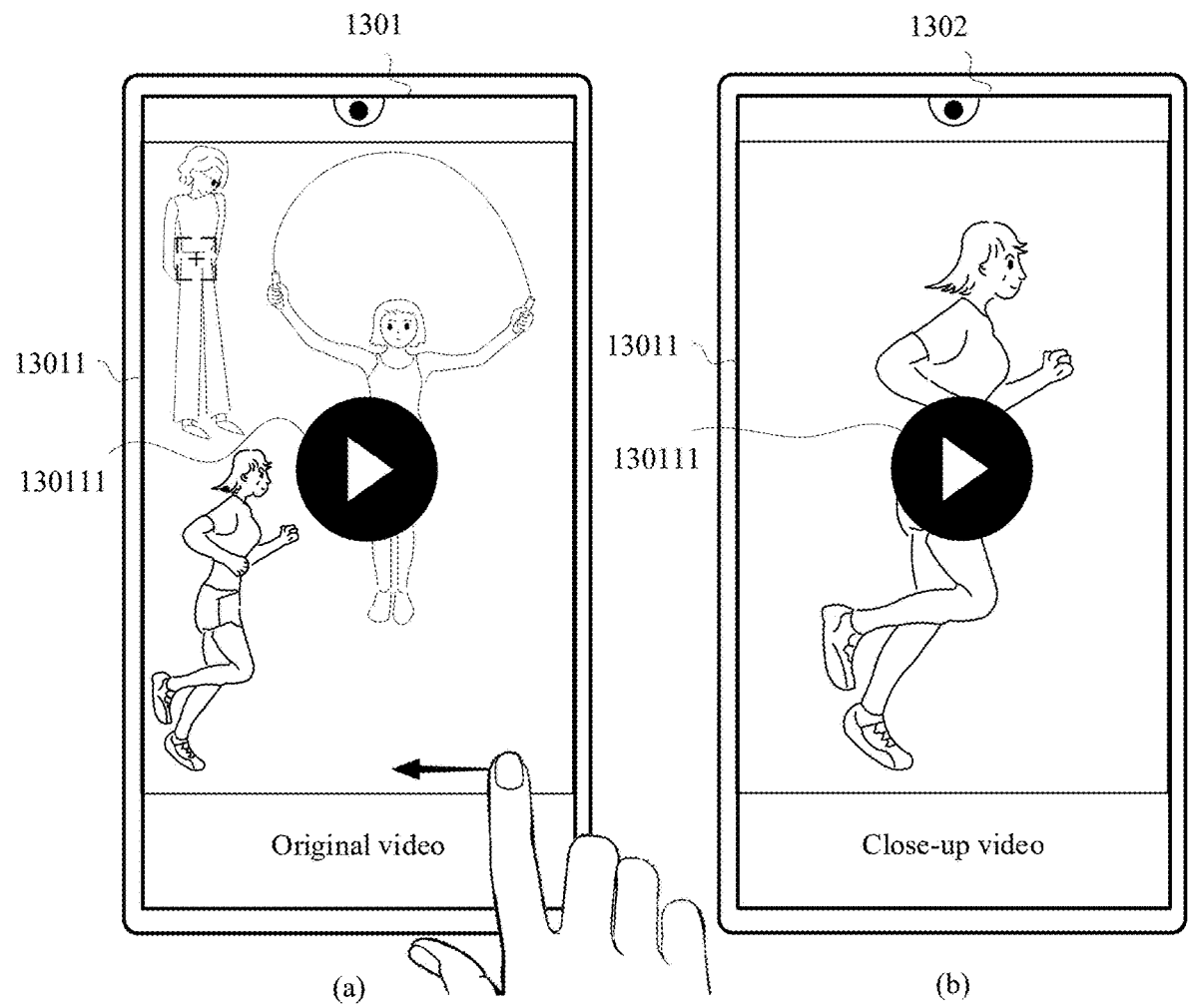

For example, the electronic device may detect a user operation performed on the recording pause control 1005. In response to the user operation, the electronic device may display a user interface 1100 shown in FIG. 2K. Controls included on the user interface 1100 are approximately the same as the controls included on the user interface 1000. A difference is that the user interface 1100 may include a video continue control 1101. The video continue control 1101 is used to continue recording of the original video. As shown in FIG. 2K, the video recording times displayed on the display region 1001 and the display region 1002 included on the user interface 1100 both stay at "00:03". This means that recording of the original video and recording of the close-up video are both paused.

In some embodiments of this application, if the electronic device pauses recording of the close-up video, recording of the original video is not paused.

In some embodiments of this application, the small preview window 501 may also include a recording pause control. The recording pause control may be used to pause recording of the close-up video. In this case, once the electronic device detects the user operation performed on the recording pause control included in the small preview window 501, the electronic device may pause recording of the close-up video in response to the user operation. The electronic device may continue to record the original video.

In some embodiments of this application, once the electronic device ends recording of the original video, recording of the close-up video is ended.

The electronic device may detect a user operation performed on the recording end control 1004 included on the user interface 1000. In response to the user operation, the electronic device may display a user interface 1200 shown in FIG. 2L. Controls included on the user interface 1200 are basically the same as the controls included on the user interface 400. A thumbnail of a first frame of image in the original video stored in the electronic device may be displayed on the gallery shortcut control 203 included on the user interface 1200.

The electronic device may detect a user operation performed on the gallery shortcut control 203 included on the user interface 1200. In response to the user operation, the electronic device may display a user interface 1301 shown in (a) in FIG. 2M. The user interface 1301 may include a display region 13011. The display region 13011 may include a control 130111. The electronic device may detect a user operation performed on the control 130111. In response to the user operation, the electronic device may play the original video. Correspondingly, an image in the original video may also be displayed in the display region 13011.

The electronic device may detect a leftward slide operation performed on the user interface 1301. In response to the user operation, the electronic device may display a user interface 1302 shown in (b) in FIG. 2M. Similar to the user interface 1301, the user interface 1302 may include a display region 13011, and the display region 13011 may include a control 130111. The electronic device may detect a user operation performed on the control 130111. In response to the user operation, the electronic device may play the close-up video. Correspondingly, an image in the close-up video may also be displayed in the display region 13011.

It may be understood that the user may view, in a gallery application, two videos stored after recording on the user interface 1000 is ended. As shown in (a) in FIG. 2N, the electronic device may display a user interface 1401. The user interface 1401 may include a video 14011 and a video 14012. Duration of the video 14011 and duration of the video 14012 are both 3 s. It may be understood that the video 14011 is an original video, and the video 14012 is a close-up video. In other words, duration of the original video is the same as duration of the close-up video.

In some embodiments of this application, if the electronic device ends recording of the original video, recording of the close-up video does not end. In this case, once the electronic device detects the user operation performed on the recording end control 1003, the electronic device may end recording of the close-up video in response to the user operation.

(2) Enable Small-Window Recording after Large-Window Recording.

The electronic device may detect the user operation performed on the recording start control 302 included on the user interface 400 shown in FIG. 2D. In response to the user operation, the electronic device may start video recording.

Figure 2O:
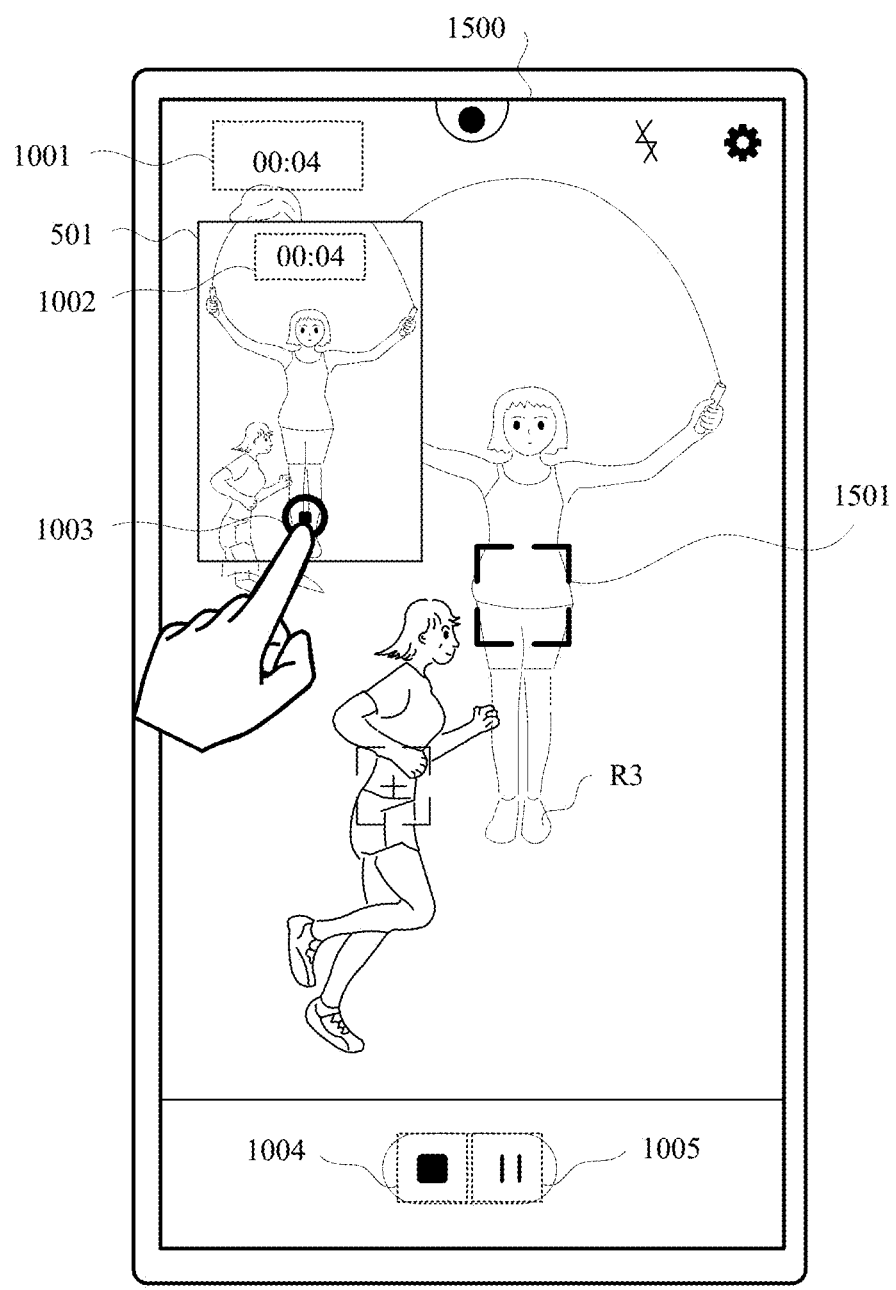
Figure 2P:
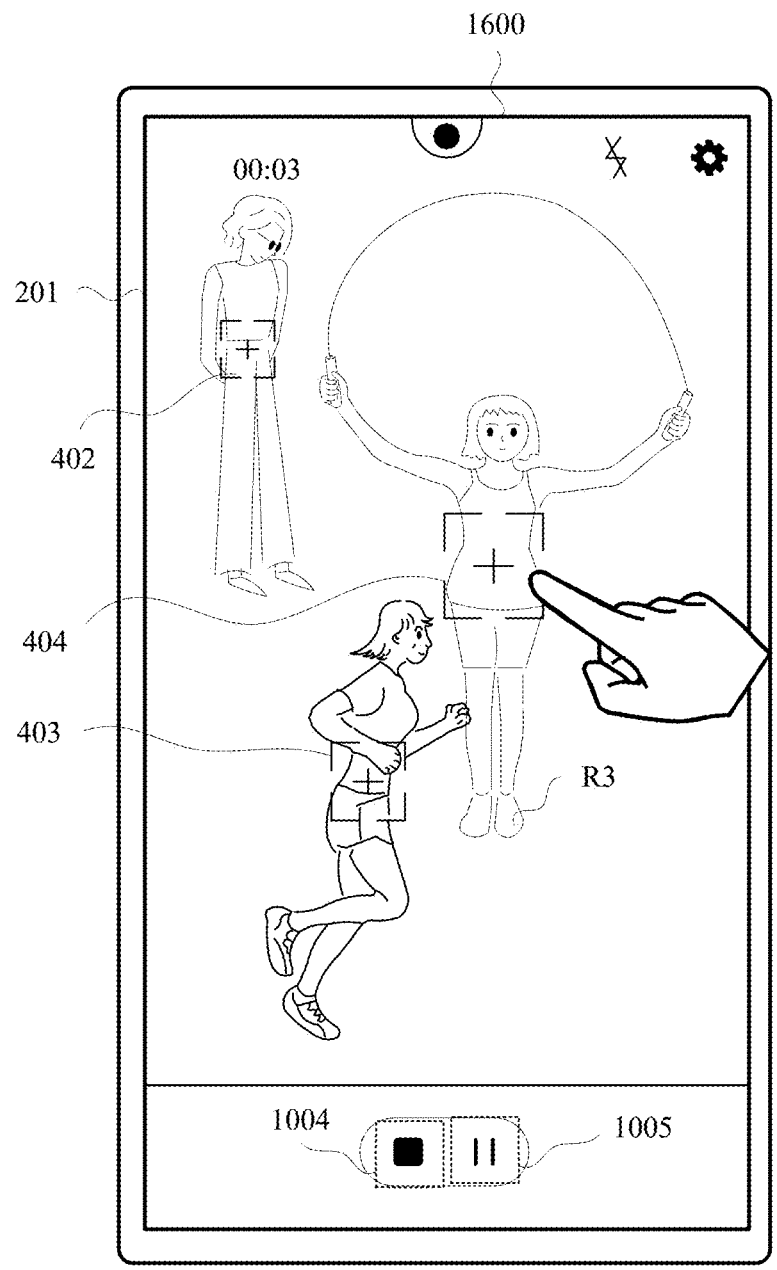

As shown in FIG. 2P, the electronic device may display a user interface 1600. The user interface 1600 may include the preview window 201, the recording end control 1004, and the recording pause control 1005. A video recording time corresponding to the preview window 201 is "00:03". In other words, the recording time of the original video is 3 s.

The electronic device may detect a user operation performed on the body box 404 included on the user interface 1600 shown in FIG. 2P. In response to the user operation, the electronic device may determine that a person (that is, the person R3) framed and selected by the body box 404 is a focus tracking target. The electronic device may record a close-up video of the person R3.

Figure 2Q:
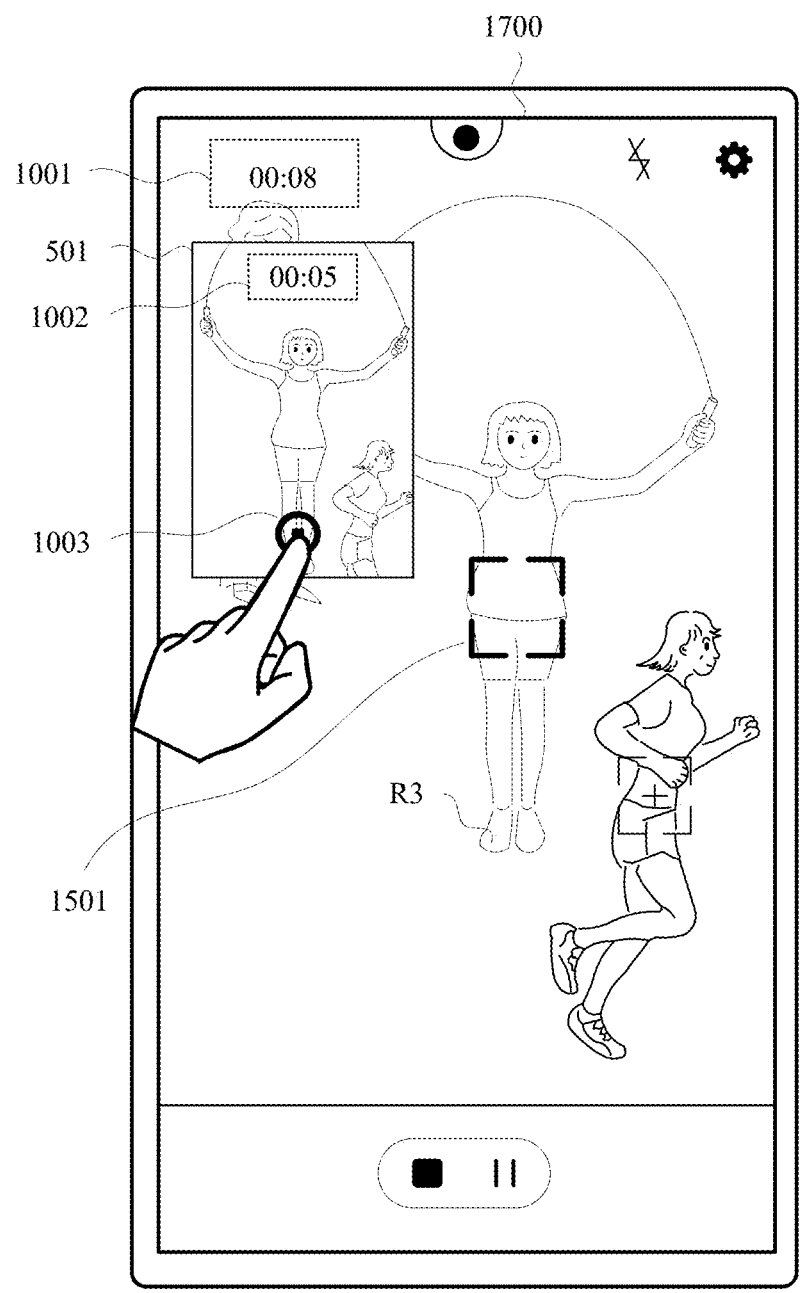

As shown in FIG. 2Q, the electronic device may display a user interface 1700. The user interface 1700 may include the preview window 201, the small preview window 501, the recording end control, and the recording pause control. A video recording time displayed in the display region 1001 included on the user interface 1700 is "00:08", and a video recording time displayed in the display region 1002 in the small preview window 501 is "00:05". In other words, the recording time of the original video reaches 8 s, while recording of the close-up video of the person R3 proceeds to only 5 s.

The electronic device may detect a user operation performed on the recording end control included on the user interface 1700. In response to the user operation, the electronic device may store the video recorded in the preview window 201 and the video recorded in the small preview window 501. It may be understood that the user may view the foregoing two stored videos in the gallery application. As shown in (b) in FIG. 2N, the electronic device may display a user interface 1402. The user interface 1402 may include a video 14021 and a video 14022. Duration of the video 14021 is 8 s, and duration of the video 14022 is 5 s. It may be understood that the video 14021 is an original video, and the video 14022 is a close-up video. In other words, duration of the original video is longer than duration of the close-up video.

5. Switch a Focus Tracking Target During Recording (FIG. 2O to FIG. 2Q).

(1) Switch the Focus Tracking Target when the Original Video and the Close-Up Video are Simultaneously Recorded (FIG. 2O).

The electronic device may detect a user operation performed on the body box 404 included on the user interface 1000 shown in FIG. 2J. In response to the user operation, the electronic device may display a user interface 1500 shown in FIG. 2O. Controls included on the user interface 1500 are approximately the same as the controls included on the user interface 1000. A difference is that the user interface 1500 may further include a focus tracking body box 1501, and a close-up image of the person R3 is displayed in the small preview window 501 on the user interface 1500. The focus tracking body box 1501 may be used to frame and select the focus tracking target. As shown in FIG. 2O, the focus tracking body box 1501 is used to frame and select the person R3. In other words, the focus tracking target has been switched from the person R2 to the person R3, and the electronic device succeeds in focus tracking.

It may be understood that, after the focus tracking target is switched, the user may end or pause video recording of the corresponding preview window through tapping the recording end control 1003, the recording end control 1004, and the recording pause control 1005. For details, refer to the foregoing descriptions. Details are not described herein again.

(2) Switch a Focus Tracking Target when Recording of the Close-Up Video is Ended but the Original Video is Recorded (FIG. 2P and FIG. 2Q).

The electronic device may detect the user operation performed on the recording end control 1003 included on the user interface 1000 shown in FIG. 2J. In response to the user operation, the electronic device may display the user interface 1600 shown in FIG. 2P. The user interface 1600 may include the body box 402, the body box 403, and the body box 404. It may be understood that the electronic device has ended recording of the close-up video whose focus tracking target is the person R2, but still records the original video.

The electronic device may detect the user operation performed on the body box 404 included on the user interface 1600 shown in FIG. 2P. In response to the user operation, the electronic device may newly determine that the person (that is, the person R3) framed and selected by the body box 404 is a focus tracking target. The electronic device may record the close-up video of the person R3.

As shown in FIG. 2Q, the electronic device may display the user interface 1700. The controls included on the user interface 1700 are basically the same as the controls included on the user interface 1500. The video recording time displayed in the display region 1001 included on the user interface 1700 is "00:08", and a video recording time displayed in the display region 1002 in the small preview window 501 is "00:05". In other words, the recording time of the original video reaches 8 s, while recording of the close-up video of the person R3 proceeds to only 5 s.

6. Lose the Focus Tracking Target and Find the Focus Tracking Target During Recording (FIG. 2R to FIG. 2X).

Similar to a case in which the focus tracking target is lost during preview, in some embodiments of this application, when the electronic device is in a recording state in the focus tracking mode, because the focus tracking target is away from the electronic device or exceeds the framing range of the electronic device, the electronic device may lose the focus tracking target, that is, cannot detect the focus tracking target. In this case, the electronic device may continue to record the original video, and perform corresponding processing on recording of the close-up video.

(1) Manner 1 (FIG. 2R to FIG. 2V)

In some embodiments of this application, the electronic device continues to record the original video and the close-up video in a period of time after unfocusing. In this period of time, the image in the close-up video recorded by the electronic device is the same as the image in the original video. After the period of time expires, if the focus tracking target is still not found, and the user does not switch the focus tracking target, the electronic device may continue to record the original video, and pause recording of the close-up video.

As shown in FIG. 2J, the electronic device may record the original video and the close-up video of the person R2. In a recording process, the electronic device may display a user interface 1800 shown in FIG. 2R. Based on the image displayed in the preview window 201, the person R2 is about to fully exceed the framing range of the electronic device. In this case, the electronic device cannot detect the focus tracking target, and is in an unfocused state. In this case, the small preview window 501 may continuously display the original image in a period of time (for example, 5 s). In other words, the image displayed in the small preview window 501 may be the same as that displayed in the preview window 201 in an unfocused period of time (for example, 5 s).

Figure 2R:
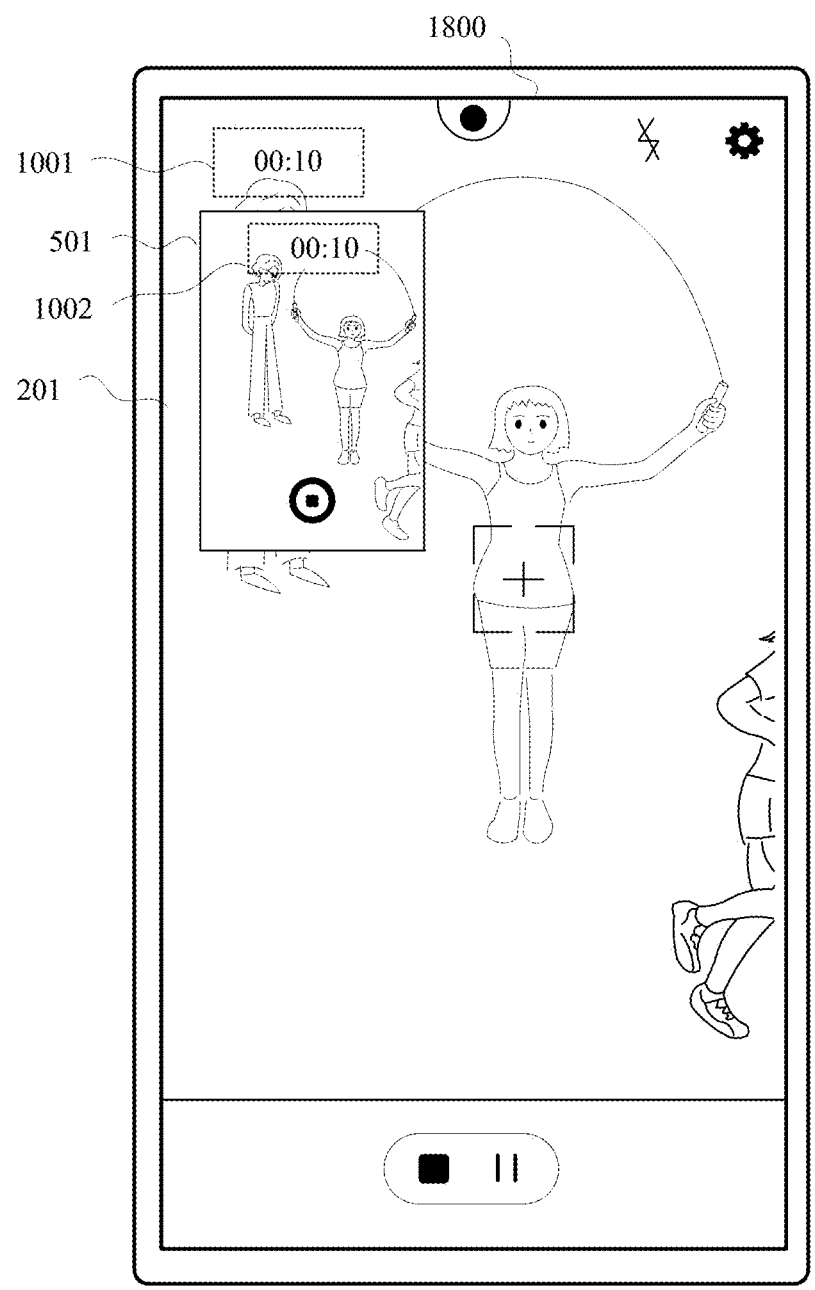
Figure 2S:
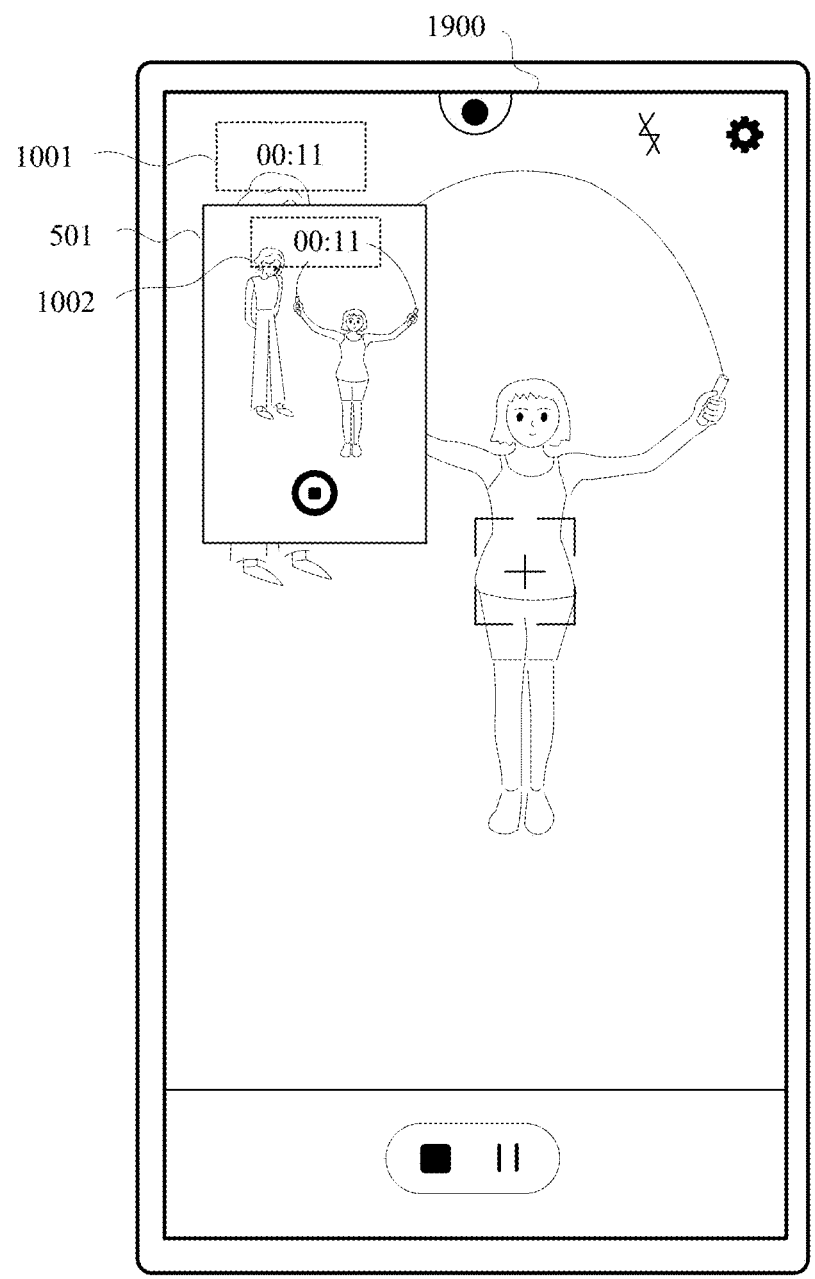

As shown in FIG. 2S, the electronic device may display a user interface 1900. The video recording time displayed in the display region 1001 included on the user interface 1900 is "00:11", and a video recording time displayed in the display region 1002 is "00:11". In other words, the electronic device continues to record the original video and the close-up video.

It may be understood that, after unfocusing exceeds 5 s, if the focus tracking target (that is, the person R2) is still not found, and the user does not switch the focus tracking target, the electronic device may continue to record the original video, and pause recording of the close-up video. In this case, the final frame of image displayed before recording is paused is continuously displayed in the small preview window 501.

Figure 2T:
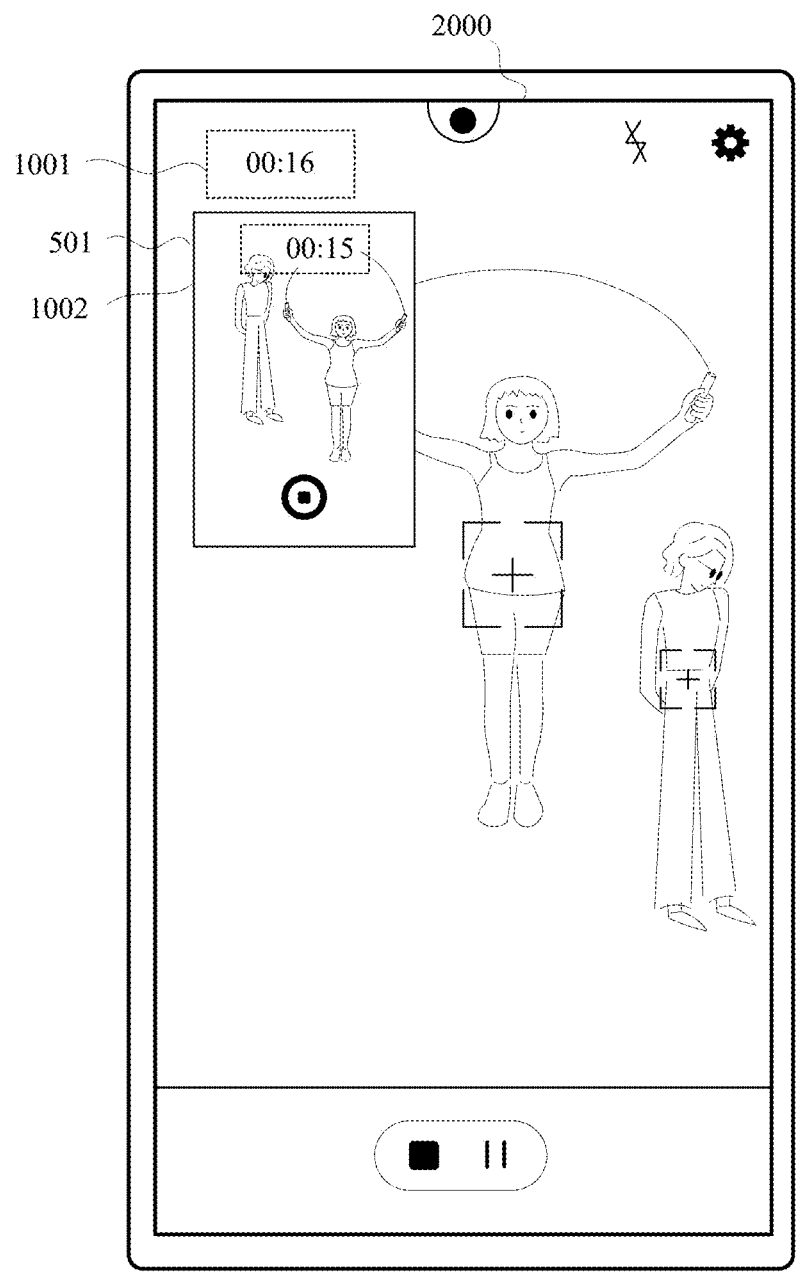

As shown in FIG. 2T, the electronic device may display a user interface 2000. A video recording time displayed in the display region 1001 included on the user interface 2000 is "00:16", and a video recording time displayed in the display region 1002 is "00:15". In other words, after unfocusing exceeds 5 s, the electronic device continues to record the original video and pauses recording of the close-up video. The final frame of image displayed before recording is paused is displayed in the small preview window 501.

It may be understood that, if the focus tracking target is found within 5 s after unfocusing, the electronic device continues to record the original video and the close-up video. After the focus tracking target is found, an image in the close-up video recorded by the electronic device is a close-up image of the focus tracking target. In other words, after the focus tracking target is found, the close-up image of the focus tracking target is displayed in the small preview window 501.

Figure 2U:
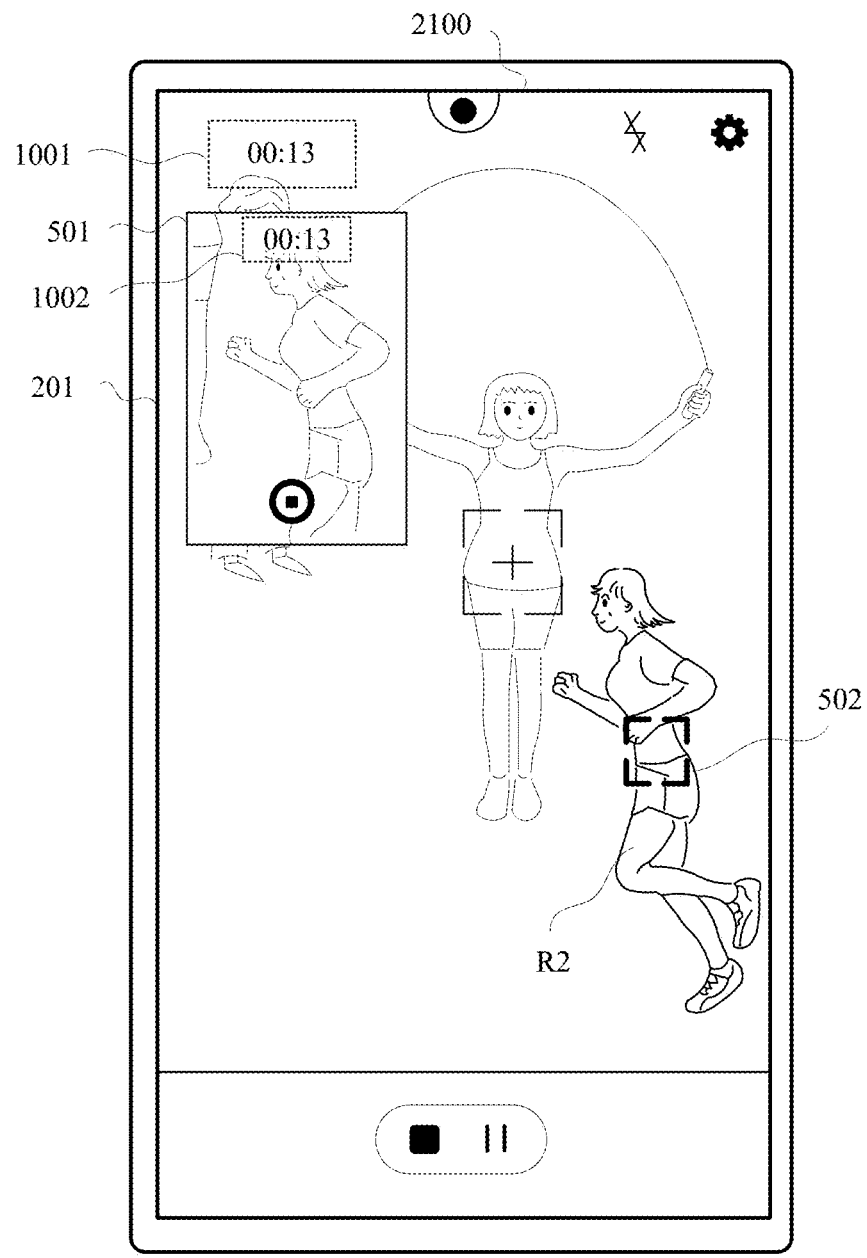

As shown in FIG. 2R and FIG. 2S, the electronic device cannot detect the focus tracking target (that is, the person R2), and the image displayed in the small preview window 501 is the same as the image displayed in the preview window 201. In this case, if the focus tracking target is found within 5 s after unfocusing, the electronic device may continue to record the original video and the close-up video. As shown in FIG. 2U, the electronic device may display a user interface 2100. A video recording time displayed in the display region 1001 included on the user interface 2100 is "00:13", and a video recording time displayed in the display region 1002 is "00:13". It may be understood that an unfocusing time of the electronic device is within 5 s. Based on the image displayed in the preview window 201 in FIG. 2U, the person R2 appears in the framing range of the electronic device again. In this case, the electronic device may detect the focus tracking target again, and display the focus tracking body box 502. As shown in FIG. 2U, in this case, the original image is no longer displayed in the small preview window 501, but the close-up image of the focus tracking target (that is, the person R2) is displayed.

It may be understood that, if the focus tracking target is found within 5 s after unfocusing, the electronic device continues to record the original video and no longer pauses recording of the close-up video. After the focus tracking target is found, an image in the close-up video recorded by the electronic device is a close-up image of the focus tracking target. In other words, after the focus tracking target is found, the close-up image of the focus tracking target is displayed in the small preview window 501.

Figure 2V:
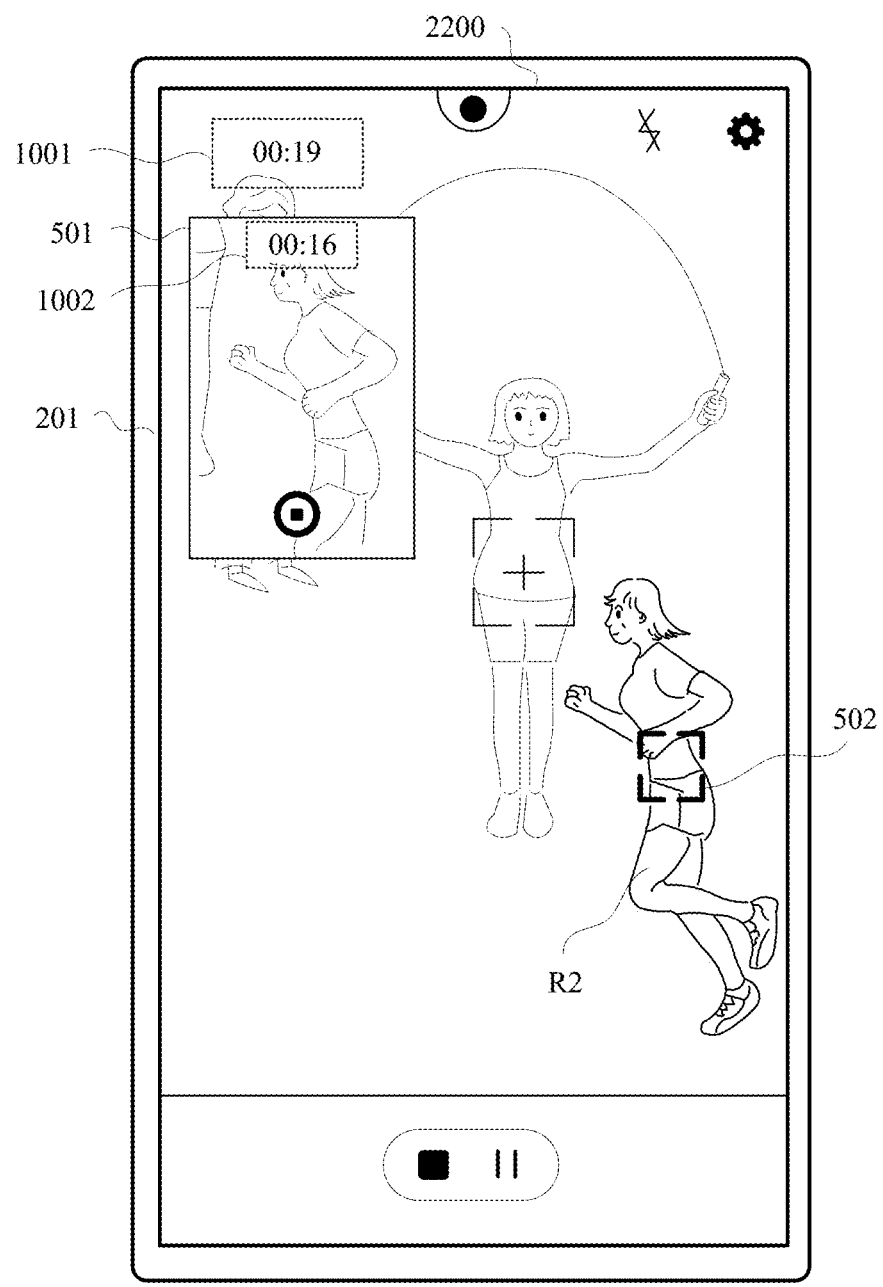

As shown in FIG. 2V, the electronic device may display a user interface 2200. A video recording time displayed in the display region 1001 included on the user interface 2200 is "00:19", and a video recording time displayed in the display region 1002 is "00:16". It may be understood that an unfocusing time of the electronic device exceeds 5 s. According to the foregoing descriptions, after unfocusing exceeds 5 s, the electronic device continues to record the original video and pauses recording of the close-up video. Based on the image displayed in the preview window 201 in FIG. 2V, the person R2 appears in the framing range of the electronic device again. In this case, the electronic device may detect the focus tracking target again, and display the focus tracking body box 502. As shown in FIG. 2V, in this case, the original image is no longer displayed in the small preview window 501, but the close-up image of the focus tracking target (that is, the person R2) is displayed.

It may be understood that a time interval between a start of unfocusing of the electronic device to a pause of recording the close-up video may be alternatively another value, for example, 2 s, 3 s, or 6s. The time interval may be set according to an actual requirement. This is not limited in this application.

Figure 2W:
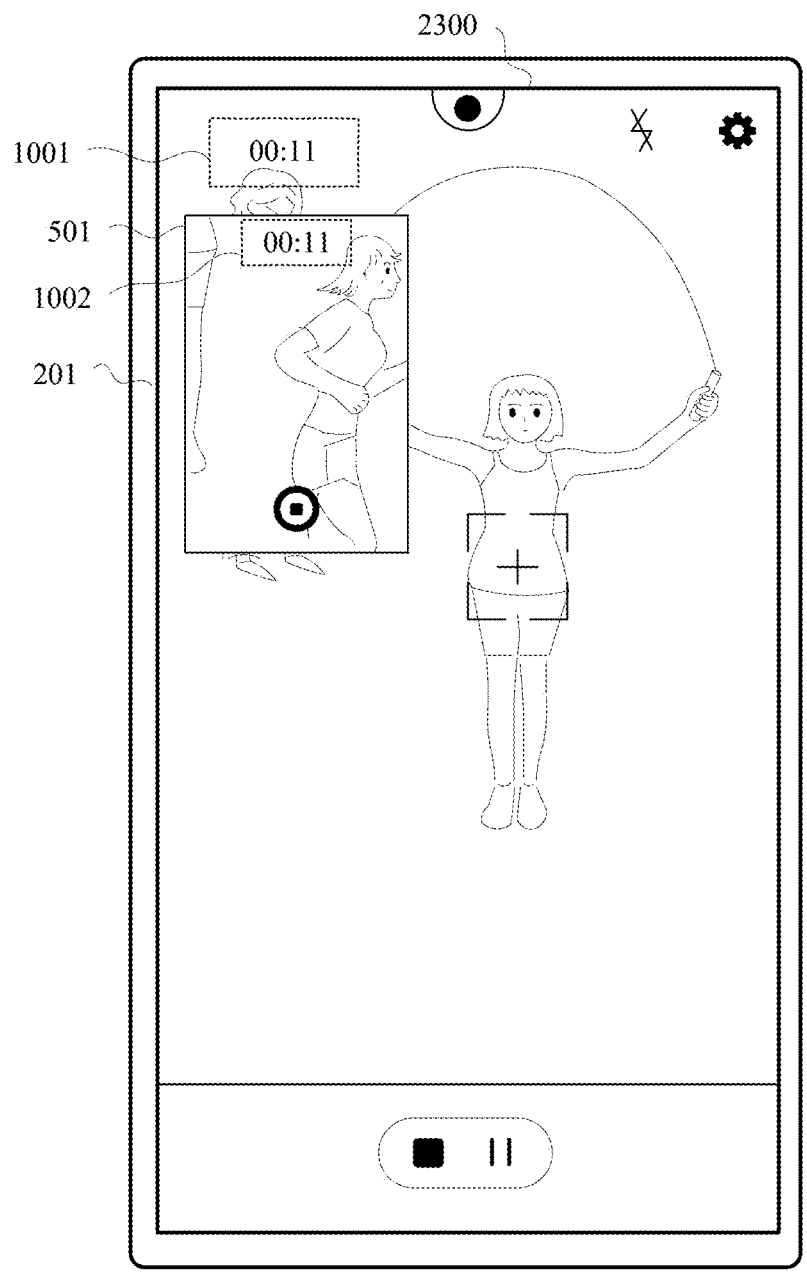
Figure 2X:
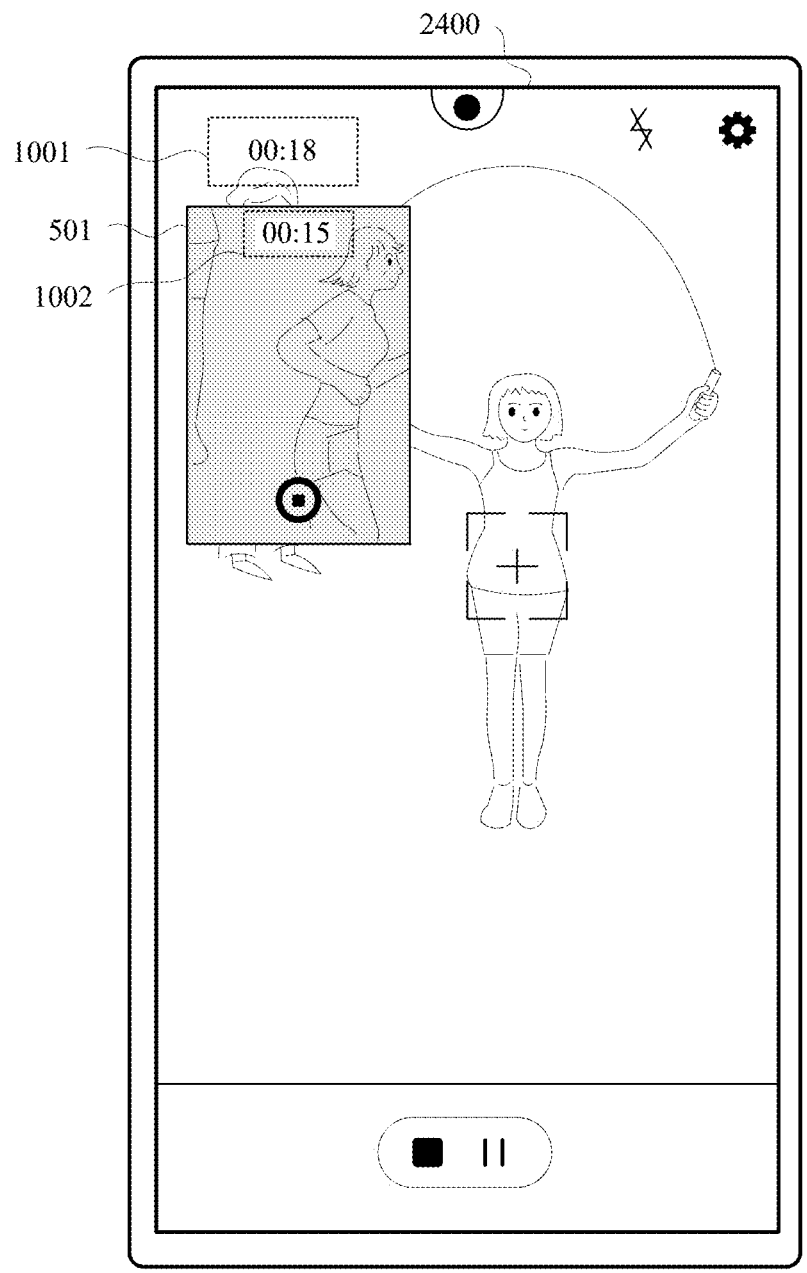

(2) Manner 2 (FIG. 2W and FIG. 2X)

In some embodiments of this application, the electronic device continues to record the original video and the close-up video in a period of time after unfocusing. In this period of time, the image in the close-up video recorded by the electronic device is a final frame of image in the close-up video. After the period of time expires, if the focus tracking target is still not found, and the user does not switch the focus tracking target, the electronic device may continue to record the original video, and pause recording of the close-up video.

As shown in FIG. 2J, the electronic device may record the original video and the close-up video of the person R2. In a recording process, the electronic device may display a user interface 2300 shown in FIG. 2W. Based on the image displayed in the preview window 201, the person R2 fully exceeds the framing range of the electronic device. In this case, the electronic device cannot detect the focus tracking target, and is in an unfocused state. In this case, the electronic device may continue to record the close-up video for a period of time (for example, 5 s). The final frame of image displayed in the small preview window 501 before unfocusing may be continuously displayed in the small preview window 501 in this period of time, that is, the final frame of image of the close-up video recorded by the electronic device before unfocusing.

It may be understood that, after unfocusing exceeds 5 s, if the focus tracking target (that is, the person R2) is still not found, and the user does not switch the focus tracking target, the electronic device may continue to record the original video, and pause recording of the close-up video. In this case, the final frame of image displayed before recording is paused is continuously displayed in the small preview window 501.

In some embodiments of this application, after unfocusing exceeds more than 5 s, the electronic device may add a mask to the small preview window 501. Generally, the image displayed in the small preview window 501 turns gray.

As shown in FIG. 2X, the electronic device may display a user interface 2400. A video recording time displayed in the display region 1001 included on the user interface 2400 is "00:18", and a video recording time displayed in the display region 1002 is "00:15". In other words, after unfocusing exceeds 5 s, the electronic device continues to record the original video and pauses recording of the close-up video. The final frame of image is displayed in the small preview window 501 before a pause of recording, and the mask is displayed.

Similar to the manner 1, if the focus tracking target is found within 5 s after unfocusing, the electronic device continues to record the original video and the close-up video. After the focus tracking target is found, the final frame of image displayed before the focus tracking target is lost is no longer displayed in the small preview window 501, but the real-time obtained close-up image of the focus tracking target is displayed. For details of this part, refer to FIG. 2U and related descriptions. Details are not described herein again.

Similar to the manner 1, if the focus tracking target is found within 5 s after unfocusing, the electronic device continues to record the original video and no longer pauses recording of the close-up video. It may be understood that, after the focus tracking target is found, the mask is no longer displayed in the small preview window 501. For details of this part, refer to FIG. 2V and related descriptions. Details are not described herein again.

In some embodiments of this application, after the electronic device is unfocused, the prompt information about unfocusing and the exit from focus tracking may be displayed. For details, refer to the display region 701 shown in FIG. 2G. Details are not described herein again.

In some embodiments of this application, after unfocusing of the electronic device exceeds a period of time (for example, 5 s), the small preview window 501 may be closed, and the close-up video is automatically stored. In this case, the electronic device may continue to record the original video. If the electronic device detects the focus tracking target again after unfocusing exceeds a period of time, the small preview window 501 may be enabled again to record the close-up video of the focus tracking target.

It may be understood that the electronic device may further perform focus tracking preview and focus tracking recording in a landscape mode. In addition, a case in which the focus tracking target is lost, a case in which the focus tracking target is switched, or the like may occur. For details, refer to the interfaces (as shown in FIG. 2A to FIG. 2X) in a portrait mode. Details are not described herein again.

It should be noted that the foregoing user interfaces are merely some examples provided in this application and should not be considered as limitation to this application.

A software structure of an electronic device provided in embodiments of this application is described below with reference to FIG. 3.

Figure 3:
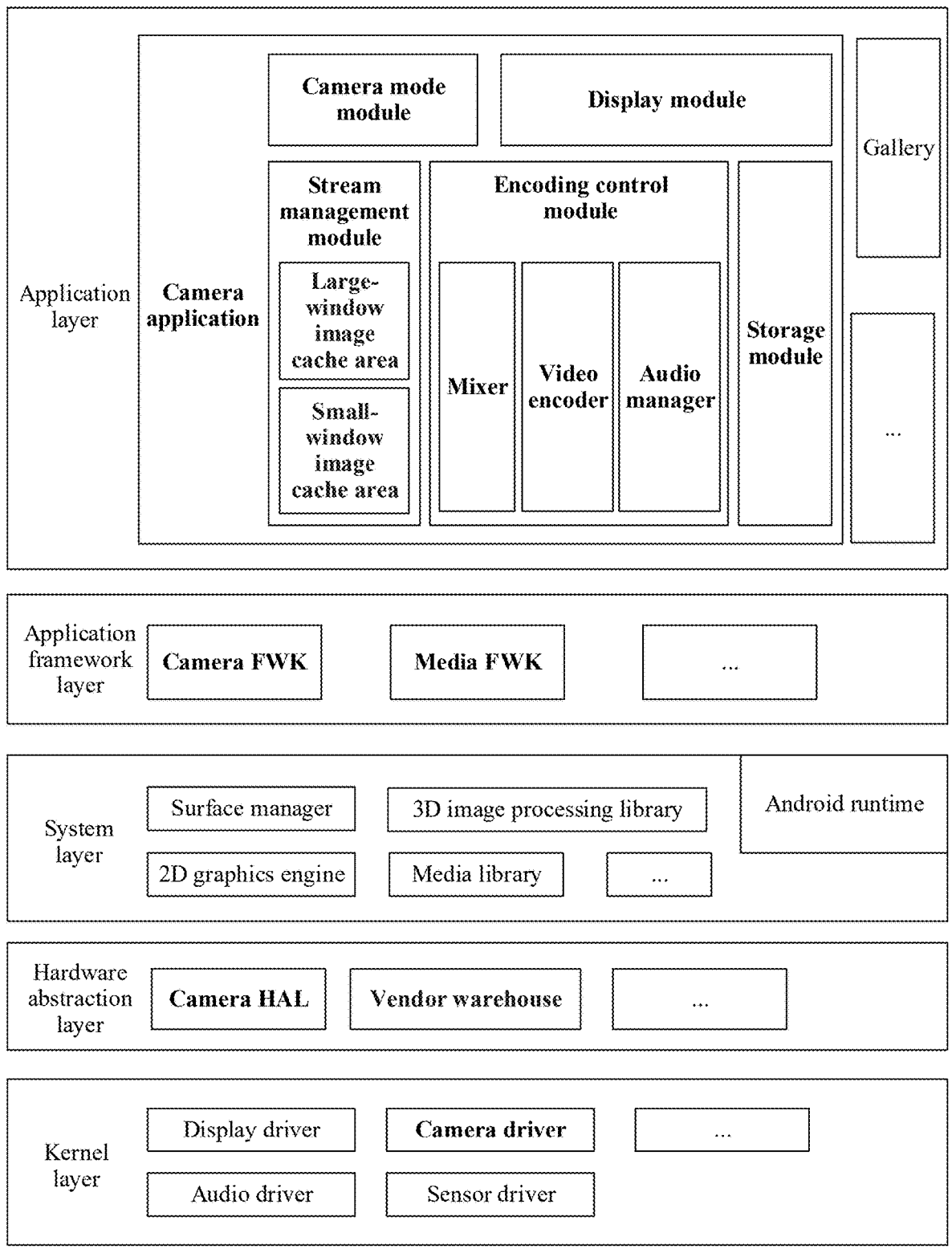
FIG. 3 is a schematic diagram of a software structure of an electronic device according to an embodiment of this application.

As shown in FIG. 3, the software framework of the electronic device involved in this application may include an application layer, an application framework layer (framework, FWK), a system library, Android runtime, a hardware abstraction layer (HAL), and a kernel layer (kernel).

The application layer may include a series of application packages, for example, Camera, Gallery, Calendar, Phone, Map, Navigation, WLAN, Bluetooth, Music, Videos, Messages, and another application (also referred to as an app). The camera application may be used to capture an image and a video.

As shown in FIG. 3, the camera application may include a camera mode module, a stream management module, an encoding control module, a storage module, and a display module. The camera mode module may be used to monitor a user operation and determine a camera mode. The camera mode may include but is not limited to a photo mode, a video preview mode, a video mode, a time-lapse photographing mode, a continuous photographing mode, and the like. The video preview mode may include a video preview mode in a focus tracking mode. The video mode may include a video mode in the focus tracking mode. The stream management module is used to perform data stream management, for example, delivery of data stream configuration information (may be briefly referred to as stream configuration information). The stream management module may include a data stream cache area, for example, a large-window image cache area and a small-window image cache area. Two paths of image data returned by the camera HAL may be stored in the large-window image cache area and the small-window image cache area. Specifically, the large-window image cache area is used to cache a data stream corresponding to a large preview window, and the small-window image cache area is used to cache a data stream corresponding to an image of a small preview window. The encoding control module may include a mixer, a video encoder, and an audio manager. The video encoder in the encoding control module is used to control the encoder to encode an image captured by the camera. The audio manager is used to encode audio captured by devices such as a pickup. The mixer is used to combine an encoded image and encoded audio into a video file. The storage module is used to store an original video and a close-up video. The display module is used to control display of the large preview window and the small preview window.

The application framework layer provides an application programming interface (Application Programming Interface, API) and a programming framework for applications at the application layer. The application framework layer includes some predefined functions.

As shown in FIG. 3, the application framework layer may include a camera FWK and a media FMK. The camera FWK may provide an API interface to an application (for example, the camera application) for invocation, to receive a request from the application; maintain service logic of the request during internal transfer; and finally send, through invoking a camera AIDL cross-process interface, the request to a camera service (Camera Service) for processing, then wait for a backhaul of a result of the camera service (Camera Service), and further sends a final result to the camera application. An English full name of AIDL is Android Interface Definition Language. A Chinese meaning is an Android interface definition language. Similarly, the media FWK may provide an API interface to a corresponding application (for example, the camera application) for invocation, further receive a request from the application (for example, the camera application), deliver the request of the application, and then send the request back to the application.

It may be understood that the application framework layer may further include a window manager, a content provider, a view system, a phone manager, a resource manager, a notification manager, and the like. For specific meanings, refer to related technical documents. Details are not described herein.

The runtime (Runtime) is responsible for scheduling and managing a system. Runtime includes a core library and a virtual machine. The core library includes two parts: a function that needs to be invoked by using a programming language (for example, a java language), and a core library of the system.

The application layer and the application framework layer are run in the virtual machine. The virtual machine executes programming files (for example, java files) of the application layer and the application framework layer as binary files. The virtual machine is used to perform functions such as lifecycle management of an object, stack management, thread management, security and exception management, and garbage collection.

The system library may include a plurality of functional modules, for example, a surface manager (Surface Manager), a media library (Media Libraries), a three-dimensional graphics processing library (for example, OpenGL ES), and a two-dimensional graphics engine (for example, SGL).

The surface manager is used to manage a display subsystem, and provide fusion between a two-dimensional (2-Dimensional, 2D) layer and a three-dimensional (3-Dimensional, 3D) layer for a plurality of applications.

The media library supports playback and recording of a plurality of commonly used audio and video formats, a static image file, and the like. The media library may support a plurality of audio and video encoding formats, for example, MPEG4, H.264, MP3, AAC, AMR, JPG, and PNG.

The three-dimensional graphics processing library is used for implementing 3D graphics drawing, image rendering, composition, layer processing, and the like.

The 2D graphics engine is a drawing engine for 2D drawing.

The hardware abstraction layer (HAL) is an interface layer between an operating system kernel and upper-layer software, and is intended to abstract hardware. The hardware abstraction layer is an abstraction interface driven by a device kernel, and is used to provide an application programming interface for a higher-level Java API framework to access an underlying device. The HAL includes a plurality of library modules, such as a camera HAL, a Vendor warehouse, a display, Bluetooth, and audio. Each library module implements an interface for a specific type of hardware component. It may be understood that the camera HAL may provide an interface for the camera FWK to access a hardware component such as a camera. The Vendor warehouse can provide an interface for the media FWK to access a hardware component such as an encoder. When a system framework layer API requires to access hardware of a portable device, an Android operating system loads the library module for the hardware component.

The kernel layer is a basis of the Android operating system, and a function of the Android operating system is finally completed through the kernel layer. The kernel layer includes at least a display driver, a camera driver, an audio driver, a sensor driver, and a virtual card driver.

It should be noted that the schematic diagram of the software structure of the electronic device shown in FIG. 3 provided in this application is only an example, and does not limit specific module division in different layers of the Android operating system. For details, refer to the description of the software structure of the Android operating system in conventional technologies. In addition, the photographing method provided in this application may also be implemented based on another operating system, which is not listed one by one in this application.

Based on the software structure of the electronic device shown in FIG. 3, a photographing method provided in an embodiment of this application is described with reference to FIG. 4.

Figure 4:
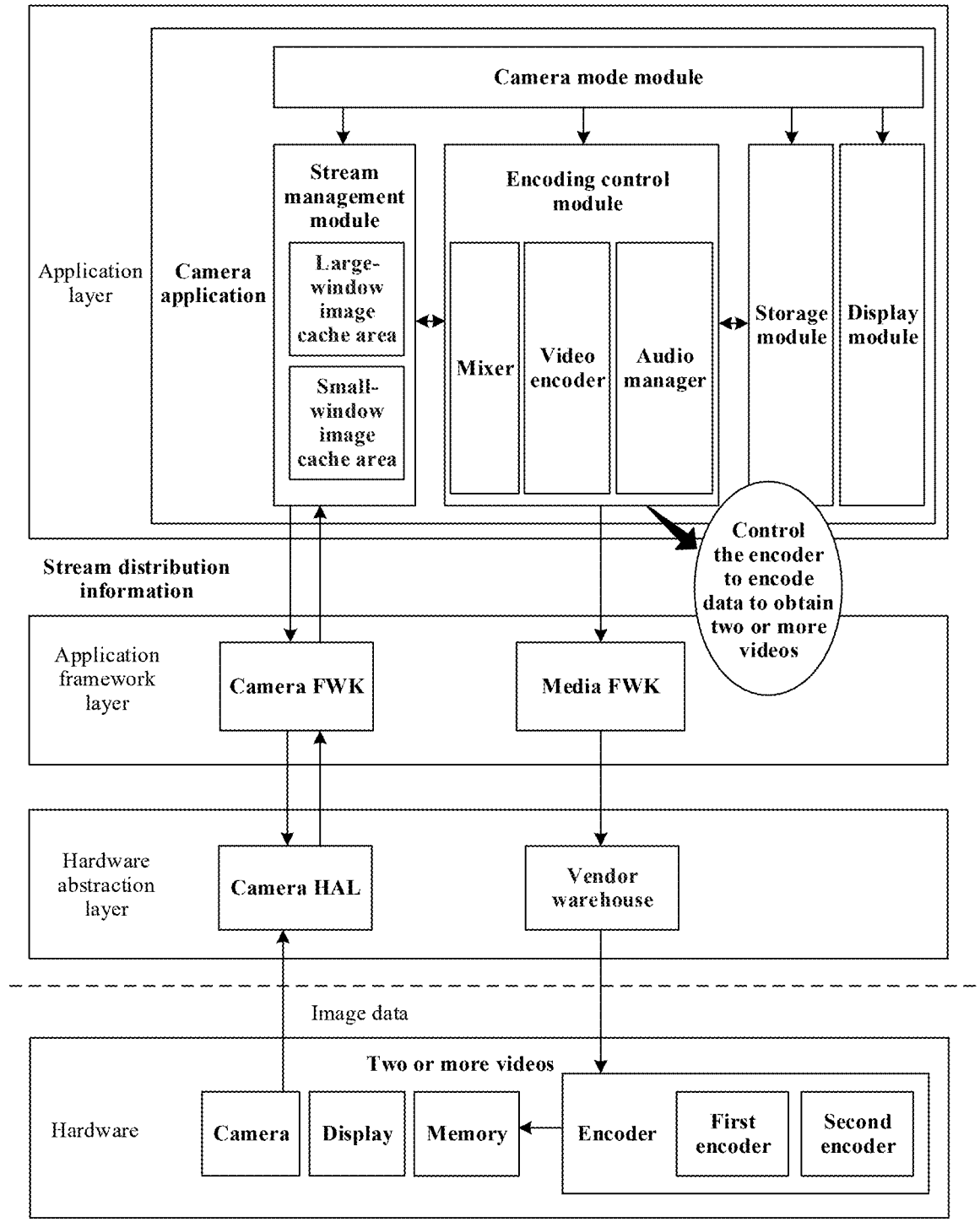
FIG. 4 is a schematic diagram of module interaction according to an embodiment of this application.
Figure 5A:
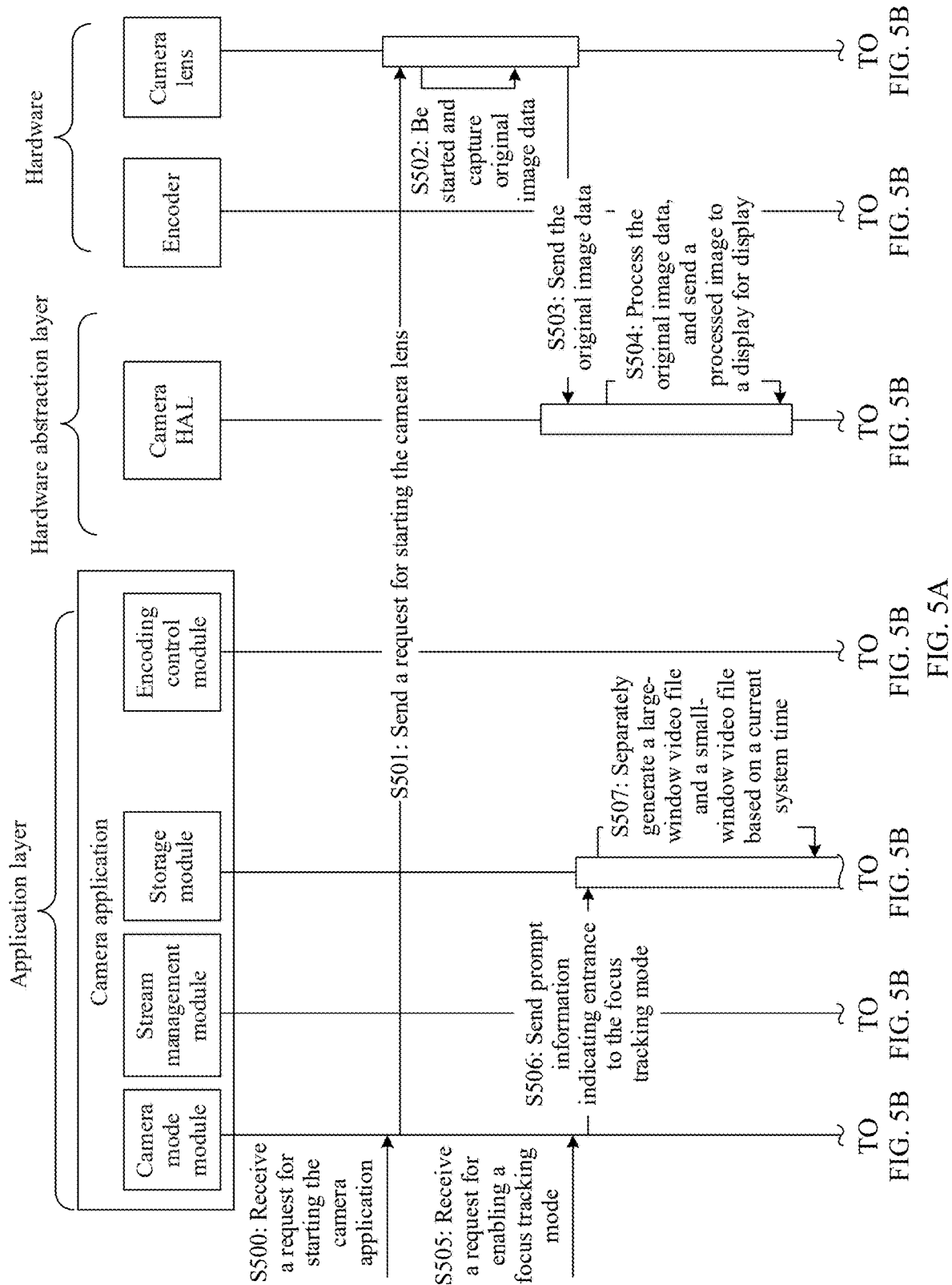
Figure 5C:
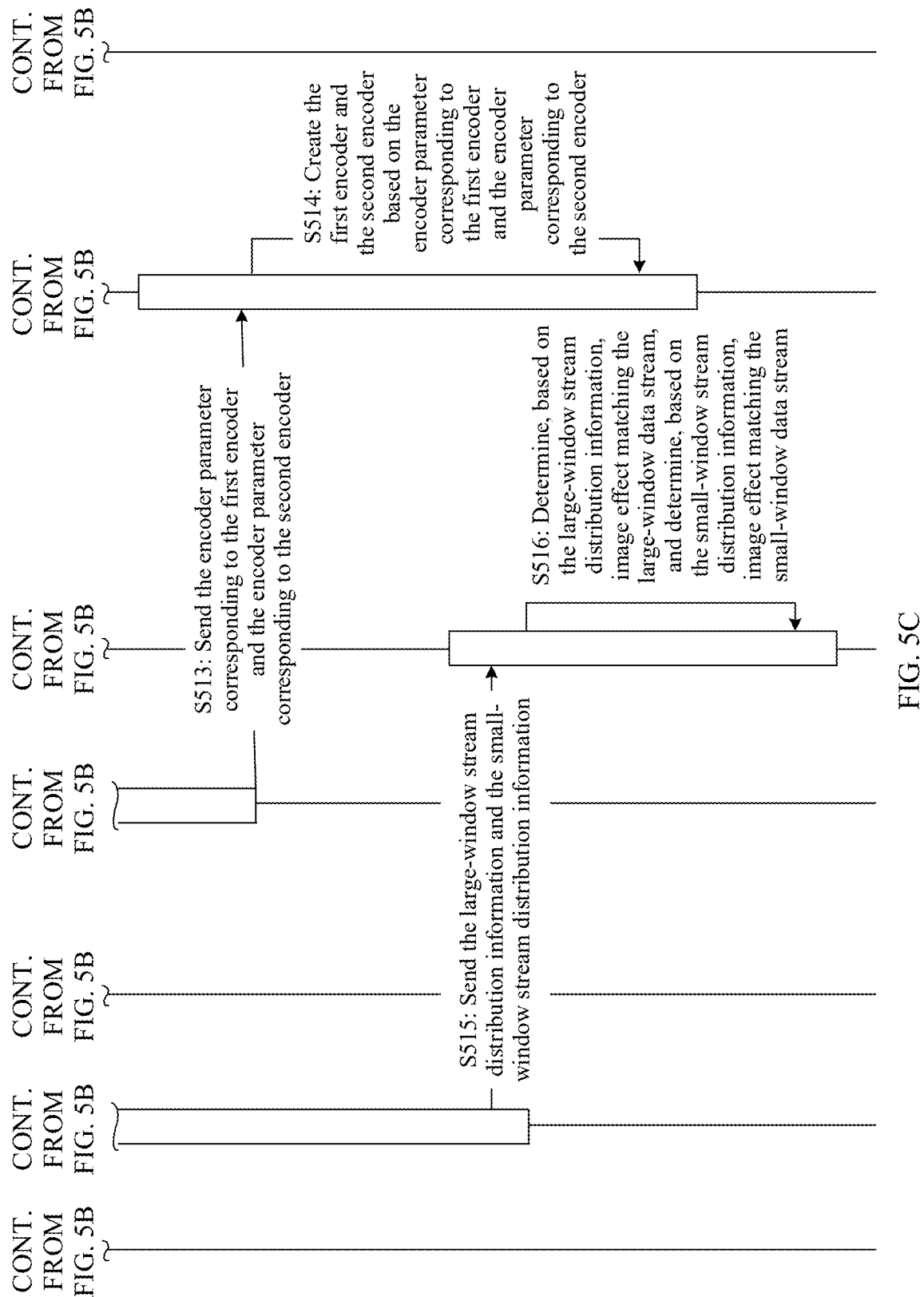

As shown in FIG. 4, in addition to the software modules shown in FIG. 3, the electronic device may include hardware modules such as a camera, a memory, and an encoder. The camera may be configured to capture original image data. The memory may be configured to store a video recorded in a large preview window and a video recorded in a small preview window. The encoder may be configured to encode image data in a data stream corresponding to the large preview window and image data in a data stream corresponding to the small preview window. The electronic device may include a first encoder and a second encoder. The first encoder may be configured to encode the image data in the data stream corresponding to the large preview window. The second encoder may be configured to encode the image data in the data stream corresponding to the small preview window.

The camera mode module may monitor a user operation performed on the focus tracking mode control, determine that a current camera mode changes to a video preview mode in the focus tracking mode, and notify the stream management module. Correspondingly, the stream management module may deliver stream configuration information of two paths of data streams to the camera FWK. The two paths of data streams are respectively a data stream corresponding to a large preview window and a data stream corresponding to a small preview window. After receiving the stream configuration information, the camera FWK may deliver the stream configuration information to the camera HAL. The camera HAL may process the image data captured by the camera to obtain two paths of image data with different effect. The camera HAL may return the two paths of image data with different effect to the camera FWK. Correspondingly, the camera FWK may continue to return the two paths of image data with different effect to the camera application. The two paths of image data are respectively stored in the large-window image cache area and the small-window image cache area of the camera application. It may be understood that the two paths of image data with different effect may be used for displaying images in the large preview window and the small preview window and generating corresponding videos.

A camera mode control may monitor a user operation performed on the recording start control, determine that the current camera mode changes to the video mode in the focus tracking mode, and notify the encoding control module. The encoding control module controls the encoder to encode the two paths of image data in the large-window image cache area and the small-window image cache area, to obtain an original video and a close-up video. It may be understood that the encoding control module controls the encoder to encode the image data in the small-window image cache area, to obtain one or more close-up videos. In some embodiments of this application, the encoding control module controls the encoder to encode the two paths of image data in the large-window image cache area and the small-window image cache area, to then generate one original video and a plurality of close-up videos. The generated videos are stored into the memory.

It may be understood that meanings of the large window and the large preview window mentioned in this application are the same, and meanings of the small window and the small preview window are the same.

The following describes specific implementations of the foregoing embodiments with reference to FIG. 5A to FIG. 9.

S500: A camera mode module receives a request for starting a camera application.

It may be understood that a user may trigger an electronic device to start the camera application. Correspondingly, the camera mode module in the electronic device may receive the request for starting the camera application.

For example, as shown in FIG. 2A, the user may tap an icon of the camera application 101. Correspondingly, the electronic device may receive the request for starting the camera application. In response to the request for starting the camera application, the electronic device may start the camera application and display the user interface 200 shown in FIG. 2B. It may be understood that the user may also start the camera application in a voice manner, a gesture manner, or the like. A specific manner in which the user triggers the electronic device to start the camera application is not limited in this application.

S501: The camera mode module sends, to a camera, a request for starting the camera.

It may be understood that the camera may receive the request that is for starting the camera and that is sent by the camera mode module.

S502: The camera is started and captures original image data.

It may be understood that the camera may be started after receiving the request that is for starting the camera and that is sent by the camera mode module. After being started, the camera may continuously capture the original image data.

S503: The camera sends the original image data to a camera HAL.

It may be understood that the camera may send the captured original image data to the camera HAL.

S504: The camera HAL processes the original image data, and sends a processed image to a display for display.

It may be understood that, when the camera application is in a preview mode, the camera HAL may process the original image data, and send the processed image to the display for display. It may be understood that the preview mode mentioned herein may include a photo preview mode, a video preview mode, and the like.

1. Configure a Data Stream (as Shown in Step S505 to Step S516 in FIG. 5A, FIG. 5B, and FIG. 5C).

S505: The camera mode module receives a request for enabling a focus tracking mode.

It may be understood that the user may trigger the camera to enter the focus tracking mode. It may be understood that the camera mode module may monitor a corresponding trigger operation performed by the user. Correspondingly, the camera mode module may receive the request for enabling the focus tracking mode.

For example, after starting the camera application, the electronic device may display the user interface 300 shown in FIG. 2C. The user interface 300 may include a focus tracking mode control 301. The user may tap the focus tracking mode control 301. Correspondingly, the camera mode module in the electronic device may receive a request for entering the focus tracking mode. In response to the request for entering the focus tracking mode, the electronic device may display the user interface 400 shown in FIG. 2D. It may be understood that the user may trigger, in a manner such as a voice or a gesture, the electronic device to enter the focus tracking mode.

In some embodiments of this application, the user may trigger, in a manner such as a shortcut control on a home screen, a voice, or a gesture manner, the electronic device to quickly enter the focus tracking mode.

S506: The camera mode module sends, to a storage module, prompt information indicating entrance to the focus tracking mode.

It may be understood that after receiving the request for enabling the focus tracking mode, the camera mode module may send, to the storage module, the prompt information indicating that the camera application enters the focus tracking mode. The prompt information may be understood as mode change information indicating that the camera application changes from the default video preview mode to the focus tracking mode. It may be understood that the default video preview mode indicates a video preview mode in which the electronic device is in a default video recording state (as shown in FIG. 2C).

In some embodiments of this application, the prompt information may include a current mode (that is, the focus tracking mode) of the camera application. The prompt information may further include an original mode of the camera application. It may be understood that the original mode of the camera application indicates a mode before entrance to the focus tracking mode, for example, the default video preview mode.

S507: The storage module separately generates a large-window video file and a small-window video file based on a current system time.

It may be understood that initial states of the large-window video file and the small-window video file that are generated by the storage module based on the current system time are empty (that is, there is no data).

In some embodiments of this application, timestamps of the large-window video file and the small-window video file are respectively a first moment and a second moment. The second moment is not earlier than the first moment.

S508: The storage module sends a file name of the large-window video file and a file name of the small-window video file to the encoding control module.

It may be understood that after separately generating the large-window video file and the small-window video file based on the current system time, the storage module may send the file name of the large-window video file and the file name of the small-window video file to the encoding control module. The file name of the large-window video file and the file name of the small-window video file may be in forms of a text, a number, a character string, and the like. This is not limited in this application.

In some embodiments of this application, the storage module may further send the timestamps (that is, the first moment and the second moment) of the large-window video file and the small-window video file to the encoding control module. The storage module may further send a correspondence between a file name and a timestamp to the encoding control module.

It may be understood that a file identifier of the small-window video file and a file identifier of the large-window video file that may be alternatively sent by the storage module to the encoding control module may have other forms and content and are not limited to the foregoing file name and timestamp. This is not limited in this application.

For example, the storage module may send video-1-time-1-video-2-time-2 to the encoding control module. With reference to Table 1, video-1 corresponds to time-1. Herein, video-1 is the file name of the large-window video file, time-1 is the timestamp (that is, the first moment) of the large-window video file, video-2 corresponds to time-2, video-2 is the file name of the small-window video file, and time-2 is the timestamp (that is, the second moment) of the small-window video file.

TABLE 1

| File information W1 | | |
|---|---|---|
| File Name | video-1 | video-2 |
| Timestamp | time-1 | time-2 |
| . . . | . . . | . . . |

For example, the storage module may send 10987662098767 to the encoding control module. A first digit of the character string represents the file name of the large-window video file. An eighth digit of the character string represents the file name of the small-window video file. Second to seventh digits of the character string represent the timestamp of the large-window video file. Ninth to fourteenth digits of the character string represent the timestamp of the small-window video file.

In some embodiments of this application, the large-window video file and the small-window video file may be respectively named by using the timestamps.

Correspondingly, the encoding control module may receive the file name of the large-window video file and the file name of the small-window video file that are sent by the storage module.

S509: The camera mode module sends, to a stream management module, prompt information indicating entrance to the focus tracking mode.

It may be understood that after receiving the request for enabling the focus tracking mode, the camera mode module may send, to the stream management module, the prompt information indicating that the camera application enters the focus tracking mode. For related descriptions of the prompt information, refer to step S506. Details are not described herein again.

It may be understood that a sequence in which the electronic device performs step S506 and step S509 is not limited in this application. The electronic device may first perform step S506, may first perform step S509, or may simultaneously perform step S506 and step S509.

S510: The stream management module configures a large-window data stream and a small-window data stream.

It may be understood that the stream management module may determine stream configuration information of the large-window data stream and the small-window data stream, and accordingly configure the large-window data stream and the small-window data stream. The large-window data stream indicates a data stream corresponding to the large preview window, that is, a data stream corresponding to an image displayed in the large preview window. The small-window data stream indicates a data stream corresponding to the small preview window, that is, a data stream corresponding to an image displayed in the small preview window.

It may be understood that the stream configuration information of the large-window data stream and the small-window data stream may include formats, resolutions, and the like. In some embodiments of this application, the stream configuration information of the large-window data stream and that of the small-window data stream are the same. For example, the format may be YUV. The resolution may be 1920 px*1080 px. It may be understood that a full name of px is "Pixel", and a Chinese meaning is a "pixel", and px is a smallest unit of an image or a picture. It should be noted that specific content of the configuration information may be set according to industry regulations and actual requirements. This is not limited in this application. In some embodiments of this application, the stream configuration information of the large-window data stream and the small-window data stream may further include a stream identifier of the large-window data stream and a stream identifier of the small-window data stream. The stream identifier of the large-window data stream and the stream identifier of the small-window data stream may be used to distinguish between the large-window data stream and the small-window data stream. It may be understood that the stream management module may store the stream identifier of the large-window data stream and the stream identifier of the small-window data stream.

S511: The stream management module sends large-window stream configuration information and small-window stream configuration information to the encoding control module.

It may be understood that the large-window stream configuration information indicates the stream configuration information of the large-window data stream, and the small-window stream configuration information indicates the stream configuration information of the small-window data stream. According to the foregoing descriptions, the stream configuration information may include a format, a resolution, and the like. This is not limited in this application.

Correspondingly, the encoding control module may receive the stream configuration information sent by the stream management module.

S512: The encoding control module determines, based on the large-window stream configuration information and the file name of the large-window video file, an encoder parameter corresponding to a first encoder that is associated with the large-window data stream and the large-window video file, and determines, based on the small-window stream configuration information and the file name of the small-window video file, an encoder parameter corresponding to a second encoder that is associated with the small-window data stream and the small-window video file.

It may be understood that after receiving the large-window stream configuration information and the small-window stream configuration information, the encoding control module may parse the large-window stream configuration information and the small-window stream configuration information to determine that there are two data streams configured by the stream management module. Similarly, after the encoding control module receives the file name of the large-window video file and the file name of the small-window video file, it may be determined that there are two video files. Correspondingly, the encoding control module determines that there are two encoders that need to be created. It may be understood that the two encoders (that is, the first encoder and the second encoder) may be separately associated with the two data streams (that is, the large-window data stream and the small-window data stream) and the two video files (that is, the large-window video file and the small-window video file). In other words, the encoding control module may determine that the first encoder is configured to encode image data in the large-window data stream, and the first encoder may write encoded data into the large-window video file. Similarly, the encoding control module may determine that the second encoder is configured to encode image data in the small-window data stream, and the second encoder may write encoded data into the small-window video file.

S513: The encoding control module sends, to the encoder, the encoder parameter corresponding to the first encoder and the encoder parameter corresponding to the second encoder.

It may be understood that the encoder parameter of the encoder may include a format and a resolution. For example, the format may be H.264. The resolution may be 1920 px*1080 px. It should be noted that specific content of the encoder information of the encoder may be set according to industry regulations and actual requirements. This is not limited in this application.

In some embodiments of this application, the encoder parameter of the first encoder may be the same as or different from the encoder parameter of the second encoder. A specific parameter may be set according to actual requirements and related technical documents.

Correspondingly, the encoder may receive the encoder parameter corresponding to the first encoder and the encoder parameter corresponding to the second encoder that are sent by the encoding control module.

S514: The encoder creates the first encoder and the second encoder based on the encoder parameter corresponding to the first encoder and the encoder parameter corresponding to the second encoder.

It may be understood that after receiving the encoder parameter corresponding to the first encoder and the encoder parameter corresponding to the second encoder that are sent by the encoding control module, the encoder may create the first encoder based on the encoder parameter corresponding to the first encoder, and may further create the second encoder based on the encoder parameter corresponding to the second encoder.

It should be noted that creating the encoder mentioned in this application indicates invoking a hardware resource to implement a corresponding encoding function. Generally, after the encoder creates the first encoder and the second encoder, the encoding control module may invoke the hardware resource to separately encode the image data in the large-window data stream and encode the image data in the small-window data stream.

S515: The stream management module sends the large-window stream configuration information and the small-window stream configuration information to the camera HAL.

Specifically, the stream management module may send the large-window stream configuration information and the small-window stream configuration information to the camera FWK, and then the camera FWK sends the large-window stream configuration information and the small-window stream configuration information to the camera HAL. For related descriptions of the large-window stream configuration information and the small-window stream configuration information, refer to the foregoing descriptions. Details are not described herein again.

Correspondingly, the camera HAL may receive the stream configuration information sent by the stream management module.

It may be understood that a sequence in which the electronic device performs step S511 and step S515 is not limited in this application.

S516: The camera HAL determines, based on the large-window stream configuration information, image effect matching the large-window data stream, and determines, based on the small-window stream configuration information, image effect matching the small-window data stream.

It may be understood that after receiving the stream configuration information sent by the stream management module, the camera HAL may determine the image effect matching the large-window data stream and the image effect matching the small-window data stream.

It may be understood that the image effect may include clip, size, beauty, filter, and the like. This is not limited in this application. In some embodiments of this application, the image effect matching the large-window data stream does not include clipping processing on the original image data, and the image effect matching the small-window data stream includes clipping processing the original image data.

2. Start Video Recording when Focus Tracking is Successful (as Shown in FIG. 6A(1), FIG. 6A(2), FIG. 6B(1), FIG. 6B(2), and FIG. 6B(3)).

It should be noted that after being started (for example, step S502), the camera may continuously capture the original image data, and send the original image data to the camera HAL (for example, step S503).

(1) Simultaneously Enable Large-Window Recording and Small-Window Recording (as Shown in FIG. 6A(1) and FIG. 6A(2)).

S600: A camera mode module receives a request for simultaneously enabling large-window recording and small-window recording.

When focus tracking is successful and a large preview window and a small preview window are displayed, a user may trigger simultaneous large-window recording and the small window. Correspondingly, the camera mode module may receive the request for simultaneously enabling large-window recording and small-window recording.

For example, an electronic device may display the user interface 500 shown in FIG. 2E. The user interface 500 include the preview window 201 and the small preview window 501. In other words, the electronic device succeeds in focus tracking, and simultaneously displays the large preview window and the small preview window. It may be understood that the user may tap the recording start control 302 included on the user interface 500. Correspondingly, the camera mode module in the electronic device may receive the request for simultaneously enabling large-window recording and small-window recording. In response to the request for simultaneously enabling large-window recording and small-window recording, the electronic device may start video recording. After starting video recording, the electronic device may display the user interface 1000 shown in FIG. 2J. It may be understood that the user may further trigger, in a manner such as a voice or a gesture, the electronic device to simultaneously perform large-window recording and small-window recording.

S601: The camera mode module sends, to an encoding control module, prompt information of starting small-window recording and large-window recording.

It may be understood that after receiving the request for simultaneously enabling large-window recording and small-window recording, the camera mode module may send, to the encoding control module, prompt information indicating that a camera application starts large-window recording and small-window recording. The prompt information may also be understood as mode change information indicating that the camera application changes from a large-window and small-window preview mode to a large-window and small-window recording mode. It may be understood that large-window and small-window preview indicates that the large preview window and the small preview window are both in a preview state, and large-window and small-window recording indicates that the large preview window and the small preview window are both in a recording state.

Correspondingly, the encoding control module may receive prompt information that indicates that the camera application starts large-window recording and small-window recording and that is sent by the camera mode module.

S602: The encoding control module sends, to a first encoder, a request for starting the first encoder.

It may be understood that after receiving the prompt information that is of starting large-window recording and small-window recording and that is sent by the camera mode module, the encoding control module may send, to the first encoder, the request for starting the first encoder. Specifically, the encoding control module may send, to a media FWK, the request for starting the first encoder, and then the media FWK sends, to the first encoder by using a Vendor warehouse, the request for starting the first encoder.

For example, the request for starting the first encoder may include codec-1.start.

Correspondingly, the first encoder may receive the request that is for starting the first encoder and that is sent by the encoding control module.

S603: The first encoder is started.

It may be understood that the first encoder may be started after the first encoder receives the request that is for starting the first encoder and that is sent by the encoding control module.

S604: The encoding control module sends, to a second encoder, a request for starting the second encoder.

It may be understood that after receiving the prompt information that is of starting large-window recording and small-window recording and that is sent by the camera mode module, the encoding control module may send, to the second encoder, the request for starting the second encoder. Specifically, the encoding control module may send, to the media FWK, the request for starting the second encoder, and then the media FWK sends, to the second encoder by using the Vendor warehouse, the request for starting the second encoder.

For example, the request for starting the second encoder may include codec-2.start.

It may be understood that a sequence in which the electronic device performs step S602 and step S604 is not limited in this application.

Correspondingly, the second encoder may receive the request that is for starting the second encoder and that is sent by the encoding control module.

S605: The second encoder is started.

It may be understood that the second encoder may be started after the second encoder receives the request that is for starting the second encoder and that is sent by the encoding control module.

S606: The camera mode module sends, to the stream management module, the prompt information of starting small-window recording and large-window recording.

It may be understood that after receiving the request for simultaneously enabling large-window recording and small-window recording, the camera mode module may send, to the stream management module, the prompt information indicating that the camera application starts large-window recording and small-window recording. It may be understood that for related descriptions of step S606, reference may be made to step S601. Details are not described herein again.

It may be understood that a sequence of performing step S601 and step S606 is not limited in this application.

Correspondingly, the stream management module may receive the prompt information that is of starting large-window recording and small-window recording and that is sent by the camera mode module.

S607: The stream management module sends, to the camera HAL, a request for generating a large-window data stream and a small-window data stream.

It may be understood that the stream management module may send the request for generating the large-window data stream and the small-window data stream to the camera FWK, and then the camera FWK may send the request to the camera HAL.

It should be noted that, when the camera mode does not change (a mode of the camera application is the large-window and small-window recording mode), the stream management module may continuously deliver the request for generating the large-window data stream and the small-window data stream to the camera HAL. In some embodiments of this application, the stream management module sends the request to the camera HAL at a specific frequency (or a time interval). For example, the stream management module sends the request to the camera HAL every 33 milliseconds.

Correspondingly, the camera HAL may receive the request that is for generating the large-window data stream and the small-window data stream and that is sent by the stream management module.

S608: The camera HAL processes the original image data based on image effect matching the large-window data stream and image effect matching the small-window data stream to obtain large-window image data and small-window image data.

According to the foregoing descriptions, after being started, the camera may continuously capture the original image data, and send the captured original image data to the camera HAL. It may be understood that, after receiving the request that is for generating the large-window data stream and the small-window data stream and that is sent by the stream management module, the camera HAL may process the original image data based on the image effect matching the large-window data stream to obtain the large-window image data, and may process the original image data based on the image effect matching the small-window data stream to obtain the small-window image data.

S609: The camera HAL sends the large-window image data to the first encoder.

It may be understood that after processing the original image data and obtaining the large-window image data, the camera HAL may send the large-window image data to the first encoder.

Correspondingly, the first encoder may receive the large-window image data sent by the camera HAL.

S610: The camera HAL sends the small-window image data to the second encoder.

It may be understood that after processing the original image data and obtaining the small-window image data, the camera HAL may send the small-window image data to the second encoder.

Correspondingly, the second encoder may receive the small-window image data sent by the camera HAL.

It may be understood that a sequence in which the electronic device performs step S609 and step S610 is not limited in this application.

S611: The first encoder encodes the large-window image data to obtain encoded large-window image data, and writes the encoded large-window image data into a large-window video file.

It may be understood that the first encoder may receive the large-window image data sent by the camera HAL. After the first encoder is started, the large-window image data may be encoded. According to the foregoing descriptions, the first encoder is associated with the large-window data stream and the large-window video file. Therefore, the first encoder may write the encoded large-window image data into the large-window video file.

It may be understood that the large-window image data encoded by the first encoder may constitute an original video. For example, a frequency at which the first encoder writes the encoded large-window image data into the large-window video file may be 30 times per second. Correspondingly, a frame rate of the original video may be 30 fps. An English full name of fps is Frames per Second, which means a quantity of frames displayed per second. Certainly, a frequency at which the first encoder writes the encoded large-window image data into the large-window video file may be alternatively another value. This is not limited in this application.

S612: The second encoder encodes the small-window image data to obtain encoded small-window image data, and writes the encoded small-window image data into a small-window video file.

It may be understood that the second encoder may receive the small-window image data sent by the camera HAL. After the second encoder is started, the small-window image data may be encoded. According to the foregoing descriptions, the second encoder is associated with the small-window data stream and the small-window video file. Therefore, the second encoder may write the encoded small-window image data into the small-window video file.

It may be understood that the small-window image data encoded by the second encoder may constitute a close-up video. For example, a frequency at which the second encoder writes the encoded small-window image data into the small-window video file may also be 30 times per second. This is similar to the case of the first encoder. Correspondingly, a frame rate of the close-up video may be 30 fps. Certainly, a frequency at which the second encoder writes the encoded small-window image data into the small-window video file may be alternatively another value. This is not limited in this application.

It may be understood that a sequence of performing step S611 and step S612 is not limited in this application.

(2) First Enable Large-Window Recording and then Enable Small-Window Recording (as Shown in FIG. 6B(1), FIG. 6B(2), and FIG. 6B(3)).

S613: A camera mode module receives a request for enabling large-window recording.

After an electronic device enters a focus tracking mode, a user may trigger large-window recording. Correspondingly, the camera mode module may receive the request for enabling large-window recording.

For example, after entering the focus tracking mode, the electronic device may display the user interface 400 shown in FIG. 2D. The user may tap the recording start control 302 included on the user interface 400. Correspondingly, the camera mode module in the electronic device may receive the request for enabling large-window recording. In response to the request for enabling large-window recording, the electronic device may start large-window recording. It may be understood that the user may further trigger, in a manner such as a voice or a gesture, the electronic device to perform large-window recording.

S614: The camera mode module sends prompt information of starting large-window recording to an encoding control module.

It may be understood that after receiving the request for enabling large-window recording, the camera mode module may send, to the encoding control module, the prompt information of starting large-window recording. The prompt information may also be understood as mode change information indicating that a camera application changes from a large-window preview mode in a focus tracking mode to a large-window recording mode in the focus tracking mode. Large-window preview indicates that a large preview window is in a preview state. Large-window recording indicates that the large preview window is in a recording state.

Correspondingly, the encoding control module may receive the prompt information that is of starting large-window recording and that is sent by the camera mode module.

S615: The encoding control module sends, to a first encoder, a request for starting the first encoder.

It may be understood that for a specific implementation of step S615, reference may be made to step S602. Details are not described herein again.

S616: The first encoder is started.

It may be understood that the first encoder may be started after the first encoder receives the request that is for starting the first encoder and that is sent by the encoding control module.

S617: The camera mode module sends, to a stream management module, the prompt information of starting large-window recording.

It may be understood that after receiving the request for enabling large-window recording, the camera mode module may send, to the stream management module, the prompt information indicating that the camera application starts large-window recording.

It may be understood that a sequence of performing step S614 and step S617 is not limited in this application.

Correspondingly, the stream management module may receive the prompt information that is of starting large-window recording and that is sent by the camera mode module.

S618: The stream management module sends, to a camera HAL, a request for generating a large-window data stream.

It may be understood that the stream management module may send the request for generating the large-window data stream to a camera FWK, and then the camera FWK may send the request to the camera HAL.

It should be noted that, when a camera mode does not change (that is, a mode of the camera application is a large-window recording mode in a focus tracking mode), the stream management module may continuously deliver the request for generating the large-window data stream to the camera HAL. In some embodiments of this application, the stream management module sends the request to the camera HAL at a specific frequency (or a time interval). For example, the stream management module sends the request to the camera HAL every 33 milliseconds.

Correspondingly, the camera HAL may receive the request that is for generating the large-window data stream and that is sent by the stream management module.

S619: The camera HAL processes original image data based on image effect matching the large-window data stream to obtain large-window image data.

According to the foregoing descriptions, after being started, a camera may continuously capture the original image data, and send the captured original image data to the camera HAL. It may be understood that, after receiving the request that is for generating the large-window data stream and that is sent by the stream management module, the camera HAL may process the original image data based on the image effect matching the large-window data stream to obtain the large-window image data.

S620: The camera HAL sends the large-window image data to the first encoder.

It may be understood that after processing the original image data and obtaining the large-window image data, the camera HAL may send the large-window image data to the first encoder.

Correspondingly, the first encoder may receive the large-window image data sent by the camera HAL.

S621: The first encoder encodes the large-window image data to obtain encoded large-window image data, and writes the encoded large-window image data into a large-window video file.

It may be understood that for a specific implementation of step S621, reference may be made to step S611. Details are not described herein again.

S622: The camera mode module receives a request for displaying a small window.

When large-window recording is performed in the focus tracking mode, the user may trigger focus tracking on a photographed object displayed in the large window, to trigger display of the small window and enabling of small-window recording. Correspondingly, the camera mode module may receive the request for displaying the small window.

For example, after performing large-window recording in the focus tracking mode, the electronic device may display the user interface 1600 shown in FIG. 2P. The user may tap the body box 404 included on the user interface 1600. Correspondingly, the camera mode module in the electronic device may receive the request for displaying the small window. In response to the received request for displaying the small window, the electronic device may determine that a person (that is, the person R3) framed and selected by the body box 404 is a focus tracking target, and perform small-window recording based on large-window recording. In a subsequent recording process, the electronic device may display the user interface 1700 shown in FIG. 2Q.

S623: The camera mode module sends, to a display module, the request for displaying the small window.

It may be understood that after receiving the request for displaying the small window, the camera mode module may send, to the display module, the request for displaying the small window.

Correspondingly, the display module may receive the request that is for displaying the small window and that is sent by the camera mode module.

S624: The display module displays the small window.

After receiving the request that is for displaying the small window and that is sent by the camera mode module, the display module may display the small preview window (that is, the small window). It may be understood that an image displayed in the small window is a preview image obtained after the camera HAL processes the original image data based on image effect matching the small-window data stream. For a manner of generating the preview image, details are not described in this application.

S625: The camera mode module sends, to the encoding control module, prompt information of starting small-window recording.

It may be understood that the electronic device is in the focus tracking mode and has enabled large-window recording. In this case, after receiving the request for displaying the small window, the camera mode module may send, to the encoding control module, the prompt information of starting small-window recording. The prompt information may also be understood as mode change information indicating that the camera application changes from the large-window recording mode in the focus tracking mode to a large-window and small-window recording mode in the focus tracking mode.

Correspondingly, the encoding control module may receive prompt information that indicates that the camera application starts small-window recording and that is sent by the camera mode module.

S626: The encoding control module sends, to a second encoder, a request for starting the second encoder.

It may be understood that for a specific implementation of step S626, reference may be made to step S604. Details are not described herein again.

S627: The second encoder is started.

It may be understood that the second encoder may be started after the second encoder receives the request that is for starting the second encoder and that is sent by the encoding control module.

S628: The camera mode module sends, to the stream management module, the prompt information of starting small-window recording.

It may be understood that, after receiving the request for displaying the small window, the camera mode module may send, to the stream management module, the prompt information of starting small-window recording. It may be understood that for related descriptions of step S628, reference may be made to step S625. Details are not described herein again.

It may be understood that a sequence of performing step S625 and step S628 is not limited in this application.

S629: The stream management module sends, to the camera HAL, a request for generating a small-window data stream and a small-window data stream.

It may be understood that for related descriptions of step S629, reference may be made to step S607. Details are not described herein again.

Correspondingly, the camera HAL may receive the request that is for generating the large-window data stream and the small-window data stream and that is sent by the stream management module.

S630: The camera HAL processes the original image data based on image effect matching the large-window data stream and image effect matching the small-window data stream to obtain large-window image data and small-window image data.

It may be understood that for related descriptions of step S630, reference may be made to step S608. Details are not described herein again.

S631: The camera HAL sends the large-window image data to the first encoder.

S632: The camera HAL sends the small-window image data to the second encoder.

S633: The first encoder encodes the large-window image data to obtain encoded large-window image data, and writes the encoded large-window image data into a large-window video file.

S634: The second encoder encodes the small-window image data to obtain encoded small-window image data, and writes the encoded small-window image data into a small-window video file.

It may be understood that for related descriptions of step S631 to step S634, reference may be made to step S609 to step S612. Details are not described herein again.

Figure 7A:
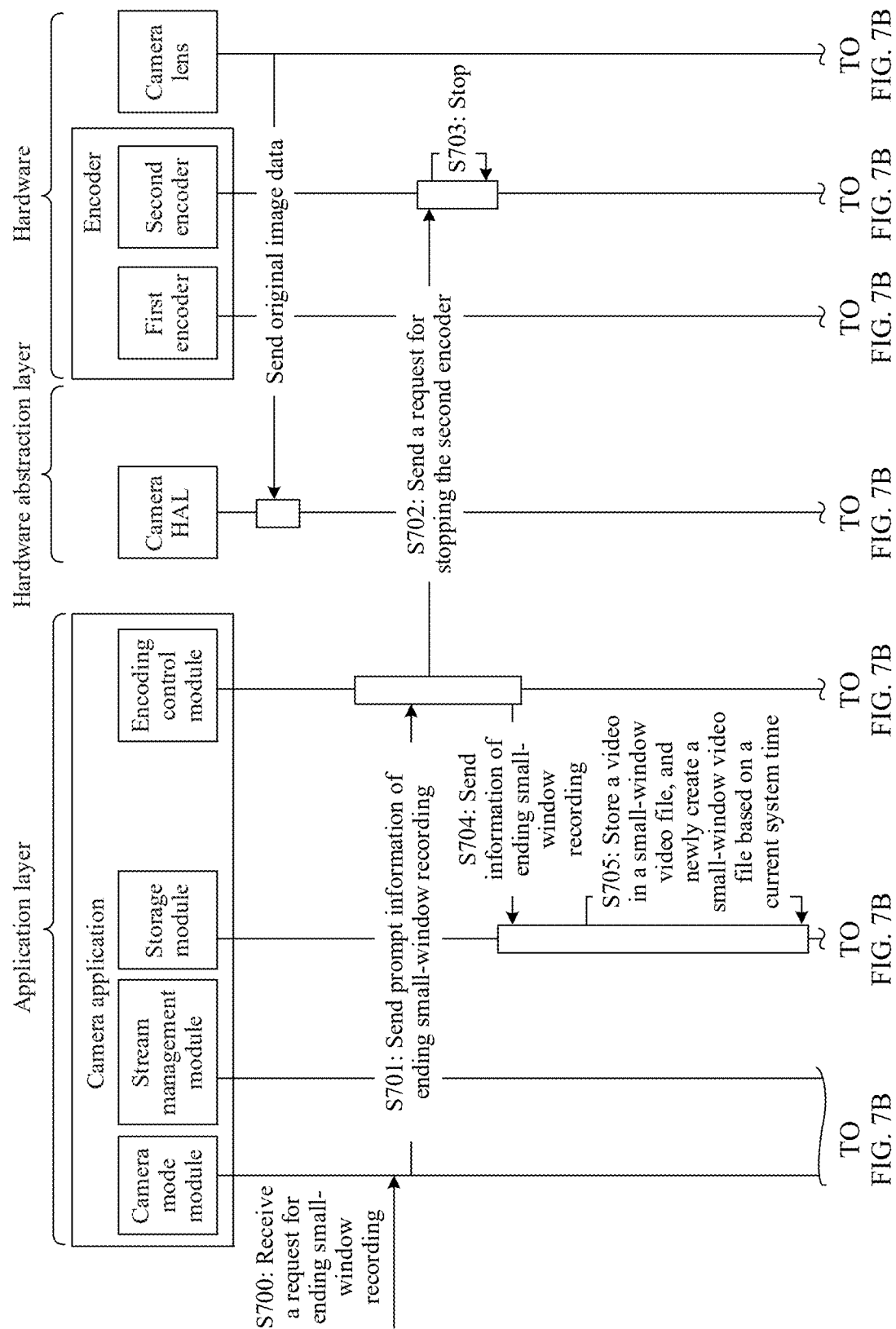
FIG. 7A and FIG. 7B are a sequence diagram of another photographing method according to an embodiment of this application.
Figure 7B:
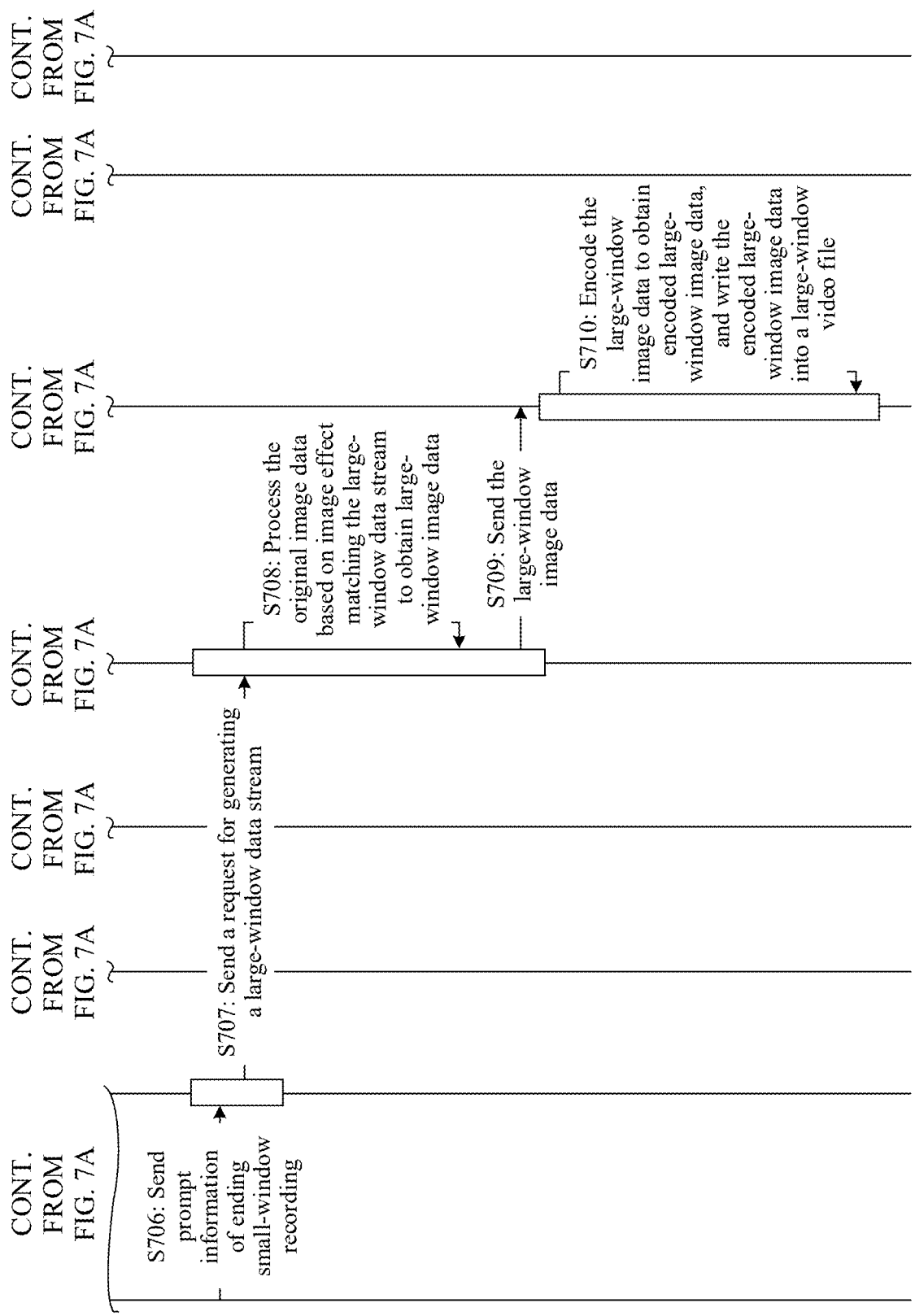

3. End Recording of a Small Preview Window and Continue Recording of a Large Preview Window (as Shown in FIG. 7A and FIG. 7B).

It should be noted that after being started (for example, step S502), the camera may continuously capture the original image data, and send the original image data to the camera HAL (for example, step S503).

S700: A camera mode module receives a request for ending small-window recording.

When recording of a small preview window and recording of a large preview window are both normally performed, a user may tap a recording end control on the small preview window or use another manner, to trigger an end of small-window video recording. Correspondingly, the camera mode module may receive the request for ending small-window recording.

For example, an electronic device may display the user interface 1000 shown in FIG. 2J. The small preview window 501 on the user interface 1000 includes the recording end control 1003. The user may tap the recording end control 1003 included on the user interface 1000. Correspondingly, the camera mode module in the electronic device may receive the request for ending small-window recording. In response to the request for ending small-window recording, the electronic device may end recording of the small preview window 501, that is, end recording of a close-up video. Recording of the preview window 201 is not affected. It may be understood that the user may further trigger, in a manner such as a voice or a gesture, the end of small-window video recording.

S701: The camera mode module sends, to an encoding control module, prompt information of ending small-window recording.

After receiving the request for ending small-window recording, the camera mode module may send, to the encoding control module, the prompt information of ending small-window recording. The prompt information may also be understood as mode change information indicating that a camera application changes from a large-window and small-window recording mode to a large-window recording mode. For related descriptions of large-window and small-window recording, refer to the foregoing descriptions. Details are not described herein again. The large-window recording mode indicates that the large preview window is in a recording state.

Correspondingly, the encoding control module may receive the prompt information that is of ending small-window recording and that is sent by the camera mode module.

S702: The encoding control module sends, to a second encoder, a request for stopping the second encoder.

It may be understood that after receiving the prompt information that is of ending small-window recording and that is sent by the camera mode module, the encoding control module may send, to the second encoder, the request for stopping the second encoder. Specifically, the encoding control module may send, to a media FWK, the request for stopping the second encoder, and then the media FWK sends, to the second encoder by using a Vendor warehouse, the request for stopping the second encoder.

For example, the request for stopping the second encoder may include codec-2.stop.

Correspondingly, the second encoder may receive the request that is for stopping the second encoder and that is sent by the encoding control module.

S703: The second encoder is stopped.

It may be understood that the second encoder may be stopped after the second encoder receives the request that is for stopping the second encoder and that is sent by the encoding control module.

S704: The encoding control module sends, to a storage module, information of ending small-window recording.

In some embodiments of this application, the information of ending small-window recording may include a file name of a small-window video file.

In some embodiments of this application, the information of ending small-window recording may further include a timestamp of the small-window video file.

In some embodiments of this application, the information of ending small-window recording may be an end identifier. Certainly, the information of ending small-window recording may be in forms of a text, a number, a character, and the like. This is not limited in this application.

Correspondingly, the storage module may receive the information that is of ending small-window recording and that is sent by the encoding control module.

S705: The storage module stores a video in the small-window video file, and newly create a small-window video file based on a current system time.

It may be understood that after receiving the information that is of ending small-window recording and that is sent by the encoding control module, the storage module may store the video in the small-window video file in a memory, and newly create the small-window video file based on the current system time. A timestamp of the newly created small-window video file is a third moment. It should be noted that an initial state of the small-window video file newly created based on the current system time is empty (that is, there is no data).

In some embodiments of this application, the newly created small-window video file may be video-3. The third moment is time-3.

It should be noted that in this case, the encoding control module may determine an encoder parameter of a third encoder associated with a small-window data stream and the newly created small-window video file. The encoding control module may further send the encoder parameter of the third encoder to an encoder. The encoder may create the third encoder based on the encoder parameter of the third encoder. For related descriptions of this part, refer to step S508, and step S512 to step S514. Details are not described herein again.

For example, the third encoder may be codec-3.

It may be understood that the electronic device may first end small-window recording and store a recorded video, and then end large-window recording and store a recorded video. The user can view a plurality of recorded videos in a gallery application. For example, the electronic device may display the user interface 1402 shown in (b) in FIG. 2N. The user interface 1402 may include the video 14021 and the video 14022. It may be understood that the video 14021 is the recorded video of the large window (that is, an original video), and the video 14022 is the recorded video of the small window (that is, a close-up video). Duration of the video 14021 is 8 s, and duration of the video 14022 is 5 s. In other words, the duration of the video 14021 is longer than the duration of the video 14022.

S706: The camera mode module may send, to a stream management module, the prompt information of ending small-window recording.

After receiving the request for ending small-window recording, the camera mode module may send, to the stream management module, the prompt information of ending small-window recording. It may be understood that for related descriptions of step S706, reference may be made to step S701. Details are not described herein again.

It may be understood that a sequence in which the electronic device performs step S701 and step S706 is not limited in this application.

S707: The stream management module sends, to a camera HAL, a request for generating a large-window data stream.

It may be understood that the stream management module may send the request for generating the large-window data stream to a camera FWK, and then the camera FWK may send the request to the camera HAL.

It should be noted that, when a camera mode does not change (a mode of the camera application is the large-window recording mode), the stream management module may continuously deliver the request for generating the large-window data stream to the camera HAL. In some embodiments of this application, the stream management module sends the request to the camera HAL at a specific frequency (or a time interval). For example, the stream management module sends the request to the camera HAL every 33 milliseconds.

Correspondingly, the camera HAL may receive the request that is for generating the large-window data stream and that is sent by the stream management module.

S708: The camera HAL processes original image data based on image effect matching the large-window data stream to obtain large-window image data.

According to the foregoing descriptions, after being started, a camera may continuously capture the original image data, and send the captured original image data to the camera HAL. It may be understood that, after receiving the request that is for generating the large-window data stream and that is sent by the stream management module, the camera HAL may process the original image data based on the image effect matching the large-window data stream to obtain the large-window image data.

S709: The camera HAL sends the large-window image data to a first encoder.

It may be understood that after processing the original image data and obtaining the large-window image data, the camera HAL may send the large-window image data to the first encoder.

Correspondingly, the first encoder may receive the large-window image data sent by the camera HAL.

S710: The first encoder encodes the large-window image data to obtain encoded large-window image data, and writes the encoded large-window image data into a large-window video file.

It may be understood that for related descriptions of step S710, reference may be made to step S611. Details are not described herein again.

4. End Both Recording of a Large Preview Window and Recording of a Small Preview Window (as Shown in FIG. 8 and FIG. 9).

Figure 8:
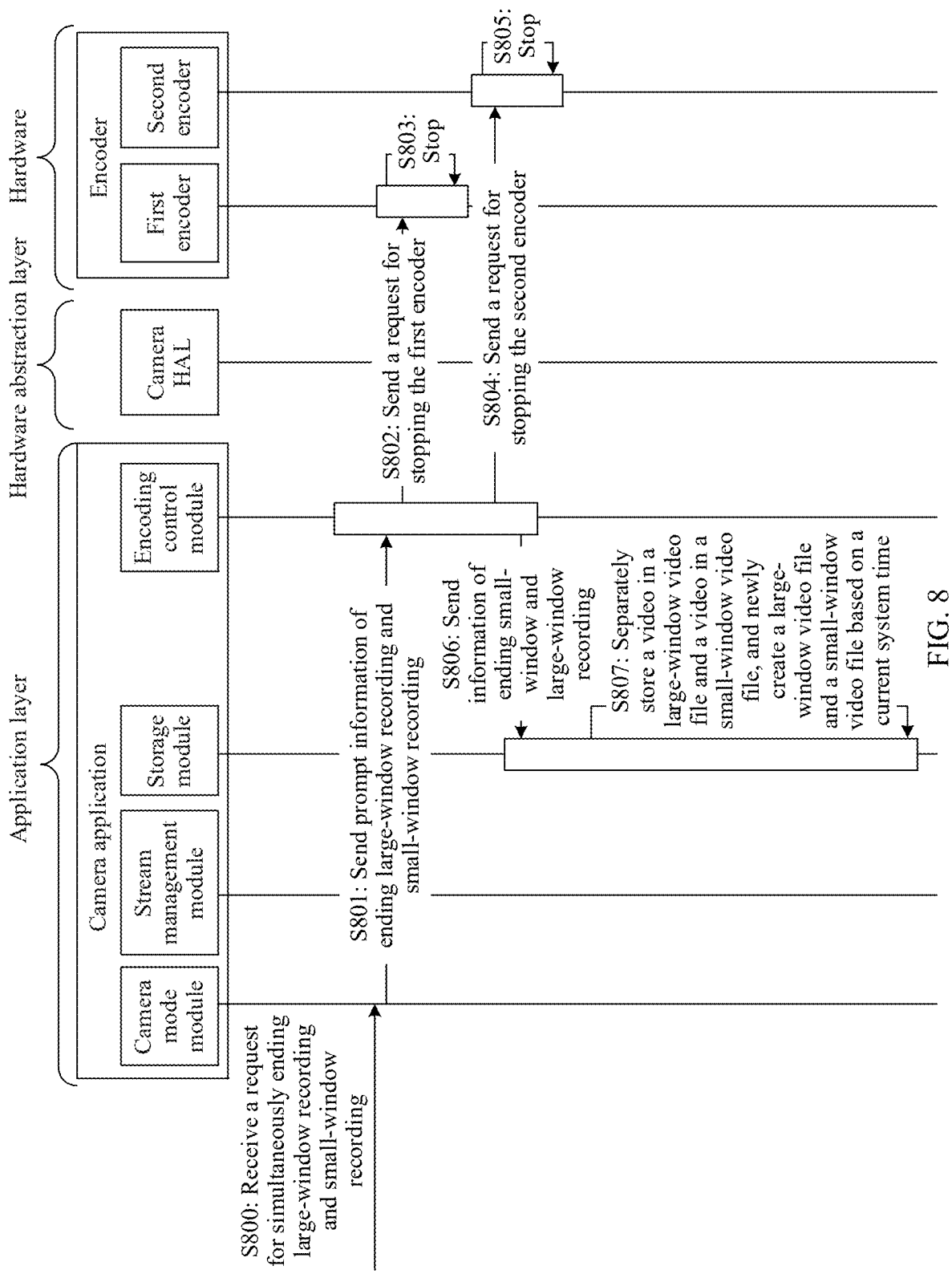
FIG. 8 is a sequence diagram of another photographing method according to an embodiment of this application.
Figure 9:
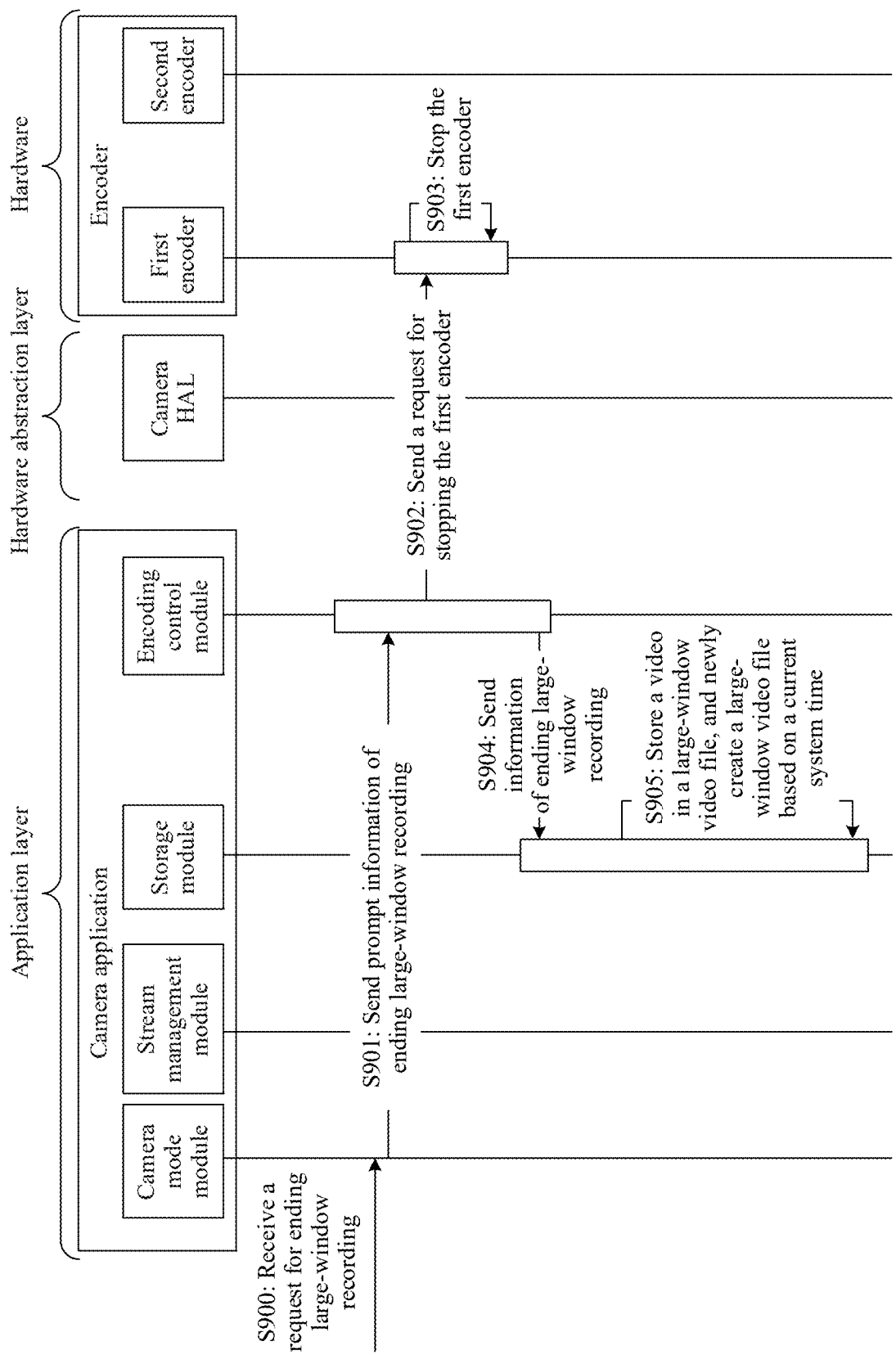
FIG. 9 is a sequence diagram of another photographing method according to an embodiment of this application.

(1) End Large-Window Recording when Recording of the Small Preview Window and Recording of the Large Preview Window are Both Normally Performed (as Shown in FIG. 8).

As shown in the flowcharts in FIG. 6A(1), FIG. 6A(2), FIG. 6B(1), FIG. 6B(2), and FIG. 6B(3), the electronic device may simultaneously perform recording of the small preview window and recording of the large preview window. In this case, the user may trigger an end of recording of the small preview window and an end of recording of the large preview window.

S800: A camera mode module receives a request for simultaneously ending large-window recording and small-window recording.

When recording of a small preview window and recording of a large preview window are both normally performed, a user may tap a recording end control corresponding to the large preview window or use another manner, to trigger an end of small-window video recording and an end of large-window video recording. Correspondingly, the camera mode module may receive the request for simultaneously ending large-window recording and small-window recording.

For example, an electronic device may display the user interface 1000 shown in FIG. 2J. The user interface 1000 includes the recording end control 1004. The user may tap the recording end control 1004. Correspondingly, the camera mode module in the electronic device may receive the request for simultaneously ending large-window recording and small-window recording. In response to the request for simultaneously ending large-window recording and small-window recording, the electronic device may end recording of the small preview window 501 and recording of the preview window 201, that is, end recording of an original video and recording of a close-up video.

S801: The camera mode module sends, to an encoding control module, prompt information of ending large-window recording and small-window recording.

After receiving the request for simultaneously ending large-window recording and small-window recording, the camera mode module may send, to the encoding control module, the prompt information of ending large-window recording and small-window recording. The prompt information may also be understood as mode change information indicating that a camera application changes from a large-window and small-window recording mode to a preview mode. For related descriptions of large-window and small-window recording, refer to the foregoing descriptions. Details are not described herein again. The preview mode may indicate that the large preview window is in a video preview state, and the small preview window is not displayed.

Correspondingly, the encoding control module may receive the prompt information that is of ending large-window recording and small-window recording and that is sent by the camera mode module.

S802: The encoding control module sends, to a first encoder, a request for stopping the first encoder.

It may be understood that after receiving the prompt information that is of ending large-window recording and small-window recording and that is sent by the camera mode module, the encoding control module may send, to the first encoder, the request for stopping the first encoder. Specifically, the encoding control module may send, to a media FWK, the request for stopping the first encoder, and then the media FWK sends, to the first encoder by using a Vendor warehouse, the request for stopping the first encoder.

For example, the request for stopping the second encoder may include codec-1.stop.

Correspondingly, the first encoder may receive the request that is for stopping the first encoder and that is sent by the encoding control module.

S803: The first encoder is stopped.

It may be understood that the first encoder may be stopped after the first encoder receives the request that is for stopping the first encoder and that is sent by the encoding control module.

S804: The encoding control module sends, to a second encoder, a request for stopping the second encoder.

It may be understood that for related descriptions of step S804, reference may be made to step S702. Details are not described herein again. It may be understood that a sequence in which the electronic device performs step S802 and step S804 is not limited in this application.

S805: The second encoder is stopped.

It may be understood that the second encoder may be stopped after the second encoder receives the request that is for stopping the second encoder and that is sent by the encoding control module.

S806: The encoding control module sends, to a storage module, information of ending large-window and small-window recording.

In some embodiments of this application, the information of ending large-window and small-window recording may include a file name of a large-window video file and a file name of a small-window video file.

In some embodiments of this application, the information of ending large-window and small-window recording may further include a timestamp of the large-window video file and a timestamp of the small-window video file.

In some embodiments of this application, the information of ending large-window and small-window recording may be an end identifier. Certainly, the information of ending large-window and small-window recording may be in forms of a text, a number, a character, and the like. This is not limited in this application.

Correspondingly, the storage module may receive the information that is of ending large-window and small-window recording and that is sent by the encoding control module.

S807: The storage module separately stores a video in a large-window video file and a video in a small-window video file, and newly creates a large-window video file and a small-window video file based on a current system time.

It may be understood that after receiving the information that is of ending large-window and small-window recording and that is sent by the encoding control module, the storage module may store the video in the large-window video file and the video in the small-window video file in a memory, and newly create the large-window video file and the small-window video file based on the current system time. A timestamp of the newly created small-window video file is a third moment.

In some embodiments of this application, when the storage module stores the video in the large-window video file, the timestamp of the large-window video file may be updated to a fourth moment. In some embodiments of this application, the timestamp of the large-window video file is the same as a timestamp of the video in the large-window video file. The fourth moment is the current system time.

It may be understood that the fourth moment is later than the third moment.

In some embodiments of this application, the fourth moment is time-4.

For example, in the large-window and small-window recording mode, the user may first trigger an end of small-window recording and then trigger a start of small-window recording. Once large-window and small-window recording are ended, the storage module may store the large-window video file and the newly created small-window video file. A correspondence between a file name and a timestamp is shown in Table 2.

TABLE 2

| File Name | Timestamp |
|---|---|
| video-1 | time-4 |
| video-3 | time-3 |

For example, in the large-window and small-window recording mode, a case in which large-window recording is separately triggered does not exist. Once large-window and small-window recording are ended, the storage module may store the large-window video file and the small-window video file. A correspondence between a file name and a timestamp may be shown in Table 3. Details are not described herein.

TABLE 3

| File Name | Timestamp |
|---|---|
| video-1 | time-4 |
| video-2 | time-2 |

It may be understood that the electronic device may simultaneously end large-window recording and small-window recording, and store recorded videos. The user can view a plurality of recorded videos in a gallery application. For example, the electronic device may display the user interface 1401 shown in (a) in FIG. 2N. The user interface 1401 may include the video 14011 and the video 14012. It may be understood that the video 14011 is the recorded video of the large window (that is, an original video), and the video 14012 is the recorded video of the small window (that is, a close-up video). Duration of the video 14011 and duration of the video 14012 are both 3 s. In other words, the duration of the video 14011 is the same as the duration of the video 14012.

(2) End Large-Window Recording when Recording of the Small Preview Window is Ended and Recording of the Large Preview Window is Normally Performed (as Shown in FIG. 9).

As shown in the flowchart in FIG. 7A and FIG. 7B, after the electronic device ends recording of the small preview window, the electronic device may continue recording of the large preview window. In this case, the user may trigger an end of recording of the large preview window.

S900: A camera mode module receives a request for ending large-window recording.

When recording of a small preview window is ended and recording of a large preview window is normally performed, a user may tap a recording end control corresponding to the large preview window or use another manner, to trigger an end of large-window video recording. Correspondingly, the camera mode module may receive the request for ending large-window recording.

For example, an electronic device may display the user interface 1000 shown in FIG. 2J. The small preview window 501 on the user interface 1000 includes the recording end control 1003. The electronic device may detect a user operation performed on the recording end control 1003. In response to the user operation, the electronic device may end recording of the small preview window 501, and display the user interface 1600 shown in FIG. 2P. The user interface 1600 may include the recording end control 1004. The user may tap the recording end control 1004. The camera mode module in the electronic device may receive the request for ending large-window recording. In response to the request for ending large-window recording, the electronic device may end recording of the preview window 201.

S901: The camera mode module sends, to an encoding control module, prompt information of ending large-window recording.

After receiving the request for ending large-window recording, the camera mode module may send, to the encoding control module, the prompt information of ending large-window recording. The prompt information may also be understood as mode change information indicating that a camera application changes from a large-window recording mode to a preview mode.

Correspondingly, the encoding control module may receive the prompt information that is of ending large-window recording and that is sent by the camera mode module.

S902: The encoding control module sends, to a first encoder, a request for stopping the first encoder.

It may be understood that for related descriptions of step S902, reference may be made to step S802. Details are not described herein again.

S903: The first encoder is stopped.

It may be understood that for related descriptions of step S903, reference may be made to step S803. Details are not described herein again.

S904: The encoding control module sends, to a storage module, information of ending large-window recording.

In some embodiments of this application, the information of ending large-window recording may include a file name of a large-window video file.

In some embodiments of this application, the information of ending large-window recording may further include a timestamp of the large-window video file.

In some embodiments of this application, the information of ending large-window recording may be an end identifier. Certainly, the information of ending large-window recording may be in forms of a text, a number, a character, and the like. This is not limited in this application.

Correspondingly, the storage module may receive the information that is of ending large-window recording and that is sent by the encoding control module.

S905: The storage module stores a video in the large-window video file, and newly create a large-window video file based on a current system time.

It may be understood that after receiving the information that is of ending large-window recording and that is sent by the encoding control module, the storage module may store the video in the large-window video file in a memory, and newly create the large-window video file based on the current system time.

In some embodiments of this application, when the storage module stores the video in the large-window video file, the timestamp of the large-window video file may be updated to the current system time.

It may be understood that the electronic device may first end small-window recording and store a recorded video, and then end large-window recording and store a recorded video. The user can view a plurality of recorded videos in a gallery application. For example, the electronic device may display the user interface 1402 shown in (b) in FIG. 2N. The user interface 1402 may include the video 14021 and the video 14022. It may be understood that the video 14021 is the recorded video of the large window (that is, an original video), and the video 14022 is the recorded video of the small window (that is, a close-up video). Duration of the video 14021 is 8 s, and duration of the video 14022 is 5 s. In other words, the duration of the video 14021 is longer than the duration of the video 14022.

The following describes a photographing method provided in an embodiment of this application.

Figure 10:
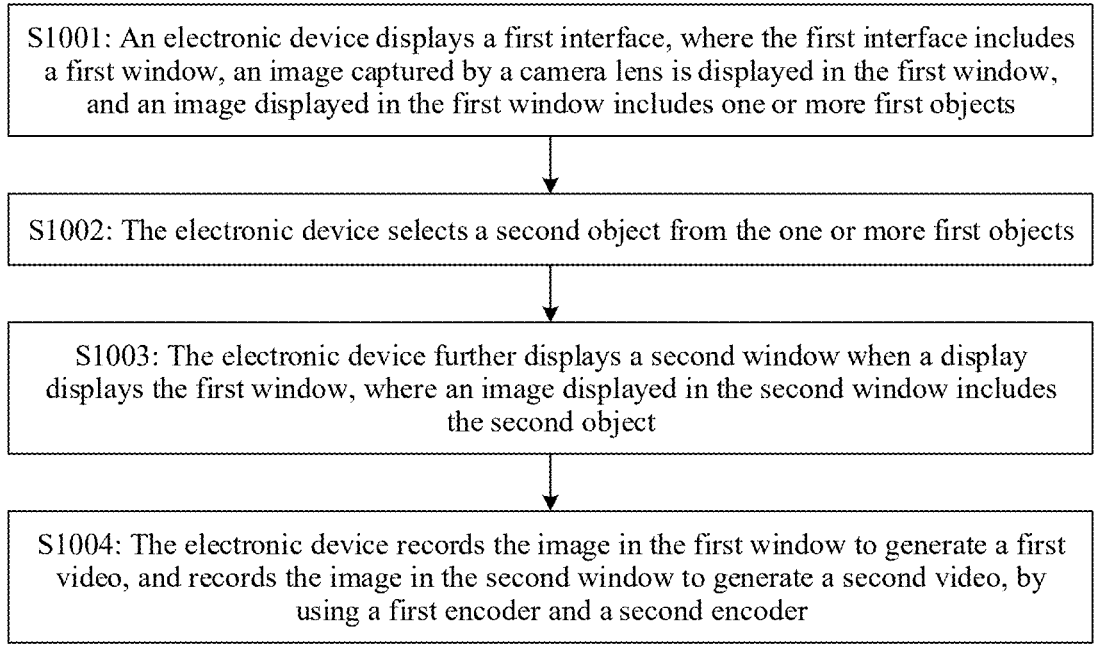
FIG. 10 is a flowchart of a photographing method according to an embodiment of this application.

FIG. 10 is a flowchart of a photographing method according to an embodiment of this application. The photographing method may be applied to an electronic device provided with a camera and a display. The photographing method may include but is not limited to the following steps.

S1001: The electronic device displays a first interface. The first interface includes a first window. An image captured by the camera is displayed in the first window. An image displayed in the first window includes one or more first objects.

The electronic device may display the first interface on the display. The first interface may include the first window. The image captured by the camera may be displayed in the first window. The image displayed in the first window may include the one or more first objects.

It may be understood that the first interface may be an interface displayed before the electronic device enters a focus tracking mode, or may be an interface displayed after the electronic device enters a focus tracking mode. For example, the first interface may be the user interface 300 shown in FIG. 2C. For example, the first interface may be the user interface 400 shown in FIG. 2D.

In a possible implementation, the first object may be a person. For example, as shown in FIG. 2D, the one or more first objects included in the image displayed in the first window may be the person R1, the person R2, and the person R3 that are displayed in the preview window 201. In still another possible implementation, the first object may be an animal, a plant, or the like. A specific type of the first object is not limited in this application.

It may be understood that the electronic device may recognize, by using a detection algorithm (for example, a human body detection algorithm), the first object included in the image displayed in the first window. For related descriptions of the detection algorithm, refer to the related technical documents. Details are not described herein.

It may be understood that the first window may be the large preview window/the large window in the foregoing embodiments. For example, the first window may be the preview window 201.

S1002: The electronic device selects a second object from the one or more first objects.

The user may trigger the electronic device to select the second object in a manner such as a tap, a voice, or a gesture. Specifically, the electronic device may receive a request for selecting the second object. In response to the request, the electronic device may select the second object from the one or more first objects included in the image displayed in the first window. The electronic device may use the selected second object as a focus tracking object.

For example, as shown in FIG. 2D, the user may tap the body box 403. Correspondingly, the electronic device may receive a request for selecting the person R2. In response to the request, the electronic device may select the person R2 from the person R1, the person R2, and the person R3 that are included in the image displayed in the preview window 201, and use the person R2 as a focus tracking object.

S1003: The electronic device further displays a second window when a display displays the first window, where an image displayed in the second window includes the second object.

It may be understood that, when displaying the first window on the display, the electronic device may further display the second window on the display. The image displayed in the second window may include the second object.

In a possible implementation, the first window and the second window may be displayed in a split-screen mode.

In another possible implementation, the second window may be displayed above the first window, but does not completely cover the first window. For example, as shown in FIG. 2E, the small preview window 501 is displayed above the preview window 201, but the small preview window 501 does not completely cover the preview window 201.

It should be noted that the second window may be a small preview window/small window. For example, the second window may be the small preview window 501.

S1004: The electronic device records the image in the first window to generate a first video, and records the image in the second window to generate a second video, by using a first encoder and a second encoder.

It may be understood that the electronic device may record the images in the first window and the second window by using the first encoder and the second encoder. The electronic device may record, by using the first encoder, the image in the first window to generate the first video, and record, by using the second encoder, the image in the second window to generate the second video.

It may be understood that the first video may be an original video, and the second video may be a close-up video of the second object. For example, the first video may be a video 14011 shown in a in FIG. 2N, and the second video may be a video 14012 shown in a in FIG. 2N. For example, the first video may be a video 14021 shown in b in FIG. 2N, and the second video may be a video 14022 shown in b in FIG. 2N.

Figure 11:
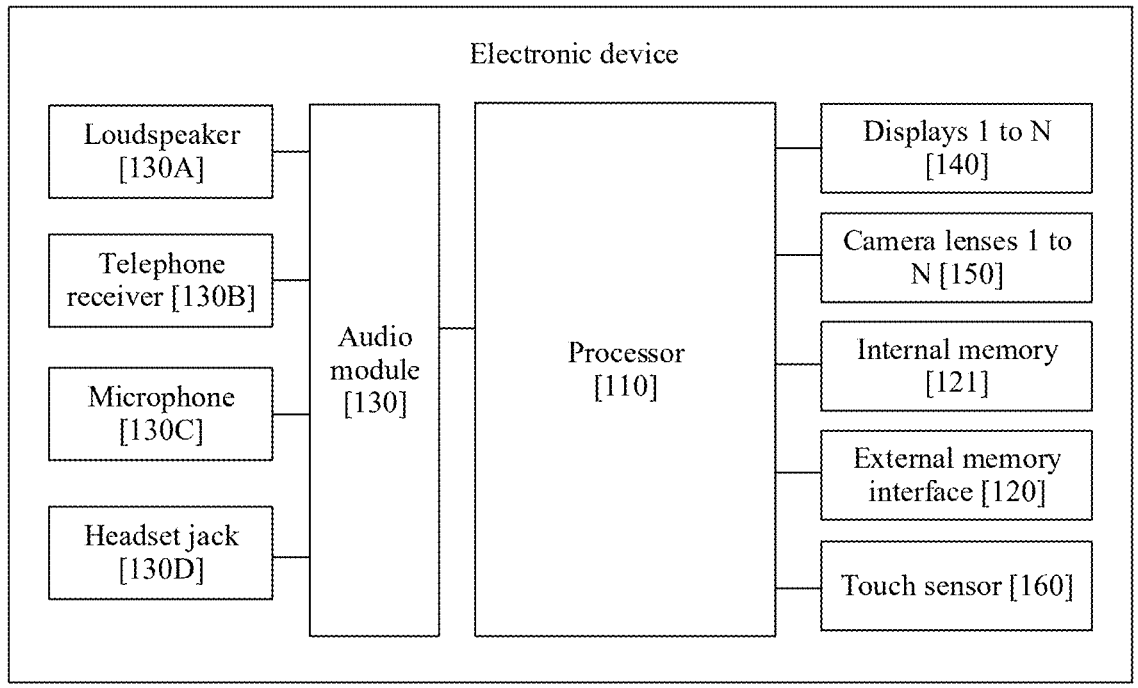
FIG. 11 is a schematic diagram of a hardware structure of an electronic device according to an embodiment of this application.

FIG. 11 is a schematic diagram of a hardware structure of an electronic device according to an embodiment of this application.

The electronic device may include a processor 110, an external memory interface 120, an internal memory 121, an audio module 130, a loudspeaker 130A, a telephone receiver 130B, a microphone 130C, a headset jack 130D, a display 140, a camera 150, and a touch sensor 160.

The structure shown in this embodiment of the present invention does not constitute a specific limitation on the electronic device. In some other embodiments of this application, the electronic device may include more or fewer components than those illustrated, or some components may be combined, or some components may be split, or a different component deployment may be used. The illustrated components may be implemented by hardware, software, or a combination of software and hardware. An interface connection relationship between modules shown in this embodiment of the present invention is merely a schematic description, and does not constitute a limitation on the structure of the electronic device.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (Neural-network Processing Unit, NPU). The processor 110 may be further provided with a memory configured to store instructions and data.

The electronic device implements a display function through the GPU, the display 140, the application processor, and the like.

The GPU is a microprocessor for image processing and is connected to the display 140 and the application processor. The GPU is configured to perform mathematical and geometric calculations and graphics rendering. The processor 110 may include one or more GPUs that execute program instructions to generate or change display information. The display 140 is configured to display an image, a video, and the like. In some embodiments, the electronic device may include one or N displays 140, where N is a positive integer greater than 1.

In this embodiment of this application, the electronic device displays an original image captured by the camera and a close-up image of a main character determined through focus tracking, has capabilities of the user interfaces shown in FIG. 2A to FIG. 2X, and has a display function provided by the GPU, the display 140, and the application processor.

The electronic device may implement a photographing function through the ISP, the camera 150, the video codec, the GPU, the display 140, the application processor, and the like.

The camera 150 is configured to capture a still image or video. The ISP is configured to process data fed back by the camera 150. Light is transmitted to a photosensitive element of the camera through a lens, an optical signal is converted into an electrical signal, and the photosensitive element of the camera transmits the electrical signal to the ISP for processing, to convert the electrical signal into a visible image. The electronic device may include one or N cameras 150, where N is a positive integer greater than 1. The video codec is configured to compress or decompress a digital video. The electronic device may support one or more types of video codecs. Therefore, the electronic device may play or record videos in a plurality of encoding formats, such as moving picture experts group (moving picture experts group, MPEG)1, MPEG2, MPEG3, and MPEG4.

In this embodiment of this application, the electronic device implements the photographing method provided in embodiments of this application. First, the electronic device relies on the ISP to process the image captured by the camera 150, and then relies on image computing and processing capabilities provided by the video codec and the GPU.

The internal memory 121 may include one or more random access memories (random access memory, RAM) and one or more non-volatile memories (non-volatile memory, NVM). The random access memory may be directly read and written by using the processor 110, and may be configured to store an executable program (for example, a machine instruction) of an operating system or another running program, and may be further configured to store data of a user, an application, and the like. The non-volatile memory may also store the executable program, the data of the user, and the data of the application, and the like, which may be loaded into the random access memory in advance for directly reading and writing by the processor 110.

In this embodiment of this application, code for implementing the photographing method described in embodiments of this application may be stored in a non-volatile memory. When running a camera application, the electronic device may load the executable code stored in the non-volatile memory into a random access memory.

The external memory interface 120 may be configured to connect to an external non-volatile memory, to expand a storage capability of the electronic device.

The electronic device may implement an audio function through the audio module 130, the loudspeaker 130A, the telephone receiver 130B, the microphone 130C, the headset jack 130D, the application processor, and the like.

The audio module 130 is configured to convert digital audio information into an analog audio signal for output, and may also be configured to convert an analog audio input into a digital audio signal. The loudspeaker 130A, also referred to as a "horn", is configured to convert an electrical audio signal into a sound signal. The telephone receiver 130B, also referred to as a "handset", is configured to convert an electrical audio signal into a sound signal. The microphone 130C, also referred to as a "voice tube" or a "mike", is configured to convert a sound signal into an electrical signal. The headset jack 130D is configured to connect to a wired headset.

In this embodiment of this application, in a process in which the electronic device enables the camera to capture an image, the electronic device may enable the microphone 130C to collect a sound signal, convert the sound signal into an electrical signal, and store the electrical signal. In this way, a user can obtain an audio video.

A touch sensor 160 is also referred to as a "touch device". The touch sensor 160 may be disposed on the display 140. The touch sensor 160 and the display 140 constitute a touchscreen, which is also referred to as a "touch screen". The touch sensor 160 is configured to detect a touch operation performed on or near the touch sensor 160. The touch sensor may transmit the detected touch operation to the application processor, to determine a touch event type. The touch sensor may provide, by using the display 140, a visual output related to the touch operation. In some other embodiments, the touch sensor 160 may be alternatively disposed on a surface of the electronic device. A position of the touch sensor 160 is different from the position of the display 140.

In this embodiment of this application, the electronic device may detect, by using the touch sensor 160, an operation such as tapping or sliding performed by the user on the display 140, to implement the photographing method shown in FIG. 2A to FIG. 2X.

The foregoing embodiments are merely intended for describing the technical solutions of this application, but not for limiting this application. Although this application is described in detail with reference to the foregoing embodiments, a person of ordinary skill in the art should understand that the person of ordinary skill may still make modifications to the technical solutions described in the foregoing embodiments or make equivalent replacements to some technical features thereof, without departing from the scope of the technical solutions of embodiments of this application.

The invention claimed is:

1. A photographing method, applied to an electronic device, wherein the electronic device comprises a camera, a display, a first encoder, and a second encoder, and the method comprises:
displaying a first interface, wherein the first interface comprises a first window and a first control, an image captured by the camera is displayed in the first window, the image displayed in the first window comprises one or more first objects, and the first control is used to enable a focus tracking mode;
receiving an operation performed on the first control, creating the first encoder, and creating the second encoder;
selecting a second object from the one or more first objects;
further displaying a second window when the display displays the first window, wherein an image displayed in the second window comprises the second object; and
recording the image in the first window to generate a first video, and recording the image in the second window to generate a second video, by using the first encoder and the second encoder.

2. The method according to claim 1, wherein after the displaying a second window, the method further comprises:
receiving a recording start operation, enabling the first encoder, and enabling the second encoder.

3. The method according to claim 1, wherein before the selecting a second object from the one or more first objects, the method further comprises: receiving a recording start operation, and enabling the first encoder; and
after the selecting a second object from the one or more first objects, the method further comprises: enabling the second encoder.

4. The method according to claim 1, wherein the recording the image in the first window to generate a first video, and recording the image in the second window to generate a second video, by using the first encoder and the second encoder specifically comprises:
recording the image in the first window by using the first encoder to generate the first video, after the first encoder is enabled; and recording the image in the second window by using the second encoder to generate the second video, after the second encoder is enabled.

5. The method according to claim 4, wherein after the recording the image in the first window to generate a first video, and recording the image in the second window to generate a second video, by using the first encoder and the second encoder, the method further comprises:
receiving a recording end operation, stopping encoding of the first encoder and encoding of the second encoder, and generating the first video and the second video, wherein a recording end moment of the first video is the same as a recording end moment of the second video.

6. The method according to claim 4, wherein after the recording the image in the second window by using the second encoder to generate the second video, after the second encoder is enabled, the method further comprises:
receiving a recording end operation performed on the second window, closing the second window, stopping encoding of the second encoder, and generating the second video.

7. The method according to claim 6, wherein after the generating the second video, the method further comprises:
receiving a recording end operation performed on the first window, stopping encoding of the first encoder, and generating the first video, wherein a recording end moment of the first video is later than a recording end moment of the second video.

8. The method according to claim 6, wherein after the generating the second video, the method further comprises:
selecting a third object from the one or more first objects, wherein the third object is the same as or different from the second object;
newly displaying the second window when the display displays the first window; and
enabling the second encoder, and recording the image in the second window by using the second encoder to generate a third video.

9. The method according to claim 8, wherein after the recording the image in the second window by using the second encoder to generate a third video, the method further comprises:
receiving a recording end operation, stopping encoding of the first encoder and encoding of the second encoder, and generating the first video and the third video, wherein a recording start moment of the first video is earlier than a recording start moment of the third video, and a recording end moment of the first video is the same as a recording end moment of the third video.

10. The method according to claim 9, wherein a select box is displayed on the one or more first objects, and the selecting a second object from the one or more first objects specifically comprises: receiving an operation performed on the first select box, and determining, as the second object, a first object corresponding to the first select box;
and the image displayed in the second window comprises the second object specifically comprises that a close-up object of the second object is displayed in the second window.

11. The method according to claim 1, wherein in a recording process, the method further comprises:
selecting a fourth object from the one or more first objects, wherein the fourth object is different from the second object; and
displaying a close-up image of the fourth object in the second window.

12. The method according to claim 11, wherein the electronic device comprises a camera HAL, and the recording the image in the first window to generate a first video, and recording the image in the second window to generate a second video, by using the first encoder and the second encoder specifically comprises:
processing, by the camera HAL, original image data based on image effect matching a first path of data stream to obtain first image data, and processing, based on image effect matching a second path of data stream, the original image data to obtain second image data, wherein the first path of data stream is a data stream corresponding to the first window, and the second path of data stream is a data stream corresponding to the second window;

sending, by the camera HAL, the first image data to the first encoder, and sending the second image data to the second encoder;

encoding, by the first encoder, the first image data to obtain first encoded image data, and writing the first encoded image data into a first video file, wherein the first video file is used to store the first video; and encoding, by the second encoder, the second image data to obtain second encoded image data, and writing the second encoded image data into a second video file, wherein the second video file is used to store the second video.

13. The method according to claim 6, wherein the electronic device comprises a camera mode module, an encoding control module, and a storage module; and after the receiving a recording end operation performed on the second window, the method further comprises: sending, by the camera mode module, first prompt information to the encoding control module, wherein the first prompt information is used to prompt an end of recording of the second window; and the stopping encoding of the second encoder, and generating the second video specifically comprises:

sending, by the encoding control module, a stop request to the second encoder;

stopping, by the second encoder, encoding image data in a second path of data stream;

sending, by the encoding control module, first end information to the storage module, wherein the first end information is used to prompt an end of recording of the second window; and storing, by the storage module, the second video in the second video file, and generating a third video file based on a current system time, wherein the third video file is used to store a video obtained after the image data in the second path of data stream is encoded.

14. The method according to claim 8, wherein the electronic device comprises a camera mode module, an encoding control module, and a camera HAL;

after the selecting a third object from the one or more first objects, the method further comprises: sending, by the camera mode module, second prompt information to the encoding control module, wherein the second prompt information is used to prompt a restart of recoding of the second window;

the enabling the second encoder specifically comprises:

sending, by the encoding control module, an enabling request to the second encoder, and enabling the second encoder; and the recording the image in the second window by using the second encoder to generate a third video specifically comprises:

processing, by the camera HAL, original image data based on image effect matching a second path of data stream to obtain second image data, and sending the second image data to the second encoder; and encoding, by the second encoder, the second image data to obtain second encoded image data, and writing the second encoded image data into a third video file, wherein the third video file is used to store the third video, and a generating time of the third video file is later than a generating time of a file used to store the second video.

15. The method according to claim 5, wherein the electronic device comprises a camera mode module, an encoding control module, and a storage module; and after the receiving a recording end operation, the method further comprises: sending, by the camera mode module, third prompt information to the encoding control module, wherein the third prompt information is used to prompt an end of recording of the first window and an end of recording of the second window; and the stopping encoding of the first encoder and encoding of the second encoder, and generating the first video and the second video specifically comprises:

sending, by the encoding control module, a stop request to the first encoder, and sending a stop request to the second encoder;

stopping, by the first encoder, encoding image data in a first path of data stream;

stopping, by the second encoder, encoding image data in a second path of data stream;

sending, by the encoding control module, second end information to the storage module, wherein the second end information is used to prompt an end of recording of the first window and an end of recording of the second window; and storing, by the storage module, the first video in the first video file and the second video in the second video file, and generating a fourth video file and a third video file based on a current system time, wherein the fourth video file is used to store a video obtained after the image data in the first path of data stream is encoded, and the third video file is used to store a video obtained after the image data in the second path of data stream is encoded.

16. The method according to claim 14, wherein before the second video in the second video file is stored, the method further comprises: updating, by the storage module, a timestamp of the second video file to a current system time.

17. The method according to claim 1, wherein the electronic device comprises an encoding control module and an encoder, and the creating the first encoder, and creating the second encoder specifically comprises:

determining, by the encoding control module, a first encoding parameter and a second encoding parameter based on stream configuration information and file information, wherein the first encoding parameter is an encoder parameter corresponding to the first encoder, the first encoder is associated with a first path of data stream and the first video file, the second encoding parameter is an encoder parameter corresponding to the second encoder, and the second encoder is associated with a second path of data stream and a second video file;

sending, by the encoding control module, the first encoding parameter and the second encoding parameter to the encoder; and creating, by the encoder, the first encoder based on the first encoding parameter, and creating the second encoder based on the second encoding parameter.

18. The method according to claim 17, wherein the electronic device comprises a stream management module, a storage module, the encoding control module, and a camera HAL; and after the receiving an operation performed on the first control, the method further comprises:

configuring, by the stream management module, the first path of data stream and the second path of data stream, and sending the stream configuration information to the encoding control module; and separately generating, by the storage module, the first video file and the second video file based on a current system time, and sending the file information to the encoding control module, wherein the file information comprises a file identifier of the first video file and a file identifier of the second video file;

sending, by the stream management module, the stream configuration information to the camera HAL; and determining, by the camera HAL based on the stream configuration information, image effect matching the first path of data stream and image effect matching the second path of data stream.

19. An electronic device, comprising a camera, a display, a memory, and one or more processors, wherein the touch panel and the memory are coupled to the processors; the memory is configured to store computer program code, wherein the computer program code comprises computer instructions;

when the processors execute the computer instructions, the electronic device performs following operations:

displaying a first interface, wherein the first interface comprises a first window and a first control, an image captured by the camera is displayed in the first window, the image displayed in the first window comprises one or more first objects, and the first control is used to enable a focus tracking mode;

receiving an operation performed on the first control, creating a first encoder, and creating a second encoder;

selecting a second object from the one or more first objects;

further displaying a second window when the display displays the first window, wherein an image displayed in the second window comprises the second object; and recording the image in the first window to generate a first video, and recording the image in the second window to generate a second video, by using the first encoder and the second encoder.

20. A non transitory computer storage medium, comprising computer instructions, wherein when the computer instructions are run on an electronic device, the electronic device is enabled to perform following operations:

displaying a first interface, wherein the first interface comprises a first window and a first control, an image captured by the camera is displayed in the first window, the image displayed in the first window comprises one or more first objects, and the first control is used to enable a focus tracking mode;

receiving an operation performed on the first control, creating a first encoder, a creating the second encoder;

selecting a second object from the one or more first objects;

further displaying a second window when the display displays the first window, wherein an image displayed in the second window comprises the second object; and recording the image in the first window to generate a first video, and recording the image in the second window to generate a second video, by using the first encoder and the second encoder.

\* \* \* \* \*